US012736607B2

(12) United States Patent
Beg et al.

(10) Patent No.: US 12,736,607 B2
(45) Date of Patent: Sep. 15, 2026

(54) CROSS-CORRELATION OF TIME DOMAIN SIGNALS DUE TO MOTION PROXIMITY

(71) Applicant: COGNITIVE SYSTEMS CORP., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 203 days.

(21) Appl. No.: 18/834,937

(22) PCT Filed: Jan. 27, 2023

(86) PCT No.: PCT/IB2023/050745

§ 371 (c)(1),
(2) Date: Jul. 31, 2024

(87) PCT Pub. No.: WO2023/148593

PCT Pub. Date: Aug. 10, 2023

(65) Prior Publication Data

US 2025/0164603 A1 May 22, 2025

Related U.S. Application Data

(60) Provisional application No. 63/313,488, filed on Feb. 24, 2022, provisional application No. 63/305,912, filed on Feb. 2, 2022.

(51) Int. Cl.
*G01S 5/10* (2006.01)
*G01S 5/02* (2010.01)

(52) U.S. Cl.
CPC .............. *G01S 5/10* (2013.01); *G01S 5/0295* (2020.05)

(58) Field of Classification Search
CPC .......... G01S 5/10; G01S 5/0295; G01S 7/006; G01S 13/003; G01S 13/522;
(Continued)

(56) References Cited

U.S. PATENT DOCUMENTS

2016/0103199 A1* 4/2016 Rappaport ................ G01S 3/48 342/377
2019/0170869 A1* 6/2019 Kravets .................. G01S 13/56
(Continued)

FOREIGN PATENT DOCUMENTS

WO 2016/005977 A1 1/2016

OTHER PUBLICATIONS

International Search Report, International Application No. PCT/IB2023/050745, Mailing Date: May 5, 2023.

*Primary Examiner* — William Kelleher
*Assistant Examiner* — Juliana Cross
(74) *Attorney, Agent, or Firm* — Moffat & Co

(57) ABSTRACT

A method for Wi-Fi sensing carried out by networked device is described. Initially, first set of time domain pulses is obtained from first channel representation information determined from first sensing measurement based on first sensing transmission transmitted by sensing transmitter and received by sensing receiver. A first amplitude attenuation is detected between first selected time domain pulse of first set of time domain pulses and first corresponding time domain pulse. Further, second set of time domain pulses is obtained from second channel representation information determined from second sensing measurement based on second sensing transmission transmitted by sensing transmitter and received by sensing receiver. A second amplitude attenuation is detected between second selected time domain pulse of second set of time domain pulses and second corresponding time domain pulse. A time lag is determined between first amplitude
(Continued)

attenuation and second amplitude attenuation, and near-far indicator is determined based on time lag.

18 Claims, 31 Drawing Sheets

(58) Field of Classification Search
CPC .. G01S 13/886; G01S 5/0273; G01S 2205/09; G08B 13/2491
See application file for complete search history.

(56) References Cited

U.S. PATENT DOCUMENTS

| | | | | |
|---|---|---|---|---|
| 2020/0359248 | A1 | 11/2020 | Sadeghi et al. | |
| 2021/0236084 | A1* | 8/2021 | Li .......................... | A61B 8/463 |
| 2021/0273685 | A1 | 9/2021 | Beg et al. | |
| 2021/0273735 | A1 | 9/2021 | Da Silva et al. | |
| 2022/0070710 | A1 | 3/2022 | Lim et al. | |
| 2022/0304051 | A1 | 9/2022 | Aboul-Magd et al. | |

* cited by examiner

600

| | Message Type | Transmission Configuration (optional) | Timing Configuration (optional) | Steering Matrix Configuration (optional) | TD-CRI Configuration (optional) |
|---|---|---|---|---|---|
| Octets: | 1 | Variable | Variable | Variable | Variable |

CROSS-CORRELATION OF TIME DOMAIN SIGNALS DUE TO MOTION PROXIMITY

CROSS-REFERENCE TO RELATED APPLICATIONS

The present application is a U.S. National Phase Application under 35 USC § 371 of International Application No. PCT/IB2023/050745, filed Jan. 27, 2023, which claims benefit of U.S. Provisional Application No. 63/313,488, filed Feb. 24, 2022, and U.S. Provisional Application No. 63/305, 912, filed Feb. 2, 2022, the entire contents of which are incorporated by reference herein.

TECHNICAL FIELD

The present disclosure generally relates to methods and systems for Wi-Fi sensing. In particular, the present disclosure relates to methods and systems for utilizing cross-correlation of time domain signals to detect motion proximity.

BACKGROUND OF THE DISCLOSURE

Motion detection systems have been used to detect movement, for example, of objects in a room or an outdoor area. In some example motion detection systems, infrared or optical sensors are used to detect the movement of objects in the sensor's field of view. Motion detection systems have been used in security systems, automated control systems, and other types of systems. A Wi-Fi sensing system is one recent addition to motion detection systems. The Wi-Fi sensing system may be a network of Wi-Fi-enabled devices that may be a part of an IEEE 802.11 network. For example, the Wi-Fi sensing system may include a sensing receiver and a sensing transmitter. In an example, the Wi-Fi sensing system may be configured to detect features of interest in a sensing space. The sensing space may refer to any physical space in which the Wi-Fi sensing system may operate, such as a place of residence, a place of work, a shopping mall, a sports hall or sports stadium, a garden, or any other physical space. The features of interest may include motion of objects and motion tracking, presence detection, intrusion detection, gesture recognition, fall detection, breathing rate detection, and other applications. Features of interest may also be referred to as physical processes.

In the Wi-Fi sensing system, an orthogonal frequency division multiplexing (OFDM) channel may be represented by a channel representation information (CRI) in either frequency domain or time domain. In an example, frequency domain channel state information is a common CRI which represents the OFDM channel by a phase and amplitude modifier for every subcarrier in an OFDM signal. In the time domain, one or more signal pulses may be received in the form of a number of multipath signals. Each multipath signal or time-domain pulse may undergo a different attenuation (amplitude and phase) and a different delay. The Wi-Fi sensing system may transmit sensing transmissions and/or make sensing measurements at different frequencies.

BRIEF SUMMARY OF THE DISCLOSURE

The present disclosure generally relates to methods and systems for Wi-Fi sensing. In particular, the present disclosure relates to methods and systems for utilizing cross-correlation of time domain signals to detect motion proximity.

Systems and methods are provided for Wi-Fi sensing. In an example embodiment, a method for Wi-Fi sensing is described. The method is carried out by a networked device implementing a sensing algorithm. The networked device includes a processor configured to execute instructions. The method includes obtaining a first set of time domain pulses from first channel representation information determined from a first sensing measurement based on a first sensing transmission transmitted by a sensing transmitter and received by a sensing receiver and representative of a first frame and detecting a first amplitude attenuation between a first selected time domain pulse of the first set of time domain pulses and a first corresponding time domain pulse. In some embodiments, the method includes obtaining a second set of time domain pulses from second channel representation information determined from a second sensing measurement based on a second sensing transmission transmitted by a sensing transmitter and received by a sensing receiver and representative of a second frame, and detecting a second amplitude attenuation between a second selected time domain pulse of the second set of time domain pulses and a second corresponding time domain pulse. In some embodiments, the method includes determining a time lag between the first amplitude attenuation and the second amplitude attenuation and determining a near-far indicator based on the time lag.

In some embodiments, the first channel representation information includes at least one of channel state information, a full time-domain channel representation information (TD-CRI), and a filtered TD-CRI.

In some embodiments, detecting the first amplitude attenuation includes identifying correspondence between the first selected time domain pulse and the first corresponding time domain pulse according to a comparison of a first time delay of the first selected time domain pulse and a stored time delay of the first corresponding time domain pulse, comparing an amplitude of the first selected time domain pulse to a stored base amplitude of the first corresponding time domain pulse, and determining that the first amplitude attenuation has occurred responsive to a determination that the amplitude is less than the stored base amplitude by a threshold amount.

In some embodiments, detecting the first amplitude attenuation includes recording a first time stamp at which the first amplitude attenuation occurred, wherein detecting the second amplitude attenuation includes recording a second time stamp at which the second amplitude attenuation occurred, and wherein determining the time lag between the first amplitude attenuation and the second amplitude attenuation includes comparing the first time stamp and the second time stamp.

In some embodiments, the method includes storing a table of corresponding time domain pulses, each corresponding time domain pulse being represented by a time delay and a base amplitude.

In some embodiments, each time delay is representative of a time between receipt of a line-of-sight time domain pulse and each corresponding time domain pulse.

In some embodiments, each base amplitude is normalized with respect to a line-of-sight time domain pulse base amplitude.

In some embodiments, the corresponding time domain pulses include a line-of-sight time domain pulse and a plurality of reflected time domain pulses.

In some embodiments, the method comprises estimating a proximity of a path of motion to one of the sensing receiver or the sensing transmitter according to the near-far indicator.

In some embodiments, the method comprises obtaining a table of corresponding time domain pulses, each corresponding time domain pulse being represented by a time delay and a base amplitude; and identifying a path of motion by obtaining a plurality of sets of time domain pulses from a plurality of channel representation information determined from a plurality of sensing measurements based on a plurality of sensing transmissions transmitted by a sensing transmitter and received by a sensing receiver and representative of a plurality of frames, the plurality of sets of time domain pulses including the first set of time domain pulses and the second set of time domain pulses, detecting a plurality of amplitude attenuations between selected time domain pulses of the plurality of sets of time domain pulses and respective corresponding time domain pulses from the table, determining a plurality of time lags between successive ones of the plurality of amplitude attenuations, and determining a near-far indicator associated with the path of motion.

In some embodiments, determining the near-far indicator is based on a cumulative time lag between an earliest amplitude attenuation and a latest amplitude attenuation.

In some embodiments, the method comprises characterizing a sensing space between the sensing transmitter and the sensing receiver by identifying a plurality of paths of motion, each path of motion including an associated plurality of near-far indicators, identifying a maximum near-far indicator from the plurality of near-far indicators, and identifying a minimum near-far indicator from the plurality of near-far indicators.

In some embodiments, the method comprises identifying a selected path of motion and a selected near-far indicator associated with the selected path of motion and determining a proximity of the selected path of motion to the sensing transmitter or the sensing receiver by comparing the selected near-far indicator to the maximum near-far indicator and to the minimum near-far indicator.

In some embodiments, characterizing the sensing space further includes identifying a first spatially extreme time domain pulse and identifying a second spatially extreme time domain pulse.

In some embodiments, determining the near-far indicator is based on a time lag between amplitude attenuation of the first spatially extreme time domain pulse and amplitude attenuation of the second spatially extreme time domain pulse.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6 illustrates a management frame carrying a sensing transmission, according to some embodiments;

DETAILED DESCRIPTION

Figure 1:
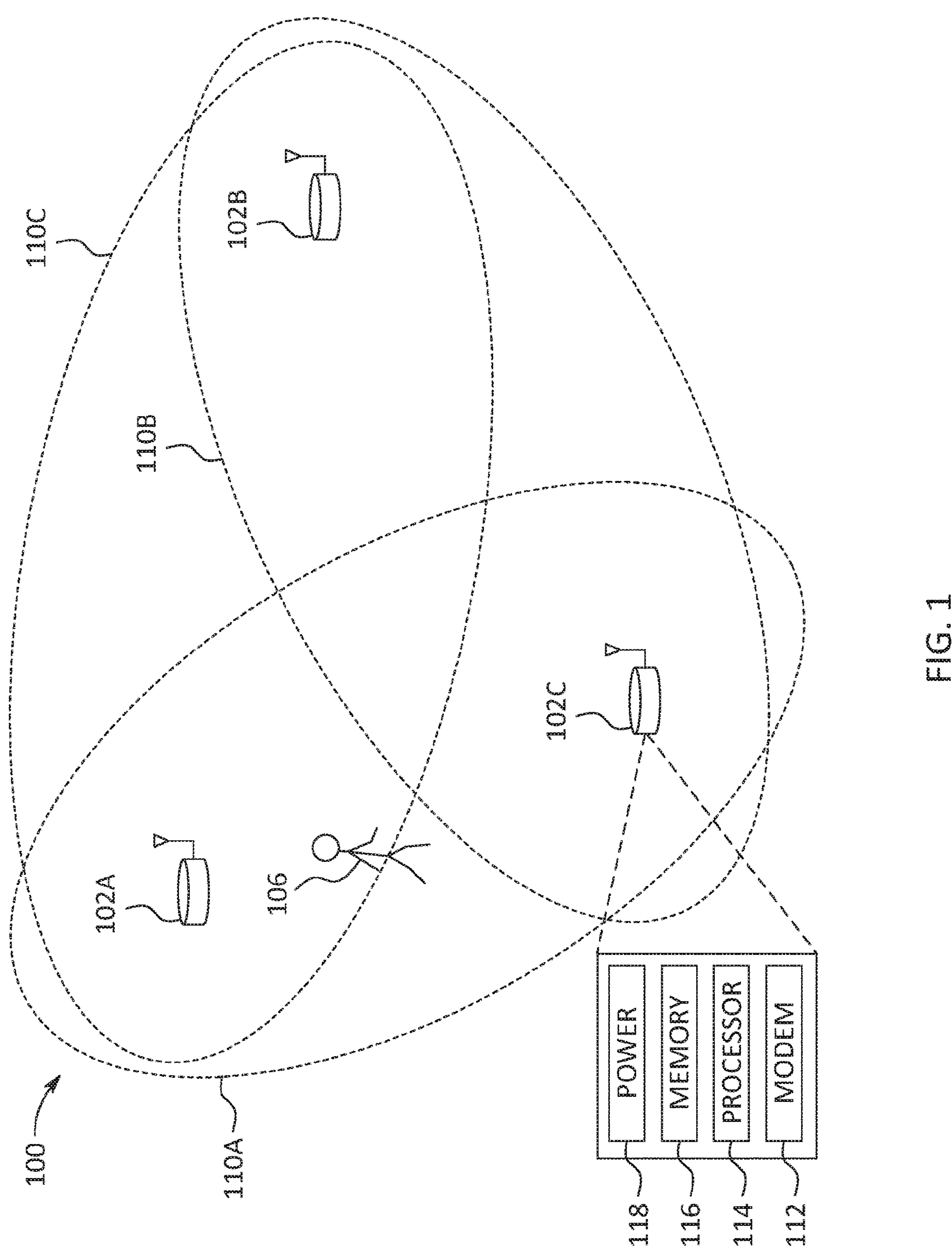
FIG. 1 is a diagram showing an example wireless communication system.

In some aspects of what is described herein, a wireless sensing system may be used for a variety of wireless sensing applications by processing wireless signals (e.g., radio frequency (RF) signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access point (AP) assumes the receiver role, and each Wi-Fi device (station (STA), node, or peer) connected to the AP assumes the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information, etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at some angles experience constructive interference while others experience destructive interference.

The channel information for each of the communication links may be analyzed (e.g., by a hub device or other device in a wireless communication network, or a sensing transmitter, sensing receiver, or sensing initiator communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered or caused to make sensing transmissions or sensing measurements less frequently. In some implementations, when motion is present, for example, the wireless sensing system can increase the triggering rate or sensing transmission rate or sensing measurement rate to produce a time-series of measurements with finer time resolution. Controlling the variable sensing measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or extended service set (ESS) topology, multiple coordinating wireless APs each provide a basic service set (BSS) which may occupy different frequency bands and allow devices to transparently move between from one participating AP to another (e.g., mesh). For instance, within a home mesh network, Wi-Fi devices can connect to any of the APs, but typically select one with good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage, or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, a motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

In various embodiments of the disclosure, non-limiting definitions of one or more terms that will be used in the document are provided below.

A term "measurement campaign" may refer to a bi-directional series of one or more sensing transmissions between a sensing receiver and a sensing transmitter that allows a series of one or more sensing measurements to be computed.

A term "channel state information" may refer to properties of a communications channel that are known or measured by a technique of channel estimation. Channel state information may represent how wireless signals propagate from a transmitter (for example, a sensing transmitter) to a receiver (for example, a sensing receiver) along multiple paths. Channel state information is typically a matrix of complex values representing the amplitude attenuation and phase shift of signals, which provides an estimation of a communications channel.

A term "full time-domain channel representation information (full TD-CRI)" may refer to a series of complex pairs of time domain pulses which are created by performing an Inverse Fourier transform (IDFT) on channel state information values, for example channel state information calculated by a baseband receiver.

A term "channel representation information (CRI)" may refer to a collection of sensing measurements that together represent the state of the channel between two devices. Examples of CRI are channel state information and full TD-CRI.

A term "filtered time-domain channel representation information (filtered TD-CRI)" may refer to a reduced series of complex pairs of time domain pulses created by applying an algorithm to a full TD-CRI. The algorithm may select some time domain pulses and reject others. The filtered TD-CRI includes information that relates a selected time domain pulse to the corresponding time domain pulse in the full TD-CRI.

A term "discrete Fourier transform (DFT)" may refer to an algorithm that transforms a signal in time domain to a signal in frequency domain. In an embodiment, a fast Fourier transform (FFT) may be used to implement the DFT.

A term "inverse discrete Fourier transform (IDFT)" may refer to an algorithm which transforms a signal in frequency domain to a signal in time domain. In an example, the IDFT may be used to transform a channel state information into a TD-CRI. In an embodiment, an inverse fast Fourier transform (IFFT) may be used to implement the IDFT.

A term "sensing initiator" may refer to a device that initiates a Wi-Fi sensing session. The role of sensing initiator may be taken on by the sensing receiver, the sensing transmitter, or a separate device that includes a sensing algorithm (for example, a networked device).

A term "Null Data PPDU (NDP)" may refer to a PPDU that does not include data fields. In an example, Null Data PPDU may be used for sensing transmission where it is the Medium Access Control (MAC) header that includes the information required.

A term "sensing transmission" may refer to any transmission made from a sensing transmitter to a sensing receiver that may be used to make a sensing measurement. In an example, sensing transmission may also be referred to as wireless sensing signal or wireless signal.

A term "sensing trigger message" may refer to a message sent from the sensing receiver to the sensing transmitter to trigger one or more sensing transmissions that may be used for performing sensing measurements. In an example, a sensing trigger message may be sent from a sensing transmitter to a sensing receiver to cause the sensing receiver to send a sensing measurement response message back to the sensing transmitter or to a sensing initiator.

A term "sensing response message" may refer to a message which is included within a sensing transmission from the sensing transmitter to the sensing receiver. In an example, the sensing transmission that includes the sensing response message may be used to perform a sensing measurement.

A term "sensing measurement" may refer to a measurement of a state of a channel i.e., channel state information measurement between the sensing transmitter and the sensing receiver derived from a transmission, for example, a sensing transmission.

A term "transmission parameters" may refer to a set of IEEE 802.11 PHY transmitter configuration parameters which are defined as part of transmission vector (TXVECTOR) corresponding to a specific PHY and which are configurable for each PHY-layer Protocol Data Unit (PPDU) transmission.

A term "PHY-layer Protocol Data Unit (PPDU)" may refer to a data unit that includes preamble and data fields. The preamble field may include the transmission vector format information, and the data field may include payload and higher layer headers.

A term "sensing transmitter" may refer to a device that sends transmissions (for example, NDPs and PPDUs) used for sensing measurements (for example, channel state information) in a wireless local area network (WLAN) sensing session. In an example, a station is an example of a sensing transmitter. In some examples, an access point (AP) may also be a sensing transmitter for Wi-Fi sensing purposes in the example where a station acts as a sensing receiver. In an embodiment, the role of the sensing transmitter may be taken by a remote device (for example, a networked device).

A term "sensing receiver" may refer to a device that receives transmission (for example, NDPs and PPDUs or any other transmission which may be opportunistically used for sensing measurements) sent by a sensing transmitter and performs one or more sensing measurements (for example, channel state information) in a WLAN sensing session. An access point (AP) is an example of a sensing receiver. In some examples, a station may also be a sensing receiver in a mesh network scenario. In an embodiment, the role of the sensing receiver may be taken by a remote device (for example, a networked device).

A term "channel response information (CRI) transmission message" may refer to a message sent by the sensing receiver that has performed a sensing measurement on a sensing transmission, in which the sensing receiver sends CRI to a sensing initiator or the networked device.

A term "time domain pulse" may refer to a complex number that represents amplitude and phase of discretized energy in the time domain. When channel state information values are obtained for each tone from the baseband receiver, time domain pulses are obtained by performing an inverse Fourier Transform (for example and IDFT or an IFFT) on the channel state information values.

A term "delivered transmission configuration" may refer to transmission parameters applied by the sensing transmitter to a sensing transmission.

A term "requested transmission configuration" may refer to requested transmission parameters of the sensing transmitter to be used when sending a sensing transmission.

A "transmission channel" may refer to a tunable channel on which the sensing receiver performs a sensing measurement and/or on which the sensing transmitter performs a sensing transmission.

A term "sensing transmission announcement message" may refer to a message which is sent from the sensing transmitter to the sensing receiver that announces that a sensing transmission NDP will follow within a short interframe space (SIFS). The sensing transmission NDP may be transmitted using transmission parameters defined with the sensing transmission announcement messages.

A term "sensing transmission NDP" may refer to an NDP transmission which is sent by the sensing transmitter and used for a sensing measurement at the sensing receiver. The transmission follows a sensing transmission announcement and may be transmitted using transmission parameters that are defined in the sensing response announcement.

A term "sensing measurement poll message" may refer to a message which is sent from the sensing transmitter to the sensing receiver to solicit the transmission of channel representation information that has been determined by the sensing receiver.

A term "sensing configuration message" may refer to a message which from a device including a sensing algorithm (for example, a networked device) to the sensing receiver. The sensing configuration message may include a channel representation information configuration. The channel representation information configuration may interchangeably be referred to as Time Domain Channel Representation Information (TD-CRI) configuration.

A term "sensing configuration response message" may refer to a message sent from the sensing receiver to the device including the sensing algorithm (for example, the networked device) in response to a sensing configuration message. In an example, the sensing configuration response message may be an acknowledgement to the sensing configuration message.

A term "feature of interest" may refer to an item or state of an item which is positively detected and/or identified by a sensing algorithm.

A term "path of motion" may refer to a physical route that an object traveling through a sensing space takes. A path of motion may occur between transmitters and/or reflectors.

A term "sensing space" may refer to a physical space in which a Wi-Fi sensing system may operate.

A term "identifier index" may refer to a representation of a time domain pulse using function parameters of time delay and base amplitude.

A term "Wi-Fi sensing session" may refer to a period during which objects in a physical space may be probed, detected and/or characterized. In an example, during a Wi-Fi sensing session, several devices participate in, and thereby contribute to the generation of sensing measurements. A Wi-Fi sensing session may also be referred to as a WLAN sensing session or simply a sensing session.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes systems and methods that are useful for a Wi-Fi sensing system configurated to send sensing transmissions and make sensing measurements.

Section C describes embodiments of methods and systems for cross-correlation of time domain signals due to motion proximity.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a wireless local area network (WLAN), a personal area network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®., Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as code division multiple access (CDMA), wideband code division multiple access (WCDMA), Universal Mobile Telecommunications System (UMTS), and time division synchronous code division multiple access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially-available Wi-Fi APs or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially-available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate RF signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and RF circuitry. The RF circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to RF signals, and wirelessly transmits the RF signals (e.g., through an antenna). In some instances, the radio subsystem in modem 112 wirelessly receives RF signals (e.g., through an antenna), down-converts the RF to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes of FIG. 18A, FIG. 18B, FIG. 19A, FIG. 19B, FIG. 20A, and FIG. 20B. Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an alternating current (AC) adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to FIG. 18A, FIG. 18B, FIG. 19A, FIG. 19B, FIG. 20A, and FIG. 20B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
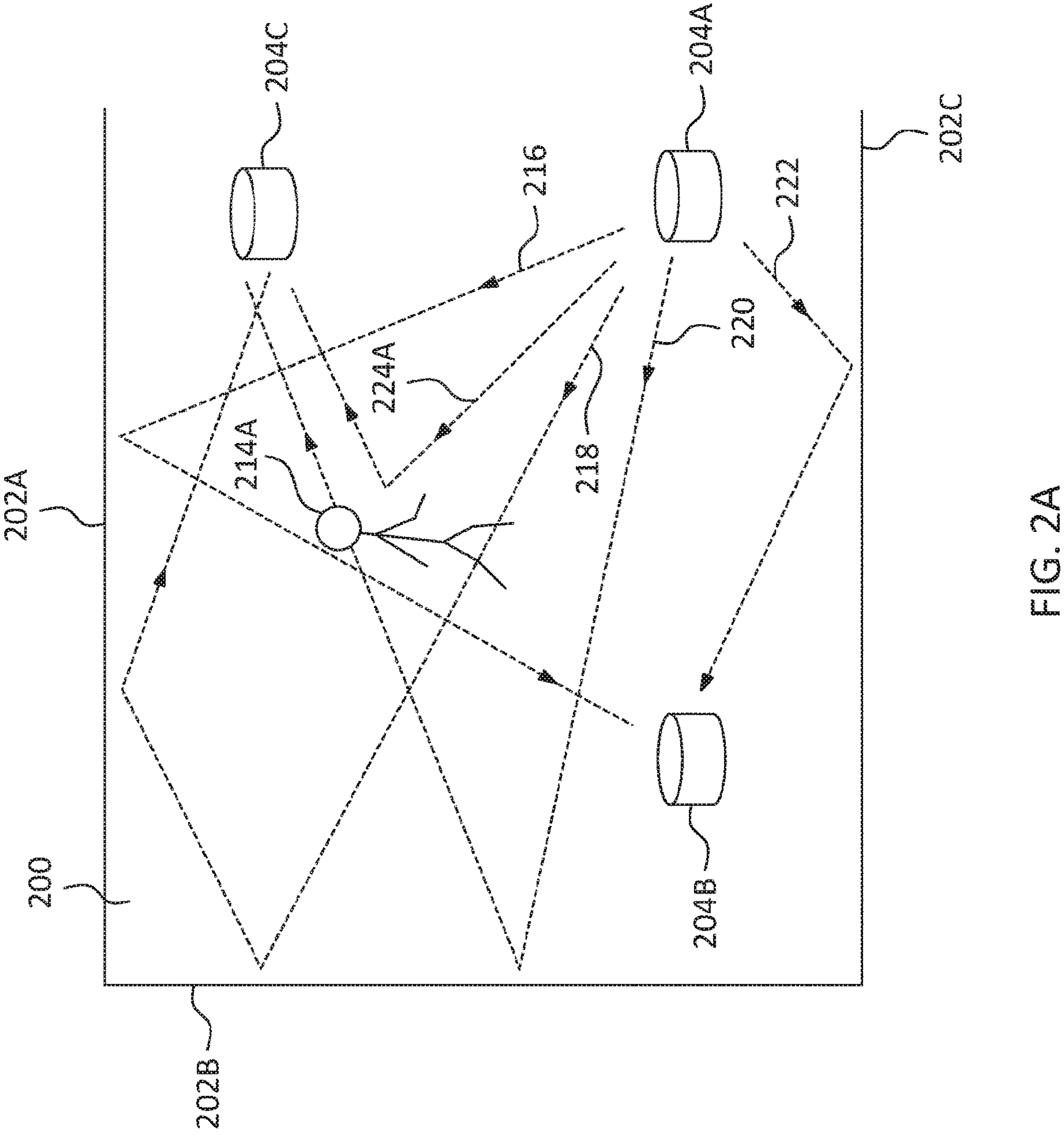
FIG. 2A and FIG. 2B are diagrams showing example wireless signals communicated between wireless communication devices.
Figure 2B:
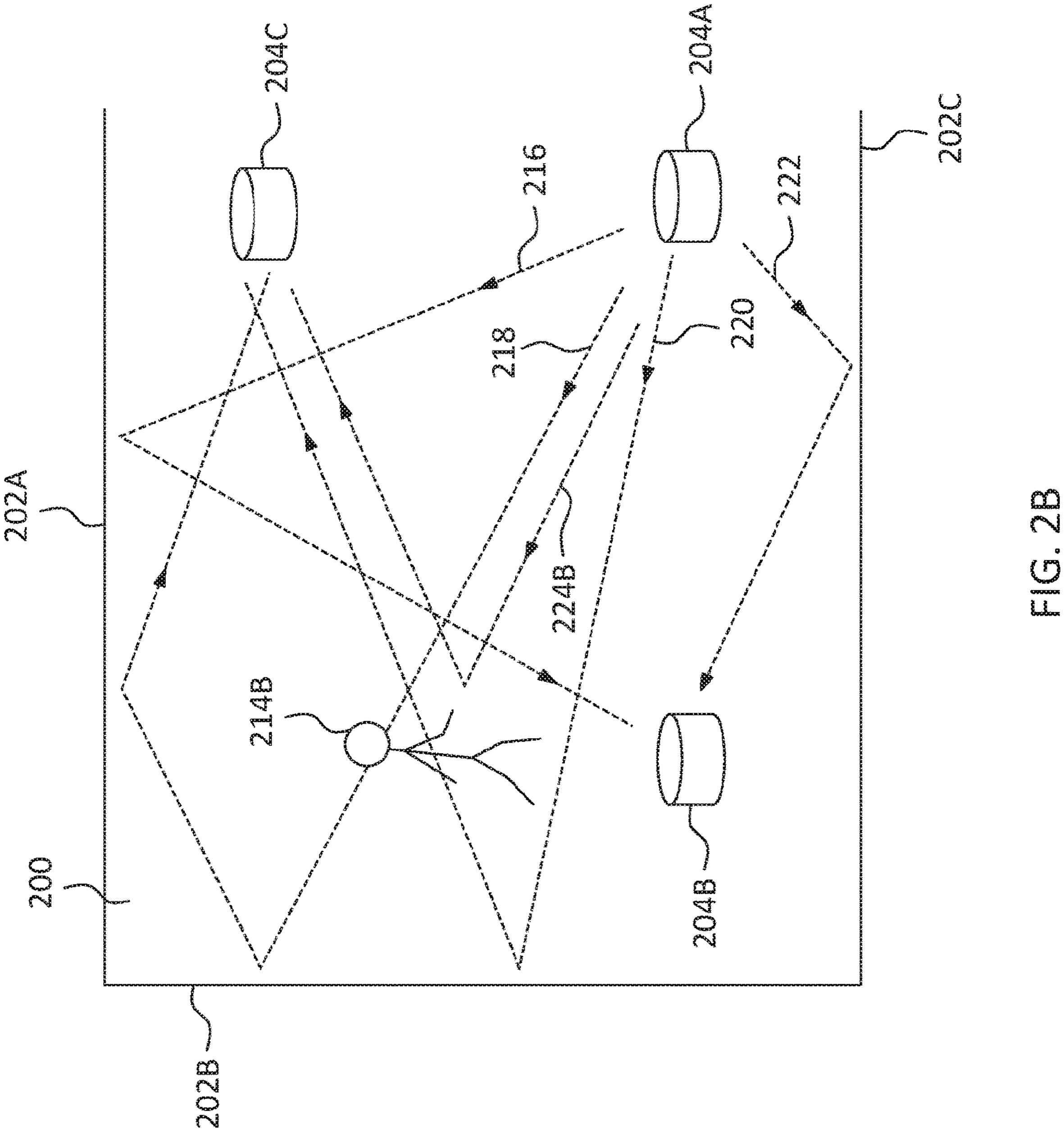

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t)=\sum_{n=-\infty}^{\infty} c_n e^{j\omega_n t} \tag{1}$$

Where $\omega_n$ represents the frequency of nth frequency component of the transmitted signal, $c_n$ represents the complex coefficient of the nth frequency component, and t represents time. With the f(t) being transmitted from the first wireless communication device 204A, an output signal $r_k(t)$ from a path, k, may be described according to Equation (2):

$$r_k(t) = \sum_{n=-\infty}^{\infty} \alpha_{n,k} c_n e^{j(\omega_n t + \phi_{n,k})} \tag{2}$$

Where $\alpha_{n,k}$ represents an attenuation factor (or channel response; e.g., due to scattering, reflection, and path losses) for the nth frequency component along k, and $\phi_{n,k}$ represents the phase of the signal for nth frequency component along k. Then, the received signal, R, at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

R at a wireless communication device can then be analyzed. R at a wireless communication device can be transformed to the frequency domain, for example, using a fast Fourier transform (FFT) or another type of algorithm. The transformed signal can represent R as a series of n complex values, one for each of the respective frequency components (at the n frequencies $\omega_n$). For a frequency component at frequency ωn, a complex value, $H_n$, may be represented as follows in Equation (5):

$$H_n = \sum_k c_n \alpha_{n,k} e^{j\phi_{n,k}} \tag{5}$$

$H_n$ for a given $\omega_n$ indicates a relative magnitude and phase offset of the received signal at $\omega_n$. When an object moves in the space, $H_n$ changes due to $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \sum_k \sum_{n=-\infty}^{\infty} \alpha_{n,k} \tag{6}$$

In some instances, the channel response, $h_{ch}$, for a space can be determined, for example, based on the mathematical theory of estimation. For instance, a reference signal, $R_{ef}$, can be modified with candidate $h_{ch}$, and then a maximum likelihood approach can be used to select the candidate channel which gives best match to the received signal ($R_{cvd}$). In some cases, an estimated received signal ($\hat{R}_{cvd}$) is obtained from the convolution of $R_{ef}$ with the candidate $h_{ch}$, and then the channel coefficients of $h_{ch}$ are varied to minimize the squared error of $\hat{R}_{cvd}$. This can be mathematically illustrated as follows in Equation (7):

$$R_{cvd} = R_{ef} \otimes h_{ch} = \sum_{k=-m}^{m} R_{ef}(n-k) h_{ch}(k) \tag{7}$$

with the optimization criterion $$\min_{h_{ch}} \left\{ \sum \left( \hat{R}_{cvd} - R_{cvd} \right)^2 \right\}$$

The minimizing, or optimizing, process can utilize an adaptive filtering technique, such as least mean squares (LMS), recursive least squares (RLS), batch least squares (BLS), etc. The channel response can be a finite impulse response (FIR) filter, infinite impulse response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figures 3A, 3B:
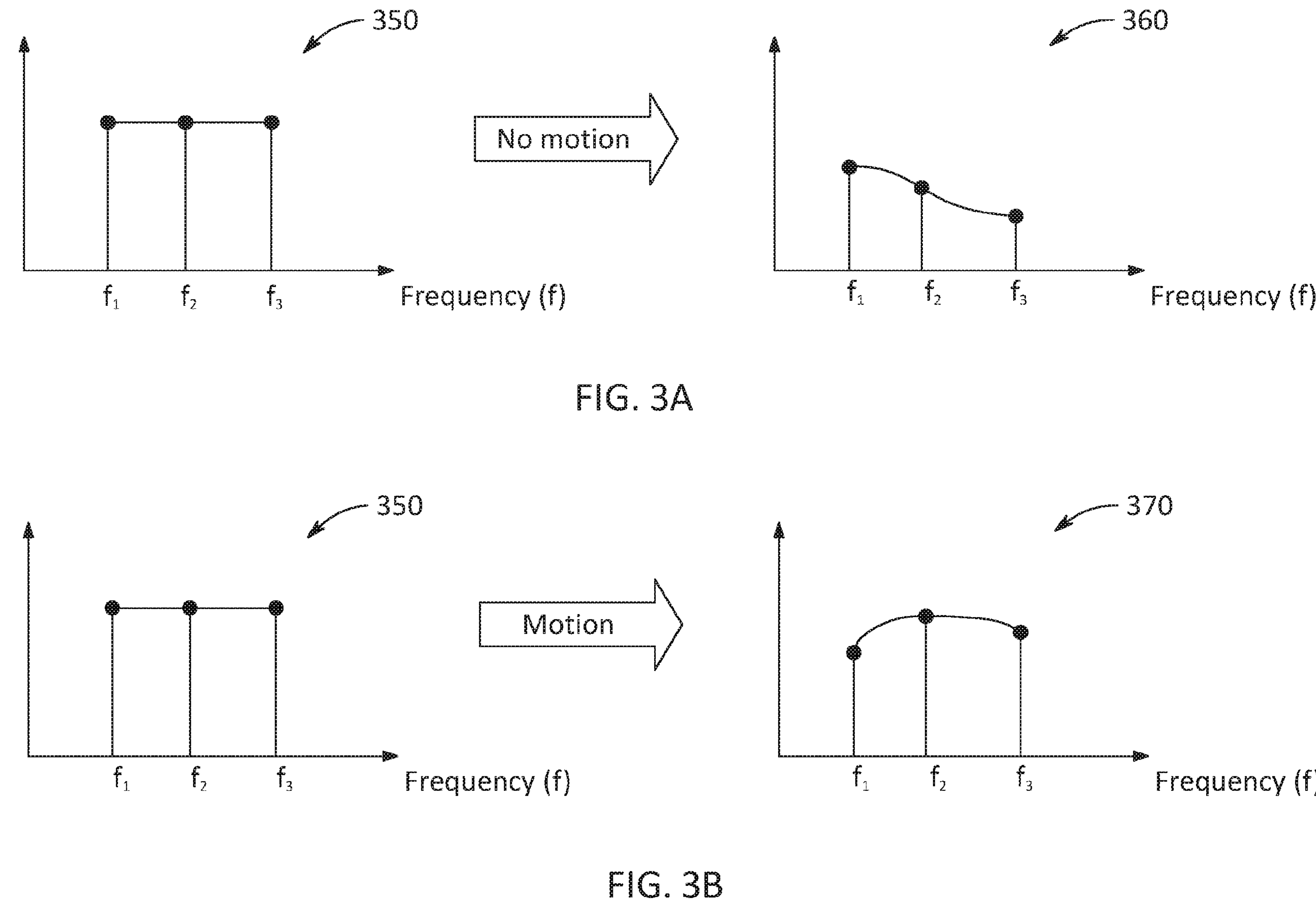
FIG. 3A and FIG. 3B are plots showing examples of channel responses computed from the wireless signals communicated between wireless communication devices in FIG. 2A and FIG. 2B.

FIG. 3A and FIG. 3B are plots showing examples of channel responses 360, 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component, $f_1$, $f_2$ and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel responses 360, 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
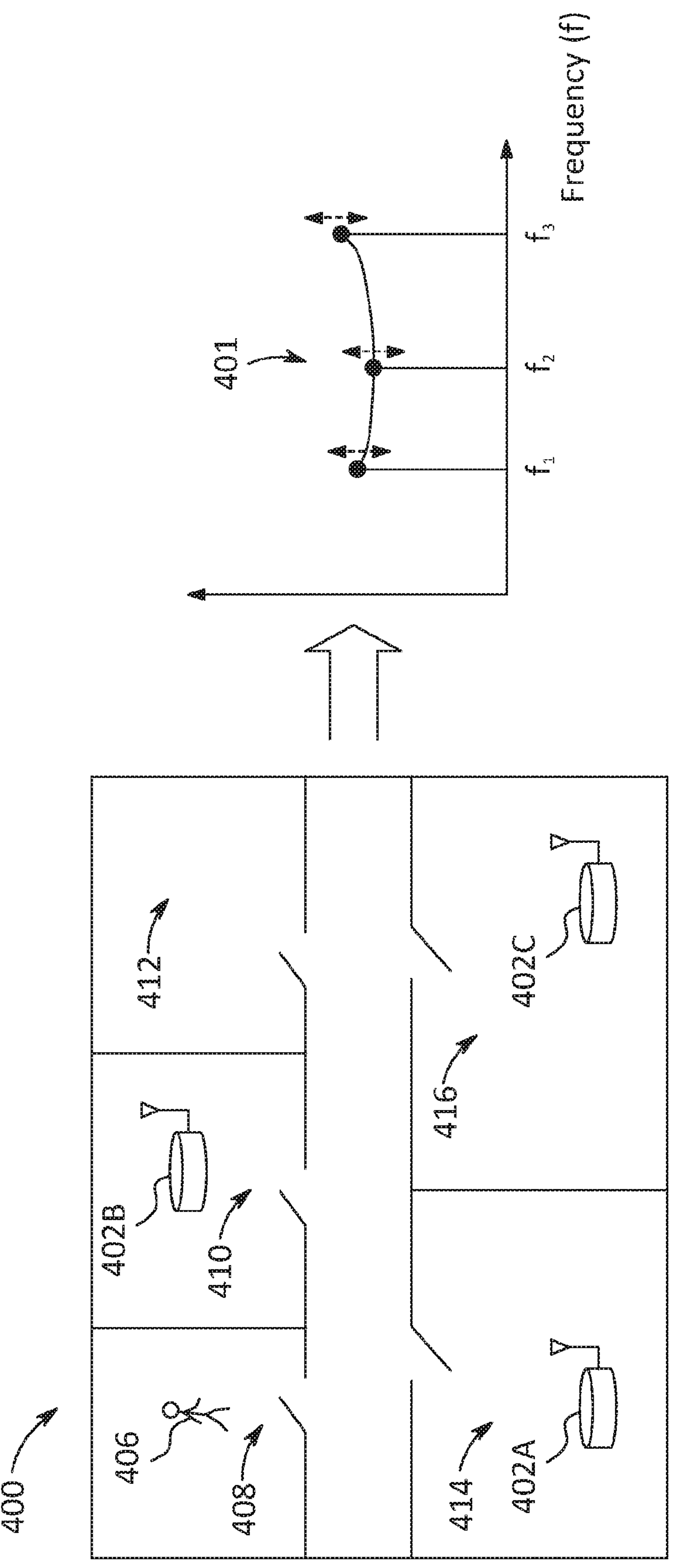
FIG. 4A and FIG. 4B are diagrams showing example channel responses associated with motion of an object in distinct regions of a space.
Figure 4B:
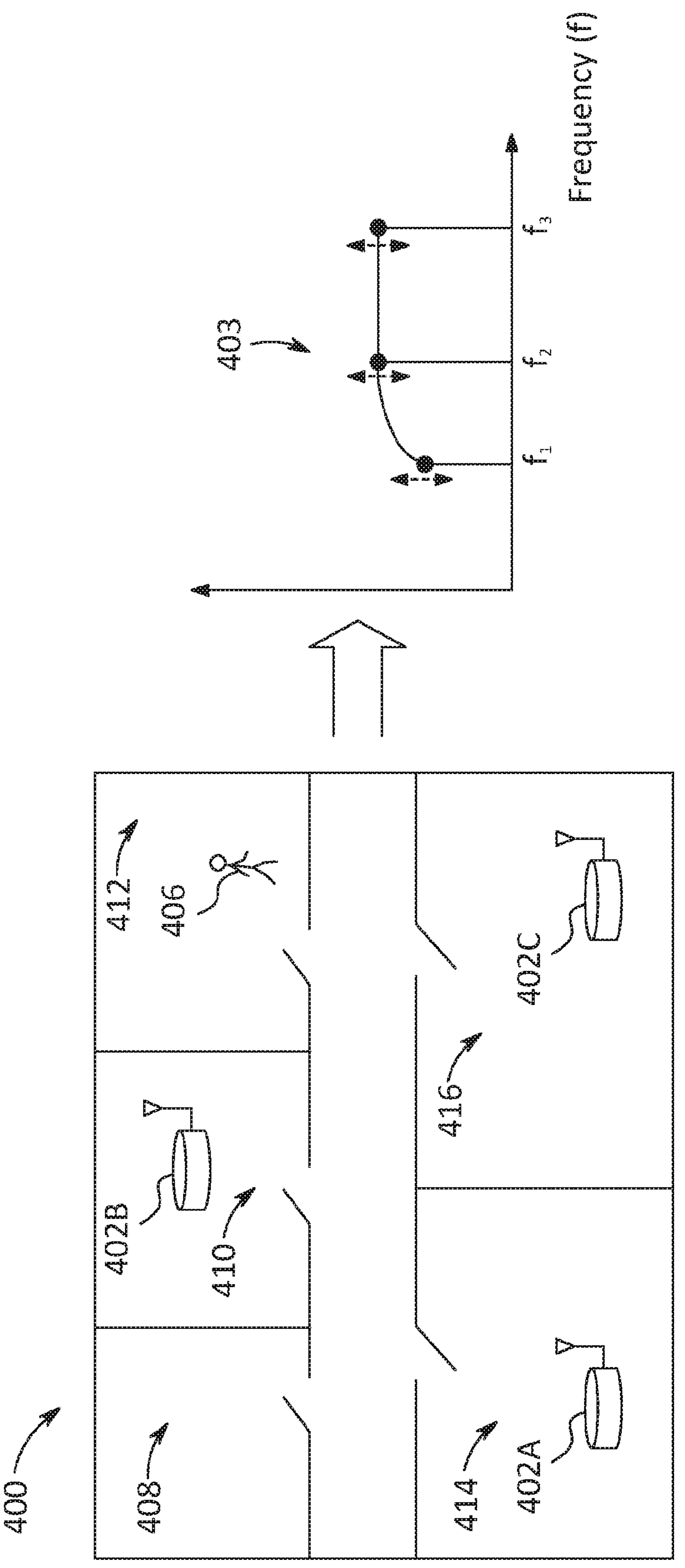

FIG. 4A and FIG. 4B are diagrams showing example channel responses 401, 403 associated with motion of object 406 in distinct regions 408, 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$ and $f_3$ is the same or nearly the same. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel responses 401, 403 are associated with signals received by the same wireless communication device 402 in space 400.

Figures 4C, 4D:
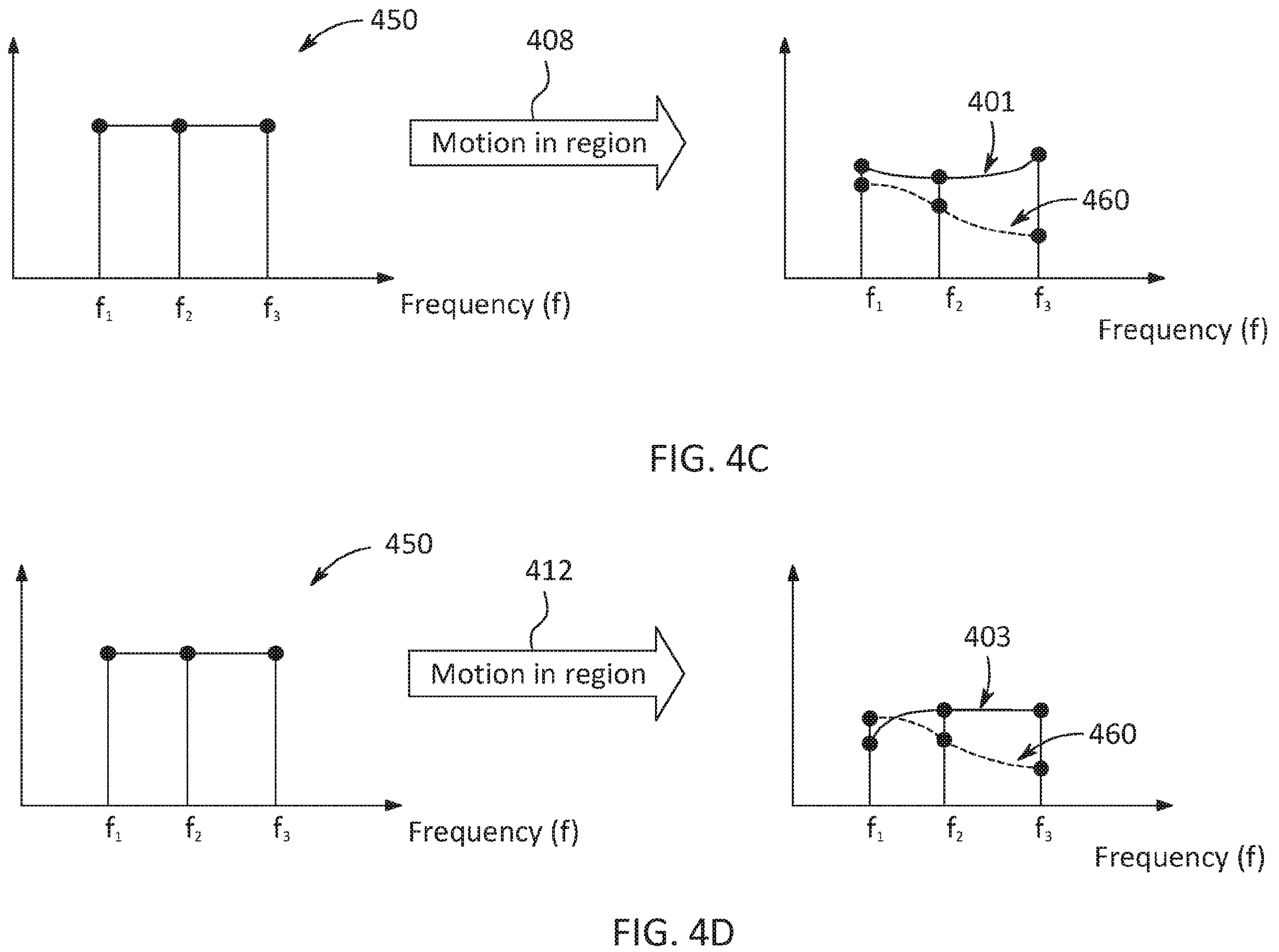
FIG. 4C and FIG. 4D are plots showing the example channel responses of FIG. 4A and FIG. 4B overlaid on an example channel response associated with no motion occurring in the space.

FIG. 4C and FIG. 4D are plots showing channel responses 401, 403 of FIG. 4A and FIG. 4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained artificial intelligence (AI) model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each of $f_1$, $f_2$ and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component, $f_2$, is less than the outer frequency components $f_1$ and $f_3$), while channel response 403 has a convex-asymptotic frequency profile (the magnitude of the middle frequency component $f_2$ is greater than the outer frequency components, $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an AI model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Wi-Fi Sensing System Example Methods and Apparatus

Section B describes systems and methods that are useful for a Wi-Fi sensing system configurated to send sensing transmissions and make sensing measurements.

Figure 5:
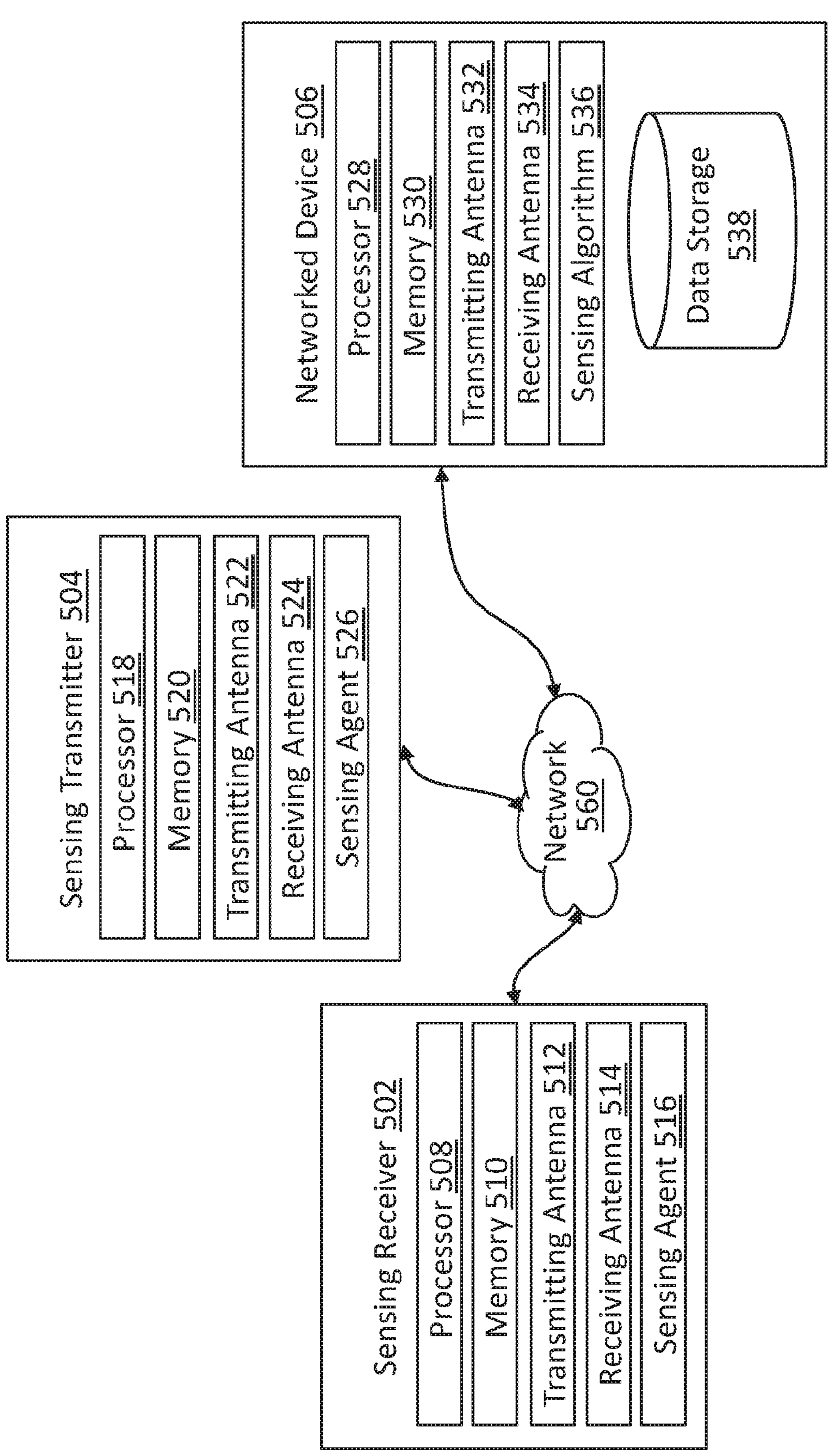
FIG. 5 depicts an implementation of some of an architecture of an implementation of a system for Wi-Fi sensing, according to some embodiments.

FIG. 5 depicts an implementation of some of an architecture of an implementation of system 500 for Wi-Fi sensing, according to some embodiments.

System 500 may include sensing receiver 502, sensing transmitter 504, networked device 506, and network 560 enabling communication between the system components for information exchange. System 500 may be an example or instance of wireless communication system 100, and network 560 may be an example or instance of wireless network or cellular network, details of which are provided with reference to FIG. 1 and its accompanying description.

According to an embodiment, sensing receiver 502 may be configured to receive a sensing transmission (for example, from sensing transmitter 504) and perform one or more measurements (for example, channel state information) useful for Wi-Fi sensing. These measurements may be known as sensing measurements. The sensing measurements may be processed to achieve a sensing result of system 500, such as detecting motions or gestures. In an embodiment, sensing receiver 502 may be an AP. In some embodiments, sensing receiver 502 may take a role of sensing initiator.

According to an implementation, sensing receiver 502 may be implemented by a device, such as wireless communication device 102 shown in FIG. 1. In some implementations, sensing receiver 502 may be implemented by a device, such as wireless communication device 204 shown in FIG. 2A and FIG. 2B. Further, sensing receiver 502 may be implemented by a device, such as wireless communication device 402 shown in FIG. 4A and FIG. 4B. In some embodiments, sensing receiver 502 may be any computing device, such as a desktop computer, a laptop, a tablet computer, a mobile device, a personal digital assistant (PDA), or any other computing device. According to an implementation, sensing receiver 502 may be enabled to control a measurement campaign to ensure that required sensing transmissions are made at a required time and to ensure an accurate determination of sensing measurements. In some embodiments, sensing receiver 502 may process sensing measurements to achieve the sensing result of system 500. In some embodiments, sensing receiver 502 may be configured to transmit sensing measurements to sensing transmitter 504 or networked device 506, and sensing transmitter 504 or networked device 506 may be configured to process the sensing measurements to achieve the sensing result of system 500.

Referring again to FIG. 5, in some embodiments, sensing transmitter 504 may form a part of a basic service set (BSS) and may be configured to send a sensing transmission to sensing receiver 502 based on which one or more sensing measurements (for example, channel state information) may be performed for Wi-Fi sensing. In an embodiment, sensing transmitter 504 may be a station. In an embodiment, sensing transmitter 504 may be an AP. According to an implementation, sensing transmitter 504 may be implemented by a device, such as wireless communication device 102 shown in FIG. 1. In some implementations, sensing transmitter 504 may be implemented by a device, such as wireless communication device 204 shown in FIG. 2A and FIG. 2B. Further, sensing transmitter 504 may be implemented by a device, such as wireless communication device 402 shown in FIG. 4A and FIG. 4B. In some embodiments, sensing transmitter 504 may be any computing device, such as a desktop computer, a laptop, a tablet computer, a mobile device, a personal digital assistant (PDA), or any other computing device. In some implementations, communication between sensing receiver 502 and sensing transmitter 504 may happen via station management entity (SME) and MAC layer management entity (MLME) protocols.

In some embodiments, networked device 506 may be configured to receive sensing measurements from sensing receiver 502 or sensing transmitter 504 and process the sensing measurements. In an example, networked device 506 may process and analyze sensing measurements to identify one or more features of interest. According to some implementations, networked device 506 may include/execute a sensing algorithm. In an embodiment, networked device 506 may be a station. In some embodiments, networked device 506 may be an AP. According to an implementation, networked device 506 may be implemented by a device, such as wireless communication device 102 shown in FIG. 1. In some implementations, networked device 506 may be implemented by a device, such as wireless communication device 204 shown in FIG. 2A and FIG. 2B. Further, networked device 506 may be implemented by a device, such as wireless communication device 402 shown in FIG. 4A and FIG. 4B. In some embodiments, networked device 506 may be any computing device, such as a desktop computer, a laptop, a tablet computer, a mobile device, a personal digital assistant (PDA), or any other computing device. In embodiments, networked device 506 may take a role of sensing initiator where a sensing algorithm determines a measurement campaign and the sensing measurements required to fulfill the measurement campaign. In an implementation, networked device 506 may control sensing receiver 502 and sensing transmitter 504 in order to determine proximity of a path of motion of an object traversing a sensing space, to either sensing receiver 502 or sensing transmitter 504.

Referring to FIG. 5, in more detail, sensing receiver 502 may include processor 508 and memory 510. For example, processor 508 and memory 510 of sensing receiver 502 may be processor 114 and memory 116, respectively, as shown in FIG. 1. In an embodiment, sensing receiver 502 may further include transmitting antenna(s) 512, receiving antenna(s) 514, and sensing agent 516.

In an implementation, sensing agent 516 may be responsible for receiving sensing transmissions and associated transmission parameters, calculating sensing measurements, and processing sensing measurements to fulfill a sensing result. In some implementations, receiving sensing transmissions and associated transmission parameters, and calculating sensing measurements may be carried out by an algorithm running in the MAC layer of sensing receiver 502 and processing sensing measurements to fulfill a sensing result may be carried out by an algorithm running in the application layer of sensing receiver 502. In some examples, the algorithm running in the application layer of sensing receiver 502 is known as a sensing application or sensing algorithm. In some implementations, the algorithm running in the MAC layer of sensing receiver 502 and the algorithm running in the application layer of sensing receiver 502 may run separately on processor 508. In an implementation, sensing agent 516 may pass physical layer parameters (e.g., such as channel state information) from the MAC layer of sensing receiver 502 to the application layer of sensing receiver 502 and may use the physical layer parameters to detect one or more features of interest. In an example, the application layer may operate on the physical layer parameters and form services or features, which may be presented to an end-user. According to an implementation, communication between the MAC layer of sensing receiver 502 and other layers or components may take place based on communication interfaces, such as MLME interface and a data interface. According to some implementations, sensing agent 516 may include/execute a sensing algorithm. In an implementation, sensing agent 516 may process and analyze sensing measurements using the sensing algorithm and identify one or more features of interest. Further, sensing agent 516 may be configured to determine a number and timing of sensing transmissions and sensing measurements for the purpose of Wi-Fi sensing. In some implementations, sensing agent 516 may be configured to transmit sensing measurements to sensing transmitter 504 or networked device 506 for further processing.

In an implementation, sensing agent 516 may be configured to cause at least one transmitting antenna of transmitting antenna(s) 512 to transmit messages to sensing transmitter 504 or networked device 506. Further, sensing agent 516 may be configured to receive, via at least one receiving antenna of receiving antennas(s) 514, messages from sensing transmitter 504. In an example, sensing agent 516 may be configured to make sensing measurements based on one or more sensing transmissions received from sensing transmitter 504.

Referring again to FIG. 5, sensing transmitter 504 may include processor 518 and memory 520. For example, processor 518 and memory 520 of sensing transmitter 504 may be processor 114 and memory 116, respectively, as shown in FIG. 1. In an embodiment, sensing transmitter 504 may further include transmitting antenna(s) 522, receiving antenna(s) 524, and sensing agent 526. In an implementation, sensing agent 526 may be a block that passes physical layer parameters from the MAC of sensing transmitter 504 to application layer programs. Sensing agent 526 may be configured to cause at least one transmitting antenna of transmitting antenna(s) 522 and at least one receiving antenna of receiving antennas(s) 524 to exchange messages with sensing receiver 502.

In an implementation, sensing agent 526 may be responsible for receiving sensing measurements and associated transmission parameters, calculating sensing measurements, and/or processing sensing measurements to fulfill a sensing result. In some implementations, receiving sensing measurements and associated transmission parameters, and calculating sensing measurements and/or processing sensing measurements may be carried out by an algorithm running in the MAC layer of sensing transmitter 504, and processing sensing measurements to fulfill a sensing result may be carried out by an algorithm running in the application layer of sensing transmitter 504. In some examples, the algorithm running in the application layer of sensing transmitter 504 is known as a sensing application or sensing algorithm. In some implementations, the algorithm running in the MAC layer of sensing transmitter 504 and the algorithm running in the application layer of sensing transmitter 504 may run separately on processor 518. In an implementation, sensing agent 526 may pass physical layer parameters (e.g., such as channel state information) from the MAC layer of sensing transmitter 504 to the application layer of sensing transmitter 504 and may use the physical layer parameters to detect one or more features of interest. In an example, the application layer may operate on the physical layer parameters and form services or features, which may be presented to an end-user. According to an implementation, communication between the MAC layer of sensing transmitter 504 and other layers or components may take place based on communication interfaces, such as MLME interface and a data interface. According to some implementations, sensing agent 526 may include/execute a sensing algorithm. In an implementation, sensing agent 526 may process and analyze sensing measurements using the sensing algorithm and identify one or more features of interest. Further, sensing agent 526 may be configured to determine a number and timing of sensing transmissions and sensing measurements for the purpose of Wi-Fi sensing. In some implementations, sensing agent 526 may be configured to transmit sensing measurements to networked device 506 for further processing.

In an implementation, sensing agent 526 may be configured to cause at least one transmitting antenna of transmitting antenna(s) 522 to transmit messages to networked device 506. Further, sensing agent 526 may be configured to receive, via at least one receiving antenna of receiving antennas(s) 524, messages from sensing receiver 502 or networked device 506. In an example, sensing agent 526 may be configured to receive sensing measurements from sensing transmitter 504.

Referring again to FIG. 5, networked device 506 may include processor 528 and memory 530. For example, processor 528 and memory 530 of networked device 506 may be processor 114 and memory 116, respectively, as shown in FIG. 1. In an embodiment, networked device 506 may further include transmitting antenna(s) 532, receiving antenna(s) 534, and sensing algorithm 536. In an implementation, sensing algorithm 536 may be a block that passes physical layer parameters from the MAC of networked device 506 to application layer programs. Sensing algorithm 536 may be configured to cause at least one transmitting antenna of transmitting antenna(s) 532 and at least one receiving antenna of receiving antennas(s) 534 to exchange messages with sensing receiver 502.

In some embodiments, an antenna may be used to both transmit and receive in a half-duplex format. When the antenna is transmitting, it may be referred to as transmitting antenna 512/522/532, and when the antenna is receiving, it may be referred to as receiving antenna 514/524/534. It is understood by a person of normal skill in the art that the same antenna may be transmitting antenna 512/522/532 in some instances and receiving antenna 514/524/534 in other instances. In the case of an antenna array, one or more antenna elements may be used to transmit or receive a signal, for example, in a beamforming environment. In some examples, a group of antenna elements used to transmit a composite signal may be referred to as transmitting antenna 512/522/532, and a group of antenna elements used to receive a composite signal may be referred to as receiving antenna 514/524/534. In some examples, each antenna is equipped with its own transmission and receive paths, which may be alternately switched to connect to the antenna depending on whether the antenna is operating as transmitting antenna 512/522/532 or receiving antenna 514/524/534.

Referring again to FIG. 5, networked device 506 may include data storage 538. In an implementation, data storage 538 may store a table of time domain pulses. In an example, each time domain pulse may be represented by a time delay and a base amplitude. In an implementation, data storage 538 may store identifier indexes, time delays, and base amplitudes corresponding to the time domain pulses. In some implementations, data storage 538 may store the table with the identifier indexes and the base amplitudes of the time domain pulses, where the identifier indexes are the time delays. Information stored in data storage 538 may be periodically or dynamically updated as required. In an implementation, data storage 538 may include any type or form of storage, such as a database or a file system coupled to memory 530.

Although networked device 506 is shown in FIG. 5 as a functional block separate from sensing receiver 502 and sensing transmitter 504, in an embodiment of system 500, networked device 506 may be implemented by sensing receiver 502 or by sensing transmitter 504. In embodiments, sensing agent 516 of sensing receiver 502 or sensing agent 526 of sensing transmitter 504 may implement the functionality of networked device 506.

According to one or more implementations, communications in network 560 may be governed by one or more of the 802.11 family of standards developed by IEEE. Some example IEEE standards may include IEEE 802.11-2020, IEEE 802.11ax-2021, IEEE 802.11me, IEEE 802.11az, and IEEE 802.11be. IEEE 802.11-2020 and IEEE 802.11ax-2021 are fully-ratified standards whilst IEEE 802.11me reflects an ongoing maintenance update to the IEEE 802.11-2020 standard and IEEE 802.11be defines the next generation of standard. IEEE 802.11az is an extension of the IEEE 802.11-2020 and IEEE 802.11 ax-2021 standards, adding new functionality. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

Referring to FIG. 5, according to one or more implementations, for the purpose of Wi-Fi sensing, the role of sensing initiator may be taken on by sensing receiver 502. In an implementation, networked device 506 may send a sensing configuration message to sensing receiver 502. In an example, the sensing configuration message may include a channel representation information configuration. In response to the sensing configuration message, sensing receiver 502 may send an acknowledgment using a sensing configuration response message and configure itself with the channel representation information configuration for use in generating channel state information, time-domain channel representation information (TD-CRI), or filtered TD-CRI. Thereafter, in an example, sensing receiver 502 may initiate a sensing session and send a sensing trigger message to sensing transmitter 504 requesting a sensing transmission. Sensing transmitter 504 may then send a sensing transmission to sensing receiver 502 in response to the sensing trigger message. Upon receiving the sensing transmission, sensing receiver 502 may perform a channel state measurement on the received sensing transmission and generate channel representation information using the channel representation information configuration. In an example, sensing receiver 502 may generate channel state information, TD-CRI, or filtered TD-CRI. Further, sensing receiver 502 may send a CRI transmission message including the channel state measurement (i.e., channel state information, TD-CRI, or filtered TD-CRI) to networked device 506 for further processing.

According to some embodiments, the role of sensing initiator may be taken on by sensing transmitter 504. In an implementation, networked device 506 may send a sensing configuration message to sensing transmitter 504. In an example, the sensing configuration message may include a channel representation information configuration. In response to the sensing configuration message, sensing transmitter 504 may send an acknowledgment using a sensing configuration response message and configure itself with the channel representation information configuration for use in generating channel state information, TD-CRI, or filtered TD-CRI. Thereafter, in an example, sensing transmitter 504 may initiate a sensing session and send a sensing transmission announcement message followed by a sensing transmission NDP to sensing receiver 502. In an example, the sensing transmission announcement message may include a channel representation information configuration. In an example, the sensing transmission NDP follows the sensing transmission announcement message after one SIFS. In an example, the duration of SIFS is 10 μs. Sensing receiver 502 may perform a channel state measurement on the sensing transmission NDP and generate channel representation information based on the channel representation information configuration. In an example, the sensing receiver 502 may generate channel state information, TD-CRI, or filtered TD-CRI. Sensing receiver 502 may send a CRI transmission message including the channel state measurement (i.e., channel state information, TD-CRI, or filtered TD-CRI) to networked device 506 for further processing.

In an example, sensing receiver 502 may hold the channel state measurement until it receives a sensing measurement poll message. Sensing transmitter 504 may send a sensing measurement poll message to sensing receiver 502, which may trigger sensing receiver 502 to send an already formatted channel state measurement (i.e., channel state information, TD-CRI, or filtered TD-CRI) to sensing transmitter 504. In another example, sensing transmitter 504 may send a sensing measurement poll message to sensing receiver 502, which includes a channel representation information configuration. The sensing measurement poll message may trigger sensing receiver 502 to generate channel state information, TD-CRI, or filtered TD-CRI according to the channel representation information configuration, and to transfer channel state information, TD-CRI, or filtered TD-CRI to sensing transmitter 504. Sensing receiver 502 may send a CRI transmission message including the channel state measurement (i.e., channel state information, TD-CRI, or filtered TD-CRI) to networked device 506.

Some embodiments of the present disclosure as described above define sensing message types for Wi-Fi sensing, namely, sensing configuration message and sensing configuration response message. In an example, the sensing configuration message and the sensing configuration response message are carried in a new extension to a management frame of a type described in IEEE 802.11. FIG. 6 illustrates an example of a component of a management frame 600 carrying a sensing transmission. In an example, system 500 may require acknowledgement frames and the management frame carrying sensing messages may be implemented as an Action frame and in another example, system 500 may not require acknowledgement frames, and the management frame carrying sensing messages may be implemented as an Action No Ack frame.

In an implementation, the information content of all sensing message types may be carried in a format as shown in FIG. 6. In some examples, Transmission Configuration, Timing Configuration, Steering Matrix Configuration, and TD-CRI configuration as described in FIG. 6 are implemented as IEEE 802.11 elements. In some examples, the TD-CRI Configuration element is a part of the Transmission Configuration element.

In one or more embodiments, the sensing message types may be identified by the message type field, and each sensing message type may carry the other identified elements, according to some embodiments. In an example, the data may be encoded into an element for inclusion in sensing messages between sensing receiver 502, sensing transmitter 504, and networked device 506. In a measurement campaign involving multiple sensing receivers and multiple sensing transmitters, these parameters may be defined for all sensing receivers-sensing transmitters pairs. In an example, when these parameters are transmitted from networked device 506 to sensing receiver 502, then these parameters configure sensing receiver 502 to process a sensing transmission and calculate sensing measurements. In some examples, when these parameters are transmitted from sensing receiver 502 to networked device 506, then these parameters report the configuration used by sensing receiver 502.

Figures 7A, 7B:
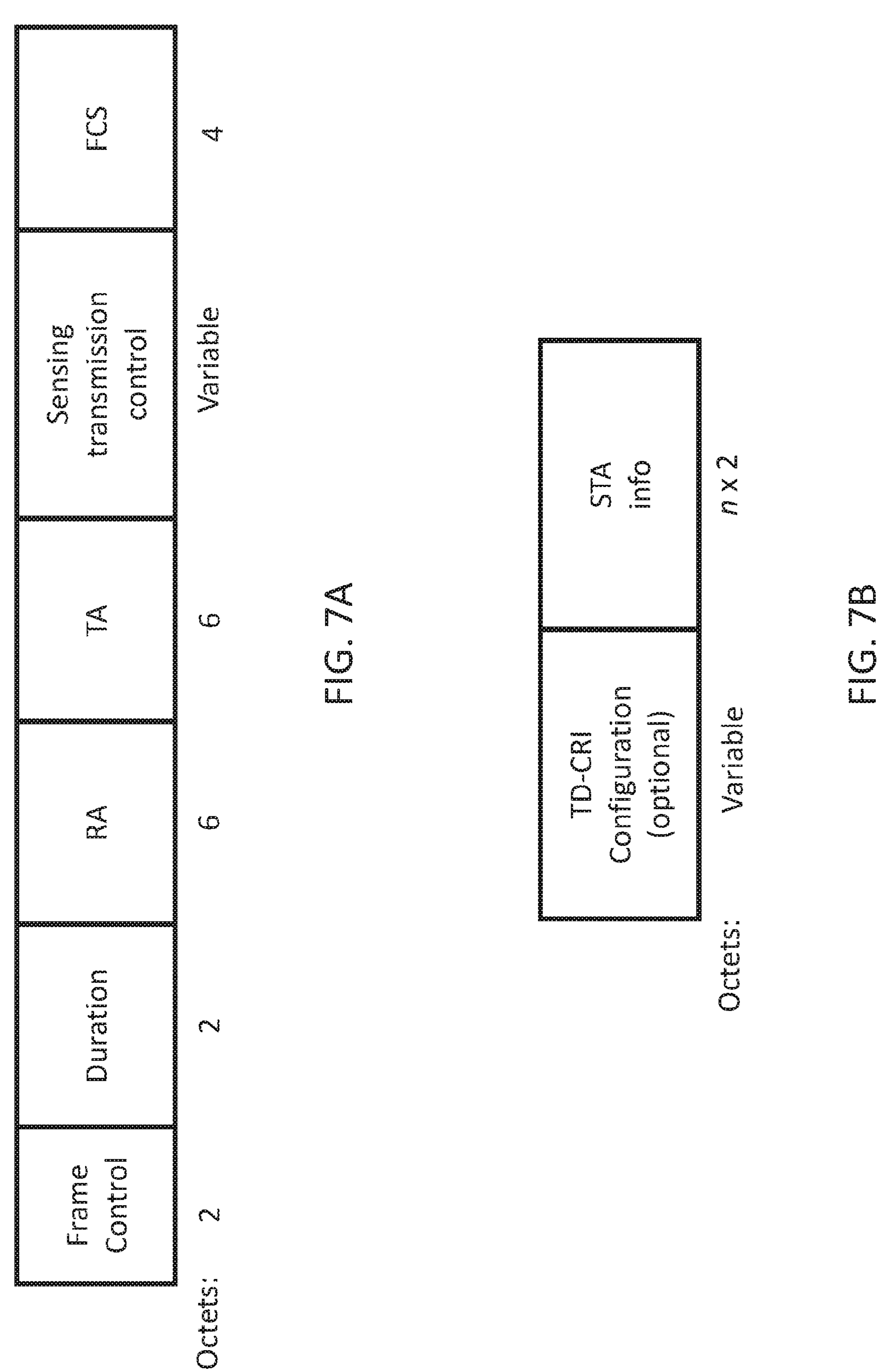
FIG. 7A illustrates an example of a format of a control frame and FIG. 7B illustrates a format of a sensing transmission announcement control field of the control frame, according to some embodiments.

According to some implementations, a sensing transmission announcement may be carried in a new extension to a control frame of a type described in IEEE 802.11. In some implementations, the sensing transmission announcement may be carried in a new extension to a control frame extension described in IEEE 802.11. FIG. 7A illustrates an example of a format of control frame 700 and FIG. 7B illustrates a format of a sensing transmission control field of control frame 700. In an example, the STA info field of the sensing transmission control field may address up to n sensing receivers via their association ID (AID). In an example implementation, the sensing transmission announcement may address n sensing receivers that are required to make a sensing measurement and to relay channel representation information back to the sensing initiator.

Figures 8A, 8B:
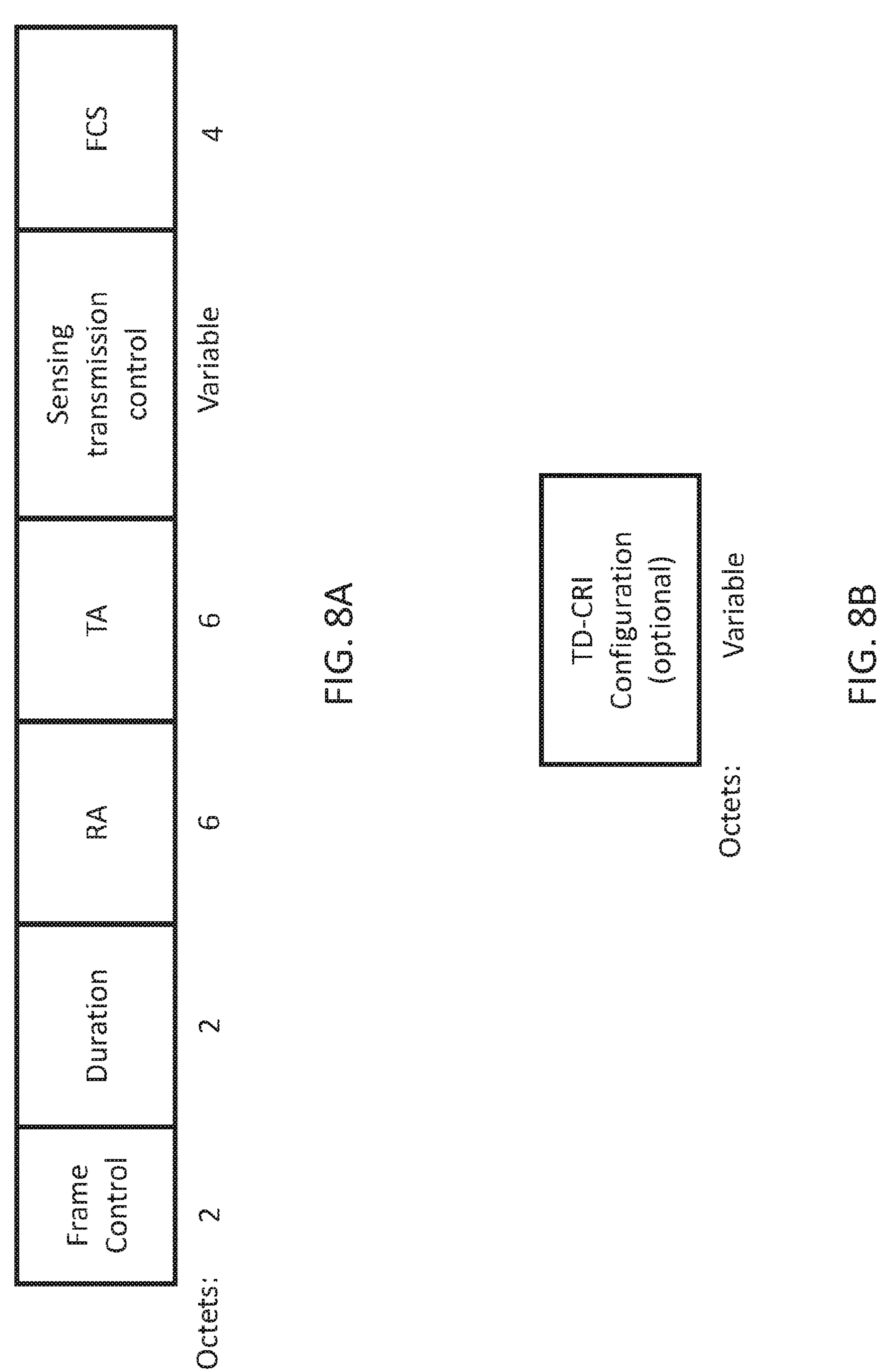
FIG. 8A illustrates another example of a format of a control frame and FIG. 8B illustrates a format of a sensing measurement control field of the control frame, according to some embodiments.

According to some implementations, the sensing measurement poll may be carried in a new extension to a control frame of a type described in IEEE 802.11. In some implementations, the sensing measurement poll may be carried in a new extension to a control frame extension described in IEEE 802.11. FIG. 8A illustrates an example of a format of control frame 800 and FIG. 8B illustrates a format of a sensing measurement control field of control frame 800.

According to some implementations, when sensing receiver 502 has calculated sensing measurements and created channel representation information (for example, in a form of TD-CRI), the sensing receiver 502 may be required to communicate the channel representation information to sensing transmitter 504 or networked device 506. In an example, the TD-CRI may be transferred by a management frame. In an example, a message type may be defined, which represents a CRI transmission message.

Figure 9:
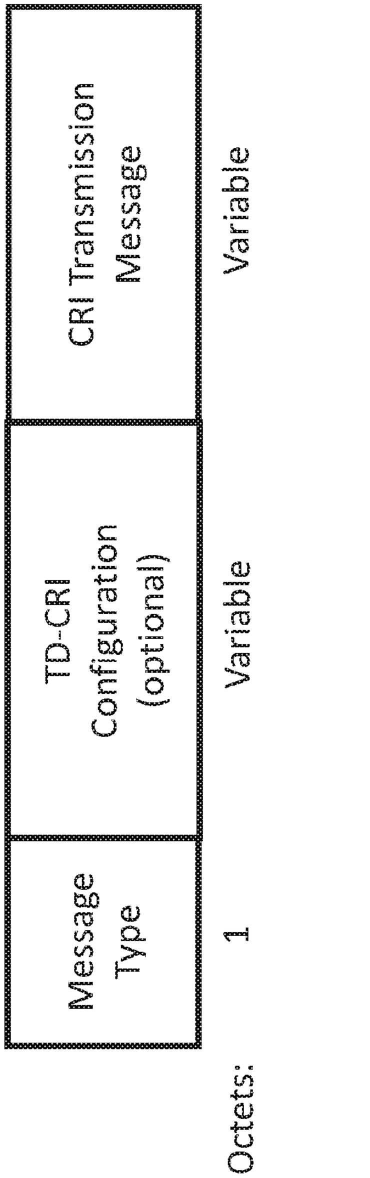
FIG. 9 illustrates a management frame carrying a CRI transmission message, according to some embodiments.

FIG. 9 illustrates an example of a component of a management frame 900 carrying a CRI transmission message, according to some embodiments. In an example, system 500 may require acknowledgement frames, and the management frame carrying the CRI transmission message may be implemented as an Action frame, and in another example, system 500 may not require acknowledgement frames, and the management frame carrying the CRI transmission message may be implemented as an Action No Ack frame.

In an implementation, when networked device 506 is implemented on a separate device (i.e., is not implemented within sensing receiver 502 or sensing transmitter 504), a management frame may not be necessary, and the TD-CRI may be encapsulated in a standard IEEE 802.11 data frame and transferred to networked device 506. In an example, a proprietary header or descriptor may be added to the data structure to allow networked device 506 to detect that the data structure is of the form of a CRI transmission message Element. In an example, data may be transferred in the format shown in FIG. 9 and networked device 506 may be configured to interpret the Message Type value that represents a CRI transmission message Element.

C. Utilizing Cross-Correlation of Time Domain Signals to Detect Motion Proximity The present disclosure generally relates to methods and systems for Wi-Fi sensing. In particular, the present disclosure relates to methods and systems for utilizing cross-correlation of time domain signals to detect motion proximity.

Currently, a Wi-Fi sensing system can detect the motion of an object in a sensing space between a sensing transmitter and a sensing receiver. However, the Wi-Fi sensing system cannot determine how far the motion is from the sensing transmitter or the sensing receiver. In certain situations or applications, proximity information of the motion of the object traversing the sensing space may be helpful, such as for home monitoring, assisted living, security monitoring, etc. For example, if the sensing transmitter is a Wi-Fi enabled television and if it is possible to know when the path of motion of a person is passing close to the sensing transmitter (i.e., the television), the television could use this knowledge to turn itself ON. However, if the motion was not in close proximity to the television, the television should not be able to turn itself ON. Existing Wi-fi sensing systems do not have the capability to determine if motion of an object is near a sensing transmitter (or a sensing receiver) or far from the sensing transmitter (or the sensing receiver).

The present disclosure describes a solution to determine if a motion of an object is near a sensing transmitter (or a sensing receiver) or far from the sensing transmitter (or the sensing receiver) by application of channel state information processing in time domain. In an implementation, reflections of time domain pulses between the sensing transmitter and the sensing receiver may result in a multipath signal at the sensing receiver, with received reflected time domain pulses having different amplitudes and time delays at the sensing receiver. In wireless telecommunications, multipath is a propagation phenomenon that results in radio signals reaching receiving antennas by two or more paths. In an example, causes of multipath include atmospheric ducting, ionospheric reflection and refraction, and reflection from water bodies and terrestrial objects such as mountains and buildings.

In an implementation, an object travelling at approximately a constant velocity traversing the reflected time domain pulses, following paths of motion, may cause amplitude attenuation of the reflected time domain pulses when the object blocks the reflection paths of the time domain pulses. The time between the attenuation of a first reflected time domain pulse and a last reflected time domain pulse may be referred to as a near-far indicator. According to an implementation, determining where a near-far indicator falls between a minimum near-far indicator and a maximum near-far indicator in a sensing space may serve as an estimate of the relative proximity of the path of motion of the object in the sensing space between the sensing transmitter (or the sensing receiver) and the middle of the sensing space.

Referring to FIG. 5, according to one or more implementations, for the purpose of Wi-Fi sensing, sensing receiver 502, sensing transmitter 504, or networked device 506 may initiate a measurement campaign (or a Wi-Fi sensing session). In the measurement campaign, exchange of transmissions between sensing transmitter 504 and sensing receiver 502 may occur. In an example, control of these transmissions may be by the MAC layer of the IEEE 802.11 stack.

According to an example implementation, sensing receiver 502, sensing transmitter 504, or networked device 506 may initiate the measurement campaign via one or more sensing trigger messages. In an implementation, sensing agent 516 or sensing algorithm 536 may be configured to generate a sensing trigger message configured to trigger a plurality of sensing transmissions from sensing transmitter 504. In an example, the sensing trigger message may include a requested transmission configuration field. Other examples of information/data included in the sensing trigger message that are not discussed here are contemplated herein. According to an implementation, sensing agent 516 or sensing algorithm 536 may transmit the sensing trigger message to sensing transmitter 504. In an implementation, sensing agent 516 or sensing algorithm 536 may transmit the sensing trigger message to sensing transmitter 504 via transmitting antenna 512 or transmitting antenna 532 to trigger the plurality of sensing transmissions from sensing transmitter 504. In an example, the plurality of sensing transmissions may include at least a first sensing transmission and a second sensing transmission.

Sensing transmitter 504 may be configured to receive the sensing trigger message from sensing receiver 502 or networked device 506 via receiving antenna 524. In response to receiving the sensing trigger message, sensing transmitter 504 may generate the plurality of sensing transmissions. In an example, each of the plurality of sensing transmissions that the sensing trigger message triggers from sensing transmitter 504 may be a sensing response message. In an implementation, sensing transmitter 504 may generate the plurality of sensing transmissions using the requested transmission configuration. In an implementation, sensing transmitter 504 may transmit the plurality of sensing transmissions to sensing receiver 502 in response to the sensing trigger message and in accordance with the requested transmission configuration. In an implementation, sensing transmitter 504 may transmit the plurality of sensing transmissions to sensing receiver 502 via transmitting antenna 522.

In an implementation, sensing receiver 502 may receive the plurality of sensing transmissions from sensing transmitter 504 transmitted in response to the sensing trigger message. Sensing receiver 502 may be configured to receive the plurality of sensing transmissions from sensing transmitter 504 via receiving antenna 514. According to an implementation, sensing agent 516 may be configured to generate a plurality of sensing measurements based on the plurality of sensing transmissions received from sensing transmitter 504. Further, sensing agent 516 may be configured to determine a plurality of channel representation information based on the plurality of sensing measurements. As described earlier, the plurality of sensing transmissions may include the first sensing transmission and the second sensing transmission. In an implementation, sensing agent 516 may be configured to generate a first sensing measurement and a second sensing measurement based on the first sensing transmission and the second sensing transmission, respectively. Further, sensing agent 516 may be configured to determine first channel representation information based on the first sensing measurement and second channel representation information based on the second sensing measurement.

In an implementation, the first channel representation information may include at least one of channel state information, a full time-domain channel representation information (TD-CRI), and a filtered TD-CRI. In an example implementation, sensing agent 516 may calculate frequency domain channel state information based on the first sensing measurement. In an example, the frequency domain channel state information may be calculated by a baseband processor in sensing receiver 502 as a part of the normal signal processing that takes place when the first sensing transmission is received. In an implementation, sensing agent 516 may calculate the full TD-CRI based on the channel state information. In an example implementation, sensing agent 516 may calculate the TD-CRI using an inverse Fourier transform, such as an inverse discrete Fourier transform (IDFT) or an inverse fast Fourier transform (IFFT). In an implementation, the TD-CRI may include the same information of the channel representation as the channel state information. However, this information is typically concentrated in only a few time domain pulses. In examples, if the time domain pulses that do not carry information are not considered, this means that the CRI can be represented with fewer data by only considering the time domain pulses that are needed. Such CRI may be referred to as filtered TD-CRI. According to an implementation, sensing agent 516 may calculate the filtered TD-CRI by retaining the time domain pulses that have an amplitude (interchangeably referred to as a base amplitude) that is greater than a minimum threshold $A_{min}$. Other examples of techniques/methods for calculation of the filtered TD-CRI that are not discussed here are contemplated herein. Similarly, the second channel representation information may include at least one of channel state information, a full TD-CRI, and a filtered TD-CRI.

According to an implementation, sensing agent 516 may transmit the plurality of channel representation information to networked device 506 or sensing transmitter 504. In an example, sensing agent 516 may transmit the plurality of channel representation information to networked device 506 via a MAC layer primitive, for example, an MILME primitive. In some implementations, sensing agent 516 may communicate the plurality of channel representation information to networked device 506 via a channel representation information (CRI) transmission message. In an example, the plurality of channel representation information may include at least the first channel representation information and the second channel representation information. According to an implementation, sensing agent 516 may transmit the CRI transmission message to networked device 506 via transmitting antenna 512.

In the time domain, a transmission channel may be referred to as h(t). The transmission channel may also be described as an impulse response of the transmission channel. The impulse response of the transmission channel may include a plurality of time domain pulses. The plurality of time domain pulses may represent reflections that transmitted signals (for example, those transmitted by a transmitter) underwent before reaching a receiver. A reflected time domain pulse may be represented as:

$$h(t_k) = \alpha_k \delta(t - t_k) \tag{8}$$

where, $t_k$ represents a time delay of when the reflected time domain pulse reached the receiver in comparison to a line-of-sight time domain pulse which was not reflected and $\alpha_k$ is a complex value that represents frequency independent attenuation and phase of the reflected time domain pulse.

Figure 10:
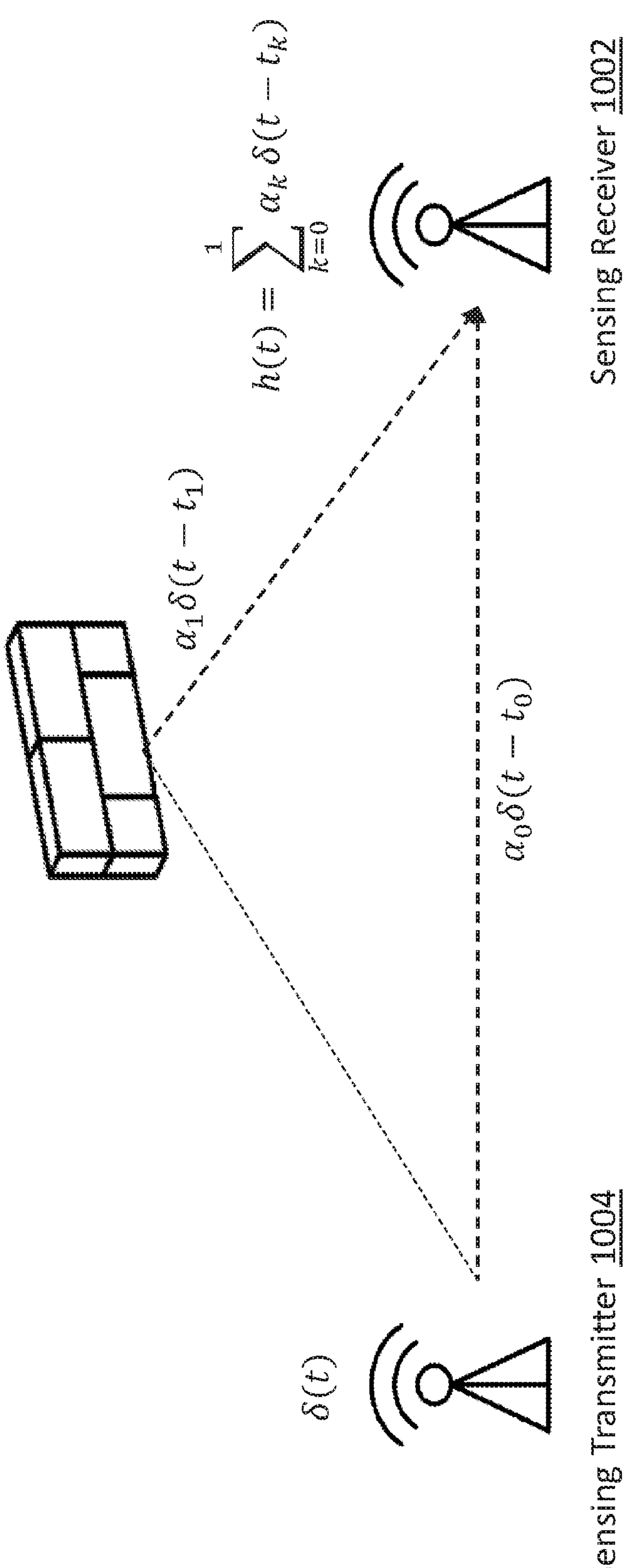
FIG. 10 depicts an example representation of a transmission channel, which includes a direct signal path and a single multipath, according to some embodiments.

FIG. 10 depicts example representation 1000 of an over-the-air transmission channel, which includes a direct signal path and a single multipath, according to some embodiments. In an implementation, FIG. 10 depicts discrete multipaths of a time domain pulse δ(t) between sensing transmitter 1004 and sensing receiver 1002 according to some embodiments. In FIG. 10, a direct path signal is represented as:

$$h(t_0) = \alpha_0 \delta(t - t_0) \tag{9}$$

and a first reflected time domain pulse is represented as:

$$h(t_1) = \alpha_1 \delta(t - t_1) \quad (10)$$

The time domain pulse δ(t) undergoes a single reflection in addition to its line-of-sight path. The line-of-sight time domain pulse transmission time may be incorporated into the complex coefficient $\alpha_0$ (i.e., $t_0$=0). The reflected time domain pulse may experience a delay of $t_1$ which represents the amount of time after the line-of-sight time domain pulse is received that the reflected time domain pulse is received.

In an implementation, if a number of discrete multipaths are given by LP, then the received multipath time domain pulse may be represented as:

$$h(t) = \sum_{k=0}^{L_p} \alpha_k \delta(t - t_k) \quad (11)$$

The Equation (11) indicates that the transmission channel includes a number of time domain pulses each of which may experience a different time delay. A time domain pulse from amongst the time domain pulses may be determined to be a line-of-sight time domain pulse. Further, each time domain pulse may have a frequency independent amplitude and phase component (referred to as the complex coefficient), and all except the line-of-sight time domain pulse may experience a time delay due to reflections, which contributes a frequency dependent component to the complex coefficient.

Figure 11A:
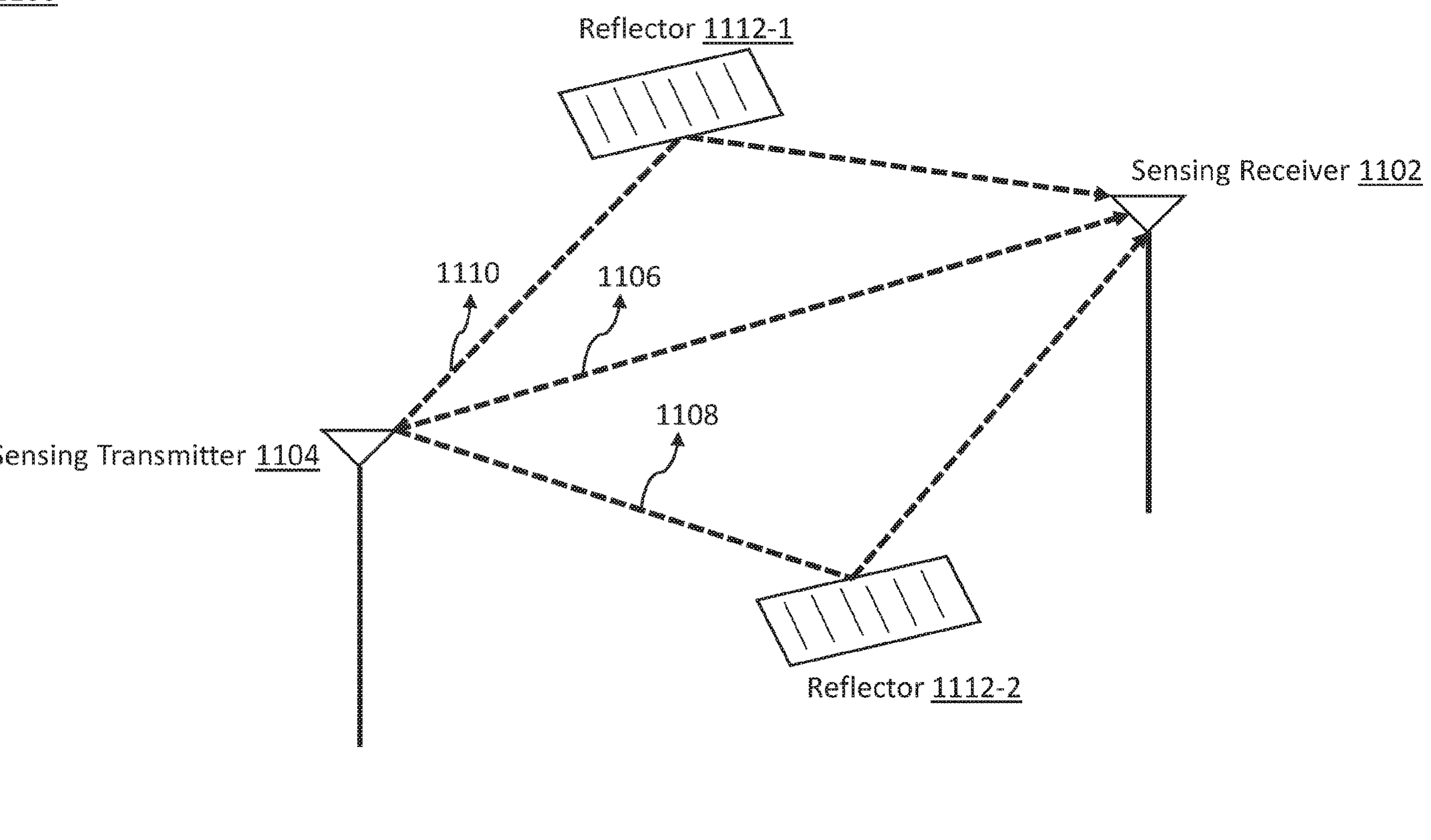
FIG. 11A depicts an example representation of propagation paths between a sensing transmitter and a sensing receiver and FIG. 11B depicts an example representation of amplitudes and time delays of the propagation paths, according to some embodiments.

A wireless signal may propagate between a sensing transmitter and a sensing receiver in a transmission channel where there may be multiple propagation paths due to reflections in the transmission channel. FIG. 11A depicts an example representation of three propagation paths (i.e., three time domain pulses) between sensing transmitter 1104 and sensing receiver 1102, according to some embodiments. In an example, the three time domain pulses include a line-of-sight time domain pulse (represented by reference number 1106), a first reflected time domain pulse (represented by reference number 1108), and a second reflected time domain pulse (represented by reference number 1110). As described in FIG. 11A, the multipath propagation path is caused due to reflectors (first reflector 1112-1 and second reflector 1112-2) in the transmission channel. In an implementation, the line-of-sight time domain pulse may reach sensing receiver 1102 before the first reflected time domain pulse and the second reflected time domain pulse. As previously described, the line-of-sight time domain pulse transmission time is incorporated into the complex coefficient $\alpha_0$. Accordingly, the delay of the line-of-sight time domain pulse may be considered equal to zero (i.e., to =0). Each of the first reflected time domain pulse and the second reflected time domain pulse may experience a time delay with respect to the line-of-sight time domain pulse. Further, each of the first reflected time domain pulse and the second reflected time domain pulse may also experience some attenuation relative to the line-of-sight time domain pulse amplitude. In an example implementation, the time domain representation of the multipath signal as shown in FIG. 11A may be mathematically represented as:

$$h(t) = \sum_{k=0}^{2} \alpha_k \delta(t - t_k) = \alpha_0 \delta(t) + \alpha_1 \delta(t - t_1) + \alpha_2 \delta(t - t_2) \quad (12)$$

where $t_1$ represents a time delay of the first reflected time domain pulse and $t_2$ represents a time delay of the second reflected time domain pulse, and where $t_1>0$ and $t_2>0$.

Figure 11B:
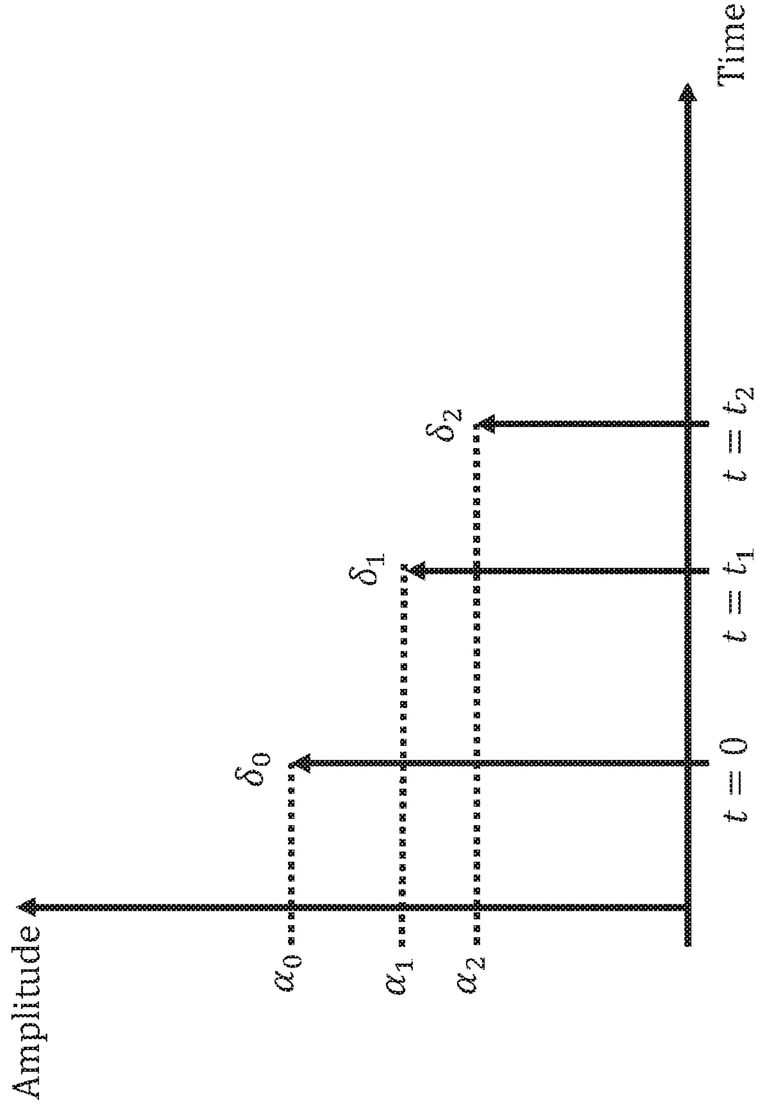

In an implementation, the complex coefficient ($\alpha_k$) of each of the line-of-sight time domain pulse, the first reflected time domain pulse, and the second reflected time domain pulse of the multipath time domain signal may be processed to determine the amplitude of each of the line-of-sight time domain pulse, the first reflected time domain pulse, and the second reflected time domain pulse. FIG. 11B depicts example representation 1100 of amplitudes and time delays of the three propagation paths (i.e., the line-of-sight time domain pulse, the first reflected time domain pulse, and the second reflected time domain pulse), according to some embodiments. In FIG. 11B, $\alpha_0$ represents the complex coefficient of the line-of-sight time domain pulse, al represents the complex coefficient of the first reflected time domain pulse, and $\alpha_2$ represents the complex coefficient of the second reflected time domain pulse. For ease of explanation and understanding, the description provided above is with reference to three time domain pulses, however, the description is equally applicable to more than three time domain pulses.

For ease of explanation and understanding, the remainder of the description provided in the present disclosure is based on the assumption that the path of motion in a transmission channel traverses the reflected time domain pulses between a sensing transmitter and a sensing receiver. This assumption is realistic because the overall width of the transmitted signal and its reflected time domain pulses in a sensing space is likely to be small with respect to the movement of an object, in particular for IEEE 802.11n and later versions of IEEE 802.11, where beamforming is used. The present disclosure is based on the assumption that typical velocities of motion inside an indoor environment will be within a narrow range (e.g., the range of walking speeds will be 1 m/s to 3 m/s) or even be assumed constant (e.g., around 1.5 m/s). The assumption of near constant velocity of an object along a path of motion that traverses a transmitted signal and its reflected time domain pulses in a sensing space enables system 500 to train itself to recognize relative proximities of motion paths in the sensing space, with respect to the distance from a sensing transmitter or a sensing receiver to the middle of the transmission path. In an example, two objects moving along the same path of motion at different velocities will traverse the reflected time domain pulses at different speeds, and therefore it may not be possible to use the time lag between the time domain pulse attenuations to determine the proximity of the path of motion to the sensing transmitter or the sensing receiver. Other techniques may be used in such cases to estimate the velocity of an object's movement in a sensing space, and these techniques may be combined with the techniques described in the present disclosure to separate the time lag impacts due to velocity of the object's movement in the sensing space from the time lag impacts due to the proximity of the object's movement path to a sensing transmitter (or sensing receiver).

In examples, the physical separation between a sensing transmitter and a sensing receiver may be 5 meters or greater (around 3 times the height of human) to provide a meaningful indication of proximity of motion. In general, the techniques described in the present disclosure will be able to provide a more useful distinction of proximity of motion between the sensing transmitter and the sensing receiver when the physical separation between the sensing transmitter and sensing receiver is larger than in the case where there is a shorter separation distance between the sensing transmitter and the sensing receiver.

Figure 12A:
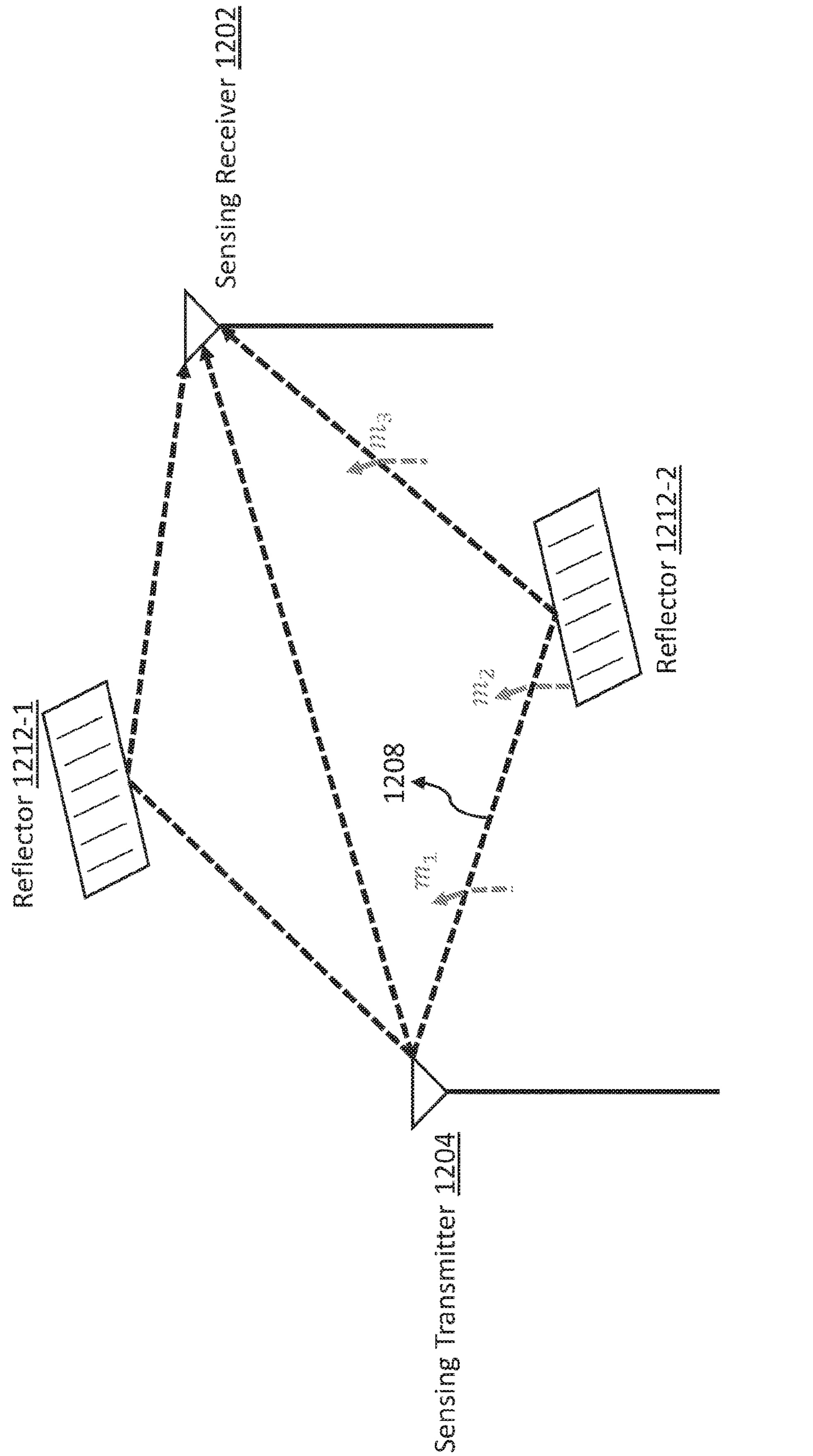
FIG. 12A depicts paths of motion of an object in a transmission channel traversing a reflected time domain pulse of a multipath time domain signal, according to some embodiments.
Figure 12B:
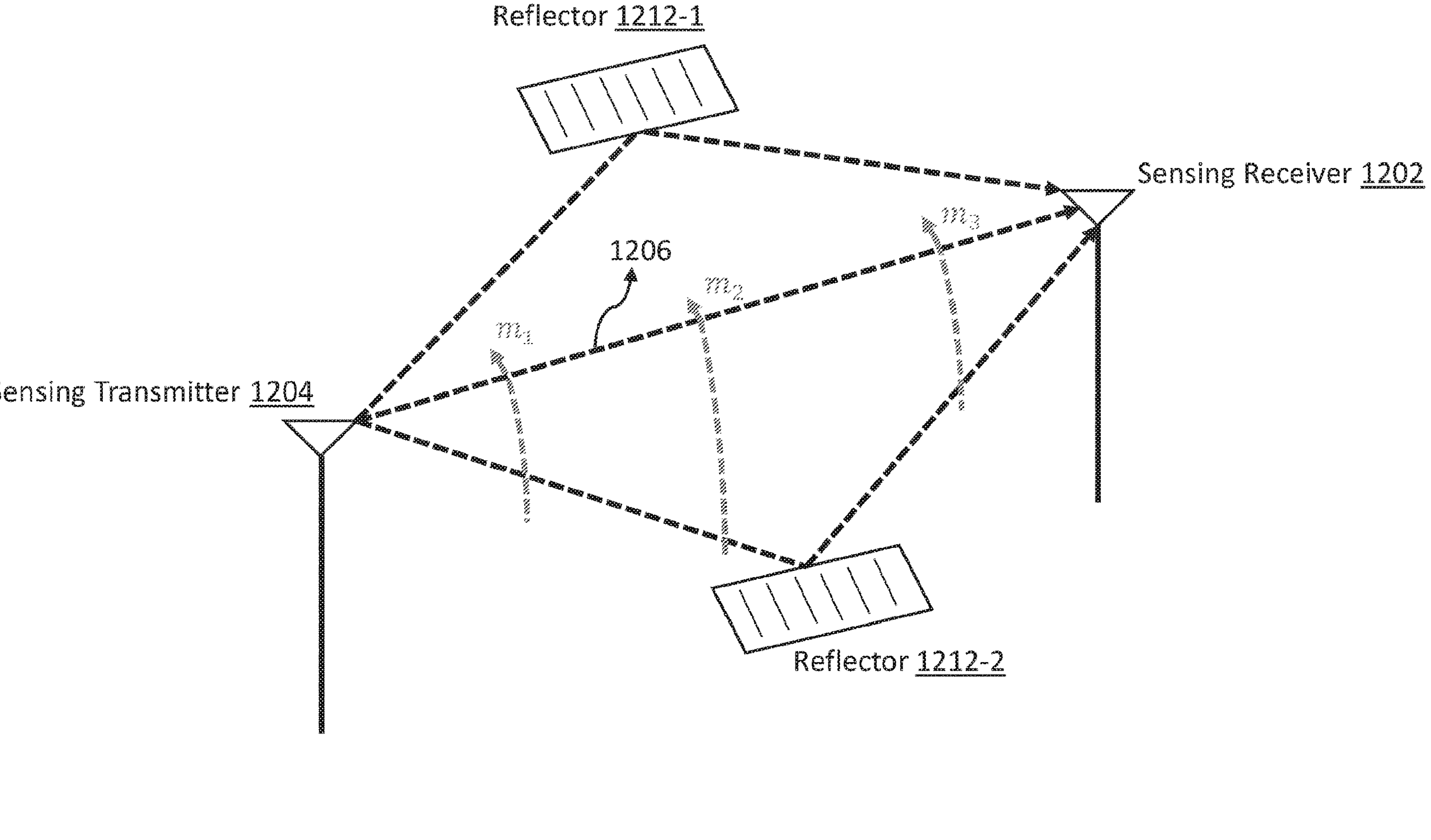
FIG. 12B depicts paths of motion of the object in the transmission channel traversing a line-of-sight time domain pulse of the multipath time domain signal, according to some embodiments.
Figure 12C:
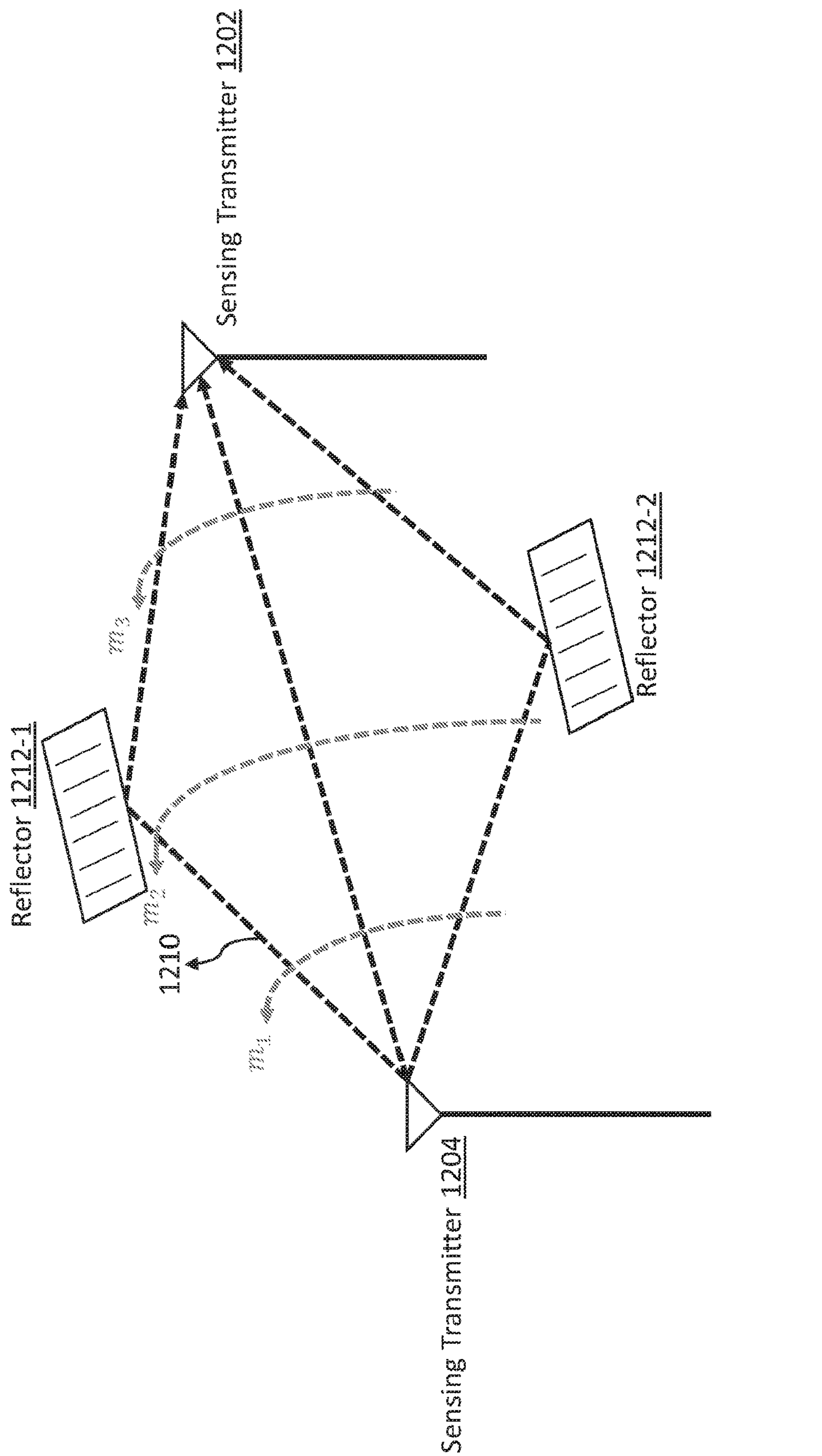
FIG. 12C depicts paths of motion of the object in the transmission channel traversing another reflected time domain pulse of the multipath time domain signal, according to some embodiments.

FIG. 12A, FIG. 12B, and FIG. 12C depict example representation 1200 of three possible paths of motion of an object in a transmission channel which traverse a line-of-sight time domain pulse and two reflected time domain pulses (a first reflected time domain pulse and a second reflected time domain pulse) of a multipath time domain signal. The motion of the object will traverse the propagation paths of the line-of-sight time domain pulse and the two reflected time domain pulses at different times as it moves across the transmission channel. In particular, FIG. 12A depicts three possible paths of motion of the object in the transmission channel traversing the first reflected time domain pulse (represented by reference number 1208). As described in FIG. 12A, three possible paths of motion enter the transmission channel from one side of the sensing space, traversing the first reflected time domain pulse. The three paths of motion include a first path of motion ($m_1$), a second path of motion ($m_2$), and a third path of motion ($m_3$). Further, FIG. 12B depicts three possible paths of motion of the object (i.e., the first path of motion ($m_1$), the second path of motion ($m_2$), and the third path of motion ($m_3$)) traversing the line-of-sight time domain pulse (represented by reference number 1206) and FIG. 12C depicts three possible paths of motion of the object (i.e., the first path of motion ($m_1$), the second path of motion ($m_2$), and the third path of motion ($m_3$)) traversing the second reflected time domain pulse (represented by reference number 1210).

As shown in FIG. 12A, FIG. 12B, and FIG. 12C, the physical distance between the propagation paths of the line-of-sight time domain pulse, the first reflected time domain pulse, and the second reflected time domain pulse that the paths of motion traverses differ depending on how far the path of motion is from either end of the transmission channel. For example, the first path of motion shown in FIG. 12A, FIG. 12B, and FIG. 12C is close to sensing transmitter 1204 where the distance between the propagation paths of each of the line-of-sight time domain pulse, the first reflected time domain pulse, and the second reflected time domain pulse is less. As a result, it takes less time for the object on the first path of motion ($m_1$) to traverse the propagation paths. In contrast, the second path of motion ($m_2$) shown in FIG. 12A, FIG. 12B, and FIG. 12C is close to first reflector 1212-1 and second reflector 1212-2 in the middle of the transmission channel between sensing transmitter 1204 and sensing receiver 1202, where the distance between the propagation paths of each of the line-of-sight time domain pulse, the first reflected time domain pulse, and the second reflected time domain pulse is more. As a result, it takes more time for the object on the second path of motion ($m_2$) to traverse the propagation paths.

Figure 13:
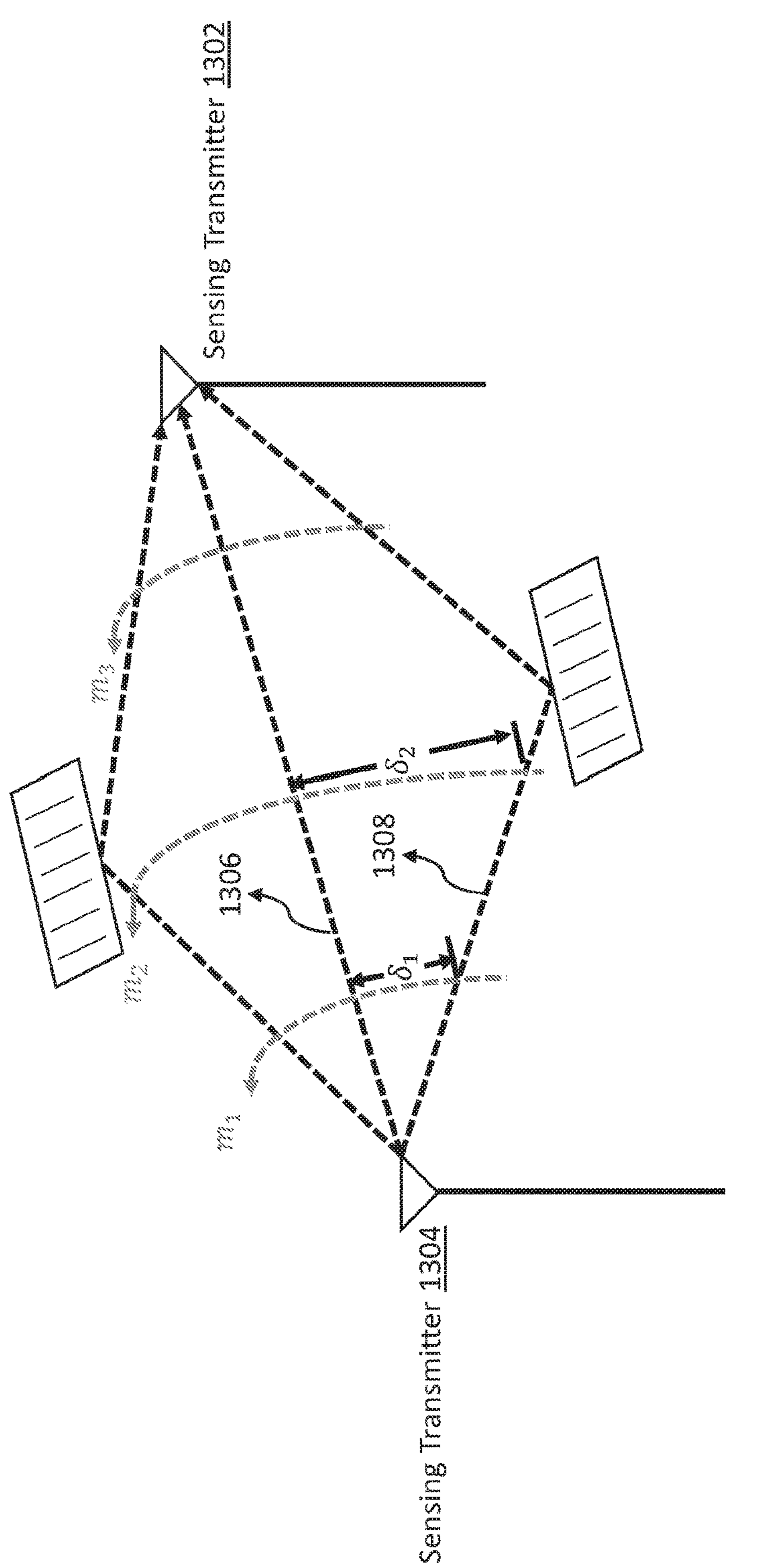
FIG. 13 depicts time difference between different paths of motion of an object traversing a reflected time domain pulse and a line-of-sight time domain pulse, according to some embodiments.

FIG. 13 depicts example representation 1300 of time difference between different paths of motion of an object traversing a line-of-sight time domain pulse (represented by reference number 1306) and a first reflected time domain pulse (represented by reference number 1308) between sensing transmitter 1304 and sensing receiver 1302, according to some embodiments. In FIG. 13, (1 is the time difference between when the object on the first path of motion ($m_1$) traverses the first reflected time domain pulse and the object on the first path of motion ($m_1$) traverses the line-of-sight time domain pulse. Further, $\delta_2$ represents the time difference between when the object on the second path of motion ($m_2$) traverses the first reflected time domain pulse and when the object on the second path of motion ($m_2$) traverses the line-of-sight time domain pulse. As is shown in FIG. 13, $\delta_2>\delta_1$.

Figure 14A:
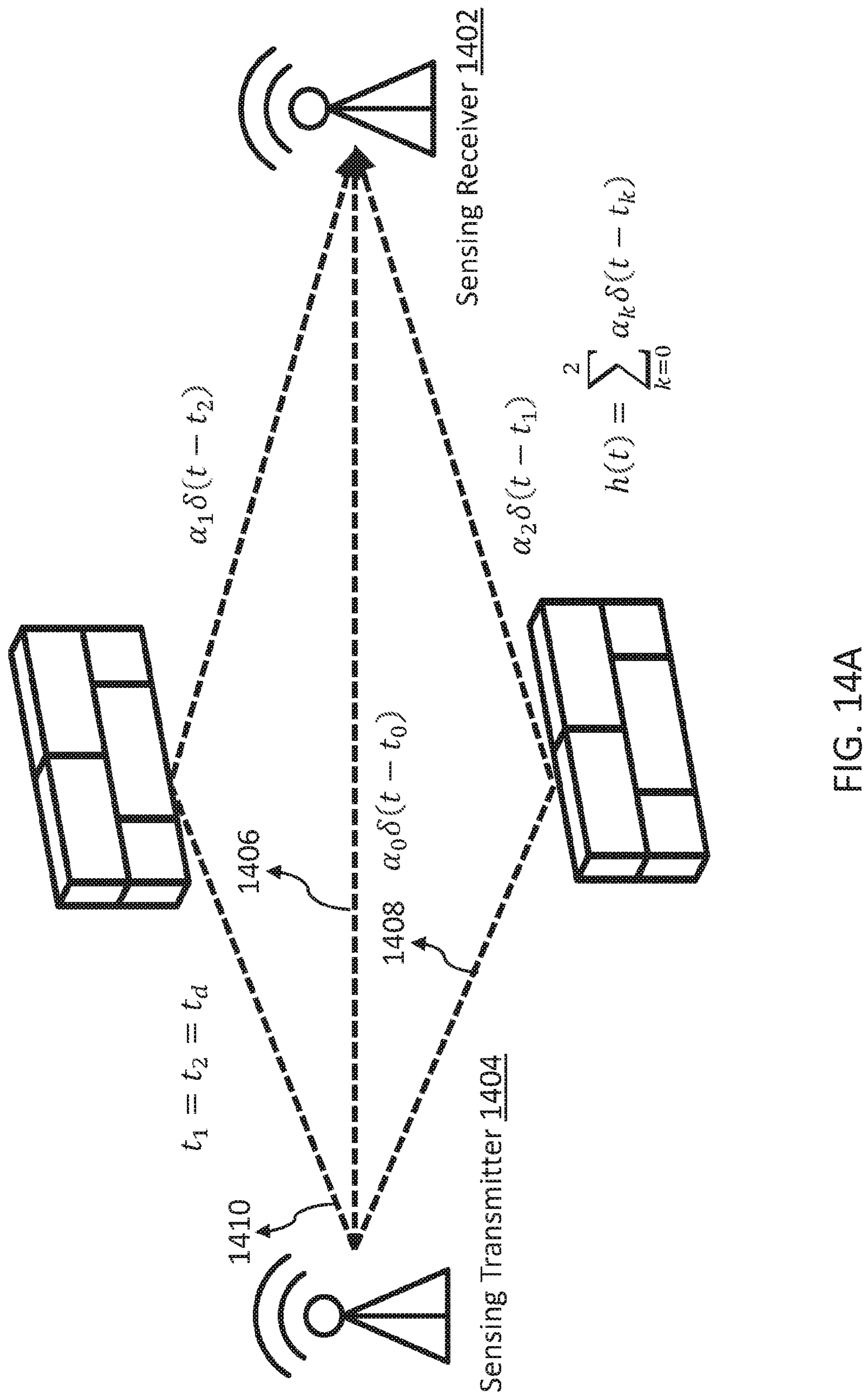
FIG. 14A depicts a multipath signal with time domain pulses that have same time delay, according to some embodiments.

In an example implementation, it may be possible that reflected time domain pulses arrive at a sensing receiver at the same time (i.e., with the same propagation delay) even though they may have undergone a different reflection path. FIG. 14A depicts a multipath signal between sensing transmitter 1404 and sensing receiver 1402 with time domain pulses that have same time delay. As shown in FIG. 14A, a line-of-sight time domain pulse (represented by reference number 1406), a first reflected time domain pulse (represented by reference number 1408) and a second reflected time domain pulse (represented by reference number 1410) are modelled, where the first reflected time domain pulse and the second reflected time domain pulse undergo transmission delays $t_1$ and $t_2$, respectively, where $t_1=t_2=t_d$. In this situation, the time domain representation of the multipath signal given by Equation (11) may be mathematically expressed as below.

$$h(t)=\sum_{k=0}^{2}\alpha_k\delta(t-t_k)=\alpha_0\delta(t)+\alpha_1\delta(t-t_d)+\alpha_2\delta(t-t_d) \qquad (13)$$

Figure 14B:
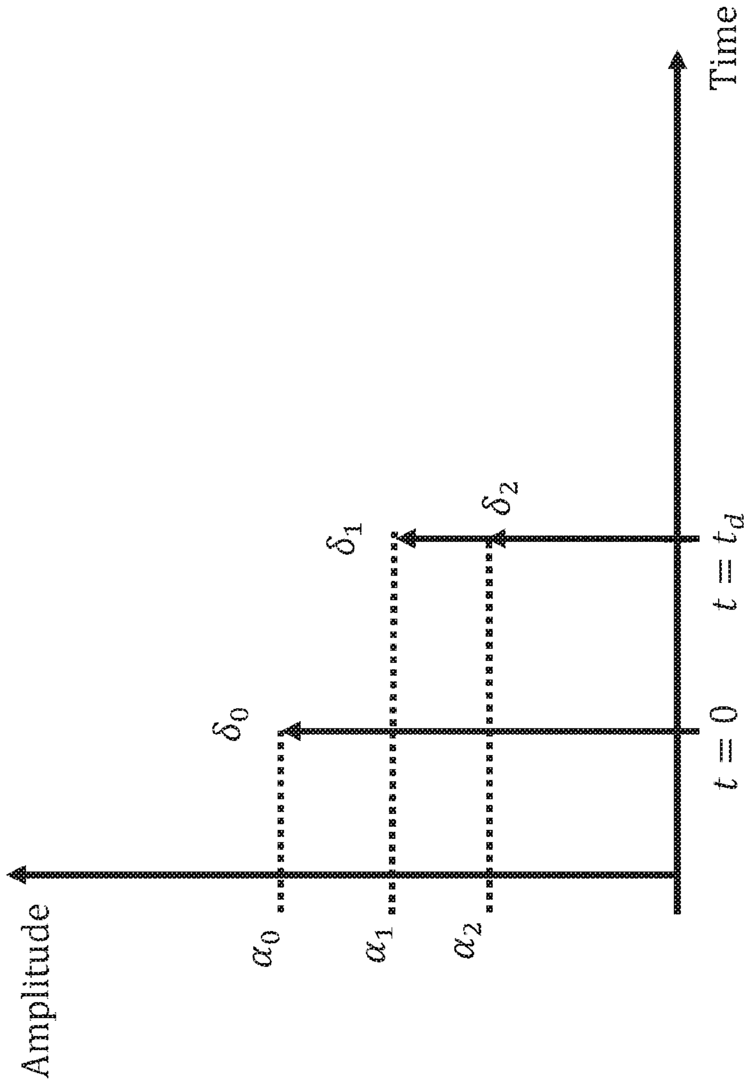
FIG. 14B depicts an example representation of amplitudes and time delays of the time domain pulses that have same time delay, according to some embodiments.
Figure 14C:
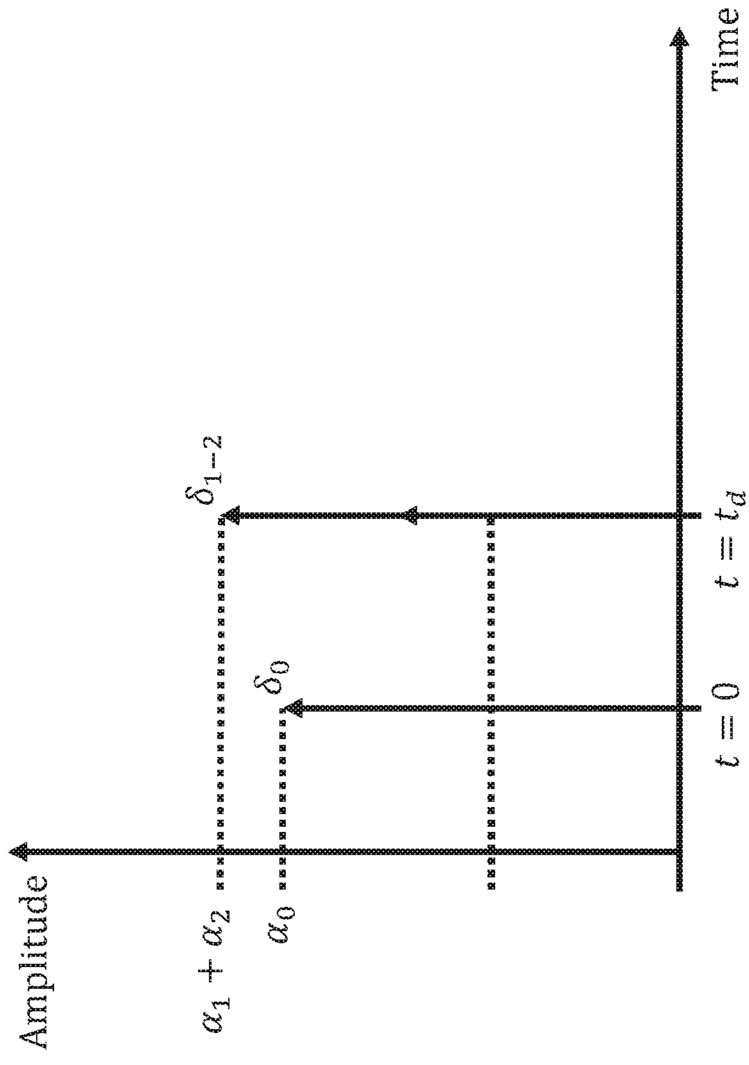
FIG. 14C depicts combined amplitude of two reflected time domain pulses that have the same time delay, according to some embodiments.

FIG. 14B depicts an example representation of amplitudes and time delays of the line-of-sight time domain pulse, the first reflected time domain pulse, and the second reflected time domain pulse as modeled in FIG. 14A. At sensing receiver 1402, only one time domain impulse at $t=t_d$ will be detected as sensing receiver 1402 may not be able to determine that the signal power received at $t=t_d$ is the result of a combination of more than one reflected time domain pulse. Accordingly, sensing receiver 1402 may treat this as a single reflected time domain pulse. FIG. 14C depicts combined amplitude of two reflected time domain pulses (i.e., the first reflected time domain pulse and the second reflected time domain pulse) as seen by sensing receiver 1404. In an implementation, sensing receiver 1402 may sense the line-of-sight time domain pulse and a single reflected time domain pulse of an amplitude that is a combination of the amplitudes of the two reflected time domain pulses with the same time delay $t=t_d$.

In an implementation, since the first reflected time domain pulse and the second reflected time domain pulse with the same time delay have taken a different path through the sensing space, the amplitude of each of the first reflected time domain pulse and the second reflected time domain pulse may be impacted by a motion path of an object at different times, causing the amplitude of the combined time domain pulse to decrease twice as the object follows its path of motion across the reflected time domain pulses. However, this situation is unlikely to be common as the probability that two reflected time domain pulses will arrive at exactly the same time delay is low. In an implementation, sensing receiver 1402 may handle this situation in different ways. In an example, if sensing receiver 1402 observes a reflected time domain pulse (i.e., where the time domain pulse is not a first time domain pulse to be observed by sensing receiver 1402, and therefore it is not the line-of-sight time delay pulse) with an amplitude that is greater than the amplitude of the line-of-sight time domain pulse, then sensing receiver 1402 may ignore this time domain pulse for the purposes of the proximity determination that is described later in the present disclosure. In some examples, sensing receiver 1402 may observe all reflected time domain pulses for amplitude attenuations continuously and if more than one amplitude attenuation of a reflected time domain pulse is observed, then sensing receiver 1402 may include both instances of amplitude attenuation in its determination of the proximity of the path of motion of an object traversing the sensing space, as will be described in more detail in the remainder of the present disclosure.

Referring back to FIG. 5, networked device 506 may receive the plurality of channel representation information from sensing receiver 502. According to an implementation, networked device 506 may receive the plurality of channel representation information from sensing receiver 502 via receiving antenna 534. As described earlier, the plurality of channel representation information may include at least the first channel representation information and the second channel representation information.

According to an implementation, sensing algorithm 536 may be configured to obtain a plurality of sets of time domain pulses from the plurality of channel representation information. In an example implementation, the plurality of sets of time domain pulses may be representative of a plurality of frames. In an example, the plurality of sets of time domain pulses may include at least a first set of time domain pulses and a second set of time domain pulses. In an implementation, sensing algorithm 536 may be configured to obtain the first set of time domain pulses from the first channel representation information and the second set of time domain pulses from the second channel representation information. In an example implementation, the first set of time domain pulses may be representative of a first frame and the second set of time domain pulses may be representative of a second frame.

According to an implementation, sensing algorithm 536 may be configured to store a table of corresponding time domain pulses in data storage 538. In an example implementation, each corresponding time domain pulse may be represented by a time delay and a base amplitude. In an example, the corresponding time domain pulses may include a line-of-sight time domain pulse and a plurality of reflected time domain pulses. Further, in an example, each time delay may be representative of a time between receipt of a line-of-sight time domain pulse and each corresponding time domain pulse. According to an implementation, each base amplitude may be normalized with respect to a line-of-sight time domain pulse base amplitude. According to some implementations, the base amplitude of each corresponding time domain pulse may be normalized using maximum base amplitude of all time domain pulse base amplitude values, i.e., $A_{max}=\max(\alpha_1, \alpha_2, \ldots, \alpha_n)$. In the example, each value of the time domain pulse base amplitudes may be divided by the maximum time domain pulse base amplitude.

$$\bar{\alpha}_n = \frac{\alpha_n}{\max(\alpha_1, \alpha_2, \ldots, \alpha_n)} \tag{14}$$

According to an implementation, sensing algorithm 536 may determine the line-of-sight time domain pulse as the time domain pulse that was detected by sensing algorithm 536 first with respect to time. In an implementation, sensing algorithm 536 may record base amplitude of the line-of-sight time domain pulse and assign a time delay value of "0" to the line-of-sight time domain pulse. Further, sensing algorithm 536 may determine base amplitude and time delay of the reflected time domain pulses. In an implementation, sensing algorithm 536 may assign an identifier index to each time domain pulse based on the time order in which each time domain pulse is received. In an example, the identifier index may get incremented according to increasing time delay, with the line-of-sight time domain pulse assigned the identifier index "0". In some examples, an identifier index may be a time delay of a reflected time domain pulse. In some implementations, sensing algorithm 536 may assign whole number identifier indexes to the reflected time domain pulses. According to an implementation, sensing algorithm 536 may store the table with the identifier indexes, the time delays, and the base amplitudes (or the normalized base amplitudes) of the corresponding time domain pulses, as illustrated in Table 1.

TABLE 1

Time delays and normalized base amplitudes of the time domain pulses

| Identifier Index | Time Delay (ms) | Normalized Base Amplitude |
|---|---|---|
| 0 | 0.00 | 1.00 |
| 1 | 0.85 | 0.82 |
| 2 | 1.50 | 0.70 |

In some implementations, sensing algorithm 536 may store the table with the identifier indexes and the base amplitudes (or the normalized base amplitudes) of the corresponding time domain pulses, where the identifier indexes are the time delays, as illustrated in Table 2.

TABLE 2

Time delays and normalized base amplitudes of the time domain pulses, where the identifier indexes are the time delays

| Identifier Index | Normalized Base Amplitude |
|---|---|
| 0.00 | 1.00 |
| 0.85 | 0.82 |
| 1.50 | 0.70 |

According to some implementations, instead of storing the base amplitudes of the time domain pulses, sensing algorithm 536 may store the power of the time domain pulses, or any other parameter which may represent signal strength of the time domain pulses. In an example, each time domain pulse may be represented as a function r of the parameters of the time domain pulse. A function representing the characteristics of a time domain pulse, where time delay of the time domain pulse is used as an identifier index for the time domain pulse is mathematically expressed below.

$$r(t, \alpha) \tag{15}$$

where, $r(t, \alpha)$ represents the time domain pulse, t represents time delay of the time domain pulse, and a represents base amplitude of the time domain pulse.

In some examples, each time domain pulse may be represented as a function r associated with the identifier index of the time domain pulse, for example where the time delay is not used as an identifier index. A function representing the characteristics of a time domain pulse, where the time domain pulse has an identifier index is mathematically expressed below.

$$r_1(t_1, \alpha_1) \quad (16)$$

where, $r_1(t_1, \alpha_1)$ represents the time domain pulse, $r_1$ represents identifier index of the time domain pulse, $t_1$ represents time delay of the time domain pulse, and $\alpha_1$ represents base amplitude of the time domain pulse.

According to an implementation, sensing algorithm 536 may monitor time domain pulses to detect an object moving into the sensing space. In an implementation, sensing algorithm 536 may be configured to detect a plurality of amplitude attenuations between selected time domain pulses of the plurality of sets of time domain pulses and respective corresponding time domain pulses from the stored table. In an example, a corresponding time domain pulse may be a received time domain pulse with the same time delay as a stored time domain pulse. According to an example, the time delay of the received time domain pulse and the time delay of the stored time domain pulse should be at a maximum difference from each other in order to be considered corresponding time domain pulses. In an implementation, to detect the plurality of amplitude attenuations between the selected time domain pulses and respective corresponding time domain pulses, sensing algorithm 536 may compare amplitude of each time domain pulse with a stored base amplitude for the corresponding time domain pulse.

According to an implementation, sensing algorithm 536 may be configured to select a first time domain pulse from amongst the first set of time domain pulses and a second time domain pulse from amongst the second set of time domain pulses. In an implementation, sensing algorithm 536 may be configured to detect a first amplitude attenuation between the first selected time domain pulse of the first set of time domain pulses and a first corresponding time domain pulse. Further, sensing algorithm 536 may be configured to detect a second amplitude attenuation between the second selected time domain pulse of the second set of time domain pulses and a second corresponding time domain pulse.

According to an implementation, to detect the first amplitude attenuation between the first selected time domain pulse of the first set of time domain pulses and the first corresponding time domain pulse, sensing algorithm 536 may identify correspondence between the first selected time domain pulse and the first corresponding time domain pulse according to a comparison of a first time delay of the first selected time domain pulse and a stored time delay of the first corresponding time domain pulse. Further, sensing algorithm 536 may compare an amplitude of the first selected time domain pulse to a stored base amplitude of the first corresponding time domain pulse. In an example, sensing algorithm 536 may compare the amplitude of the first selected time domain pulse according to its identifier index with the stored base amplitude of the first corresponding time domain pulse. In an implementation, responsive to the determination that the amplitude is less than the stored base amplitude by a threshold amount, sensing algorithm 536 may detect or determine that the first amplitude attenuation has occurred. According to an implementation, upon detecting the occurrence of the first amplitude attenuation, sensing algorithm 536 may record a first time stamp at which the first amplitude attenuation occurred or was observed. In an implementation, sensing algorithm 536 may also record the normalized amplitude of the first selected time domain pulse. In an example, sensing algorithm 536 may normalize the amplitude of the first selected time domain pulse using the same normalization factor that may be used to normalize the base amplitude of the corresponding time domain pulse.

In some implementations, upon detecting the occurrence of the first amplitude attenuation, sensing algorithm 536 may record a first time stamp at which the first amplitude attenuation occurred or was observed, and the normalize amplitude of the first selected time domain at the time amplitude attenuation was observed. In a similar manner, upon detecting the occurrence of the second amplitude attenuation, sensing algorithm 536 may record a second time stamp at which the second amplitude attenuation occurred or was observed.

An amplitude attenuation experienced by a time domain pulse with identifier index "1" at time "$t_a$" is illustrated in Table 3.

TABLE 3

Amplitude attenuation experienced by a time domain pulse with identifier index "1" at time "$t_a$"

| Identifier Index | Time Delay (ms) | Base Amplitude | Time Stamp | Amplitude |
|---|---|---|---|---|
| 0 | 0.00 | 1.00 | | |
| 1 | 0.85 | 0.82 | $t_a$ | 0.45 |
| 2 | 1.50 | 0.70 | | |

As described in Table 3, the time domain pulse with identifier index "1" experiences a decrease in amplitude at time stamp $t_a$.

According to some implementations, sensing algorithm 536 may detect a difference in amplitude for the same time domain pulse over more than one measurement instance. Sensing algorithm 536 may store the time stamp and the amplitude for each of the time domain pulse instances where the difference in amplitude between the time domain pulse and the base amplitude of the corresponding time domain pulse is greater than the threshold amount. An amplitude attenuation experienced by a time domain pulse with identifier index "1" beginning at time "$t_a$" and ending at time "$t_c$" is illustrated in Table 4.

TABLE 4

Amplitude attenuation experienced by a time domain pulse with identifier index "1" beginning at time "$t_a$" and ending at time "$t_c$"

| Identifier Index | Time Delay (ms) | Base Amplitude | Time Stamp | Amplitude | Time Stamp | Amplitude | Time Stamp | Amplitude |
|---|---|---|---|---|---|---|---|---|
| 0 | 0.00 | 1.00 | | | | | | |
| 1 | 0.85 | 0.82 | $t_a$ | 0.45 | $t_b$ | 0.4 | $t_c$ | 0.45 |
| 2 | 1.50 | 0.70 | | | | | | |

As described in Table 4, the time domain pulse with identifier index "1" experiences a decrease in amplitude that begins at time stamp "$t_a$" and persists until time stamp "$t_c$".

According to an implementation, sensing algorithm 536 may continue to monitor the amplitudes of the time domain pulses and detect further differences in amplitudes between the time domain pulses and the corresponding time domain pulses. For each detected difference in amplitude, sensing algorithm 536 may record the time stamps at which the amplitude attenuations were observed and the amplitudes (or normalized amplitudes) of the time domain pulses at the time the amplitude attenuations were observed.

TABLE 5

Successive amplitude attenuations experienced by time domain pulses recorded including the time stamps

| Identifier Index | Time Delay (ms) | Base Amplitude | Time Stamp | Amplitude |
|---|---|---|---|---|
| 0 | 0.00 | 1.00 | $t_b$ | 0.57 |
| 1 | 0.85 | 0.82 | $t_a$ | 0.45 |
| 2 | 1.50 | 0.70 | $t_c$ | 0.38 |

As described in Table 5, the time domain pulse with identifier index "0" experiences a decrease in amplitude at time "to", where tb is later than $t_a$, and the time domain pulse with identifier index "2" experiences a decrease in amplitude at time "$t_c$", where $t_c$ is later than tb.

According to an implementation, the amplitude attenuations described in Table 5 may result from, for example, an object moving across the sensing space following a motion path such as $m_1$. The information included in Table 5 is extendable to the situation where sensing algorithm 536 detects a difference in amplitude for the same time domain pulse over more than one measurement instance as shown in Table 4. In some implementations, sensing algorithm 536 may reorder the time domain pulses according to the time stamps which indicate the time when the time domain pulses experience the change in amplitude. An example of a table storing information about time domain pulses according to time stamps is shown in Table 6.

TABLE 6

Reordered successive amplitude attenuations experienced by time domain pulses according to time stamps

| Time Stamp | Identifier Index | Time Delay (ms) | Base Amplitude | Amplitude |
|---|---|---|---|---|
| $t_a$ | 1 | 0.85 | 0.82 | 0.45 |
| $t_b$ | 0 | 0.00 | 1.00 | 0.57 |
| $t_c$ | 2 | 1.50 | 0.70 | 0.38 |

According to an implementation, sensing algorithm 536 may be configured to determine a plurality of time lags between successive ones of the plurality of amplitude attenuations. In an implementation, sensing algorithm 536 may calculate the plurality of time lags between the disturbances in the amplitude response of the time domain pulses with successive timestamps. In an example implementation, sensing algorithm 536 may be configured to determine a time lag between the first amplitude attenuation and the second amplitude attenuation. According to an implementation, sensing algorithm 536 may determine the time lag between the first amplitude attenuation and the second amplitude attenuation based on comparing the first time stamp and the second time stamp. In an implementation, sensing algorithm 536 may record the plurality of time lags in a table as illustrated in Table 7.

TABLE 7

Time lags between the successive occurrences of amplitude attenuations across time domain pulses

| Time Stamp | Identifier Index | Time Delay (ms) | Base Amplitude | Amplitude | Time Lag δ |
|---|---|---|---|---|---|
| $t_a$ | 1 | 0.85 | 0.82 | 0.45 | |
| $t_b$ | 0 | 0.00 | 1.00 | 0.57 | $t_b - t_a$ |
| $t_c$ | 2 | 1.50 | 0.70 | 0.38 | $t_c - t_b$ |

In an implementation, sensing algorithm 536 may store the table including information regarding the plurality of time lags in data storage 538.

Figure 15:
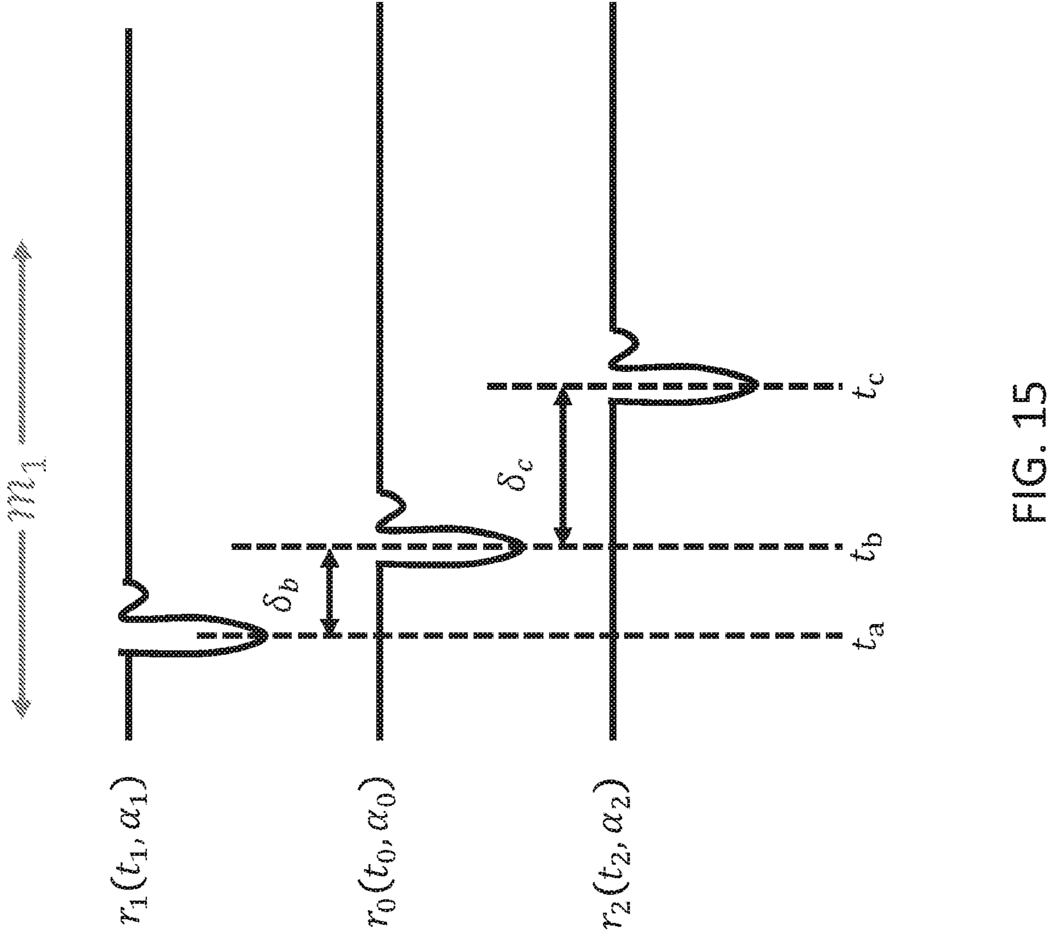
FIG. 15 depicts an illustration of successive amplitude attenuations across time domain pulses as a result of an object moving along a path of motion, according to some embodiments.
Figure 16:
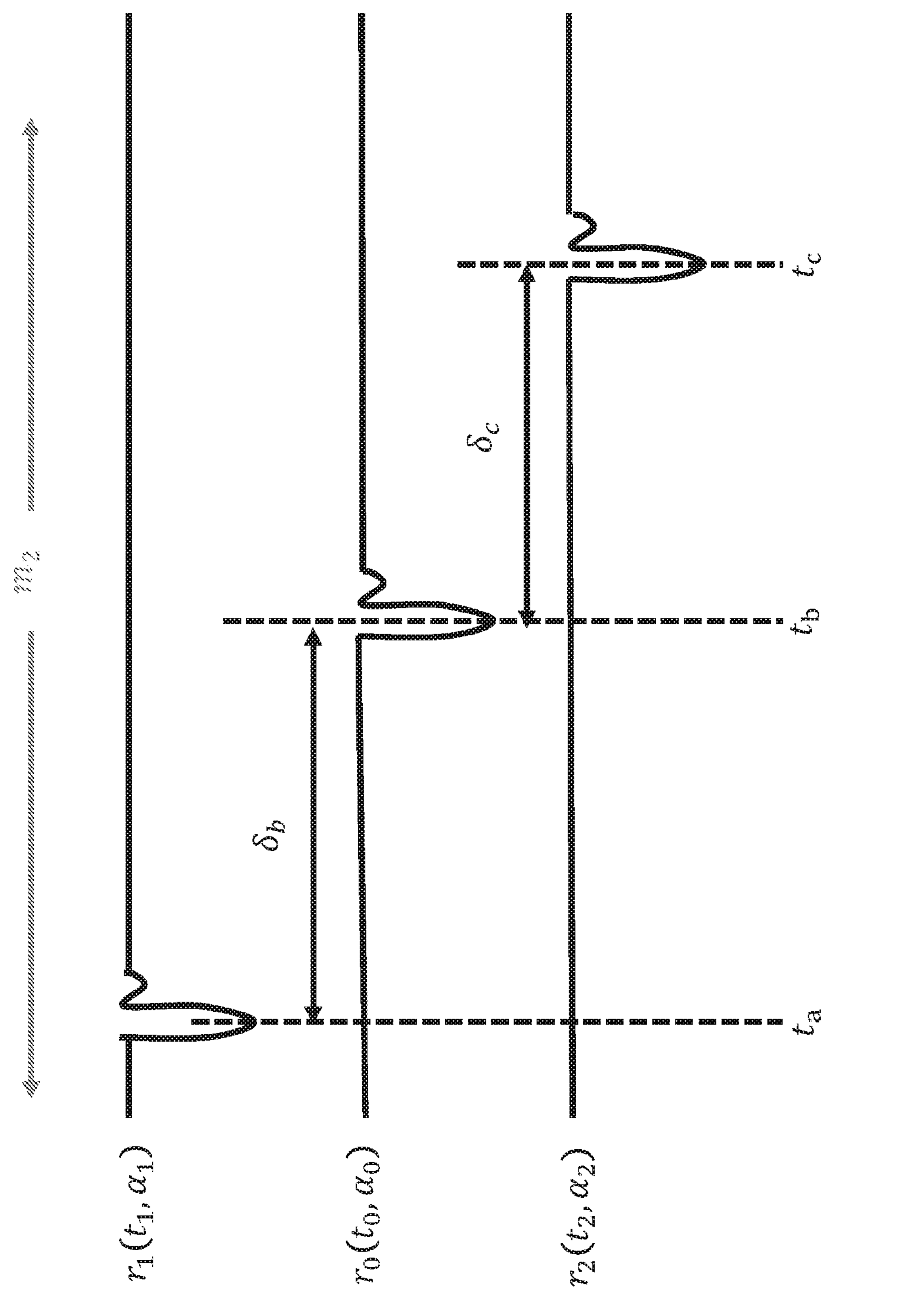
FIG. 16 depicts an illustration of successive amplitude attenuations across time domain pulses as a result of an object moving along another path of motion, according to some embodiments.

FIG. 15 depicts illustration 1500 of successive amplitude attenuations across time domain pulses as a result of an object moving along a path of motion $m_1$, according to some embodiments. The path of motion $m_1$ represents the movement of an object in close proximity to sensing receiver 502 or sensing transmitter 504. FIG. 16 depicts illustration 1600 of successive amplitude attenuations across time domain pulses as a result of an object moving along path of motion $m_2$, according to some embodiments. As shown in FIG. 16, in contrast to $m_1$, $m_2$ is far from sensing receiver 502 or sensing transmitter 504. In the case of an object traversing from a first reflected time domain pulse to a line-of-sight time domain pulse to a second reflected time domain pulse along path of motion $m_2$, there will be a large time lag between the time stamps of successive amplitude attenuations.

According to an implementation, sensing algorithm 536 may be configured to determine a near-far indicator for a path of motion based on the time lag. In an example, a near-far indicator may be a cumulative time lag across all recorded time lags (for example, n−1 time lags) across n time domain pulses as the object moves across the sensing space according to its path of motion. This is illustrated in Equation (17) provided below.

$$NFI(m) = \delta_a + \delta_b + \ldots + \delta_{n-1} = \sum_{k=a}^{n-1} \delta_k \quad (17)$$

where, NFI(m) represents a near-far indicator for the path of motion.

According to an example implementation, sensing algorithm 536 may determine the near-far indicator based on a cumulative time lag between an earliest amplitude attenuation and a latest amplitude attenuation.

According to an implementation, sensing algorithm 536 may undergo a training process for each sensing space (i.e., the same transmission path between sensing receiver 502 and sensing transmitter 504 where the physical environment of the transmission channel remains stable). In an implementation, sensing algorithm 536 may characterize a sensing space between sensing receiver 502 and sensing transmitter 504 by identifying a plurality of paths of motion, where each path of motion may include an associated plurality of near-far indicators. In an implementation, sensing algorithm 536 may build or develop a database of values of the plurality of near-far indicators (NFI(m)) for instances of an object traversing the sensing space via a path of motion (i.e., for the plurality of paths of motion m). Further, sensing algorithm 536 may identify a maximum near-far indicator ($NFI_{max}$) and a minimum near-far indicator ($NFI_{min}$) from the plurality of near-far indicators (NFI((m)). In an example, if a calculated near-far indicator is less than the minimum near-far indicator, then the minimum near-far indicator may be replaced with the newly calculated near-far indicator, i.e., $NFI_{min}$=NFI((m)). In some examples, if a calculated near-far indicator is greater than the maximum near-far indicator, then maximum near-far indicator may be replaced with the newly calculated near-far indicator, i.e., $NFI_{max}$=NFI((m).

In an implementation, sensing algorithm 536 may determine when the maximum near-far indicator and the minimum near-far indicator have stabilized. In an example, sensing algorithm 536 may determine that the maximum near-far indicator and the minimum near-far indicator have stabilized when a number of traverses of an object across the sensing space has occurred (i.e., for a minimum set of paths of motion m). In some examples, sensing algorithm 536 may determine that the maximum near-far indicator and the minimum near-far indicator have stabilized when the maximum near-far indicator and the minimum near-far indicator have remained unchanged for a minimum number of paths of motion m.

According to some implementations, for each sensing space, sensing algorithm 536 may determine which time domain pulses are the spatially extreme time domain pulses. In an example, the spatially extreme time domain pulses are the time domain pulses that an object traversing the sensing space interrupts first and last. The time domain pulse traversed first for an object traversing the sensing space in one direction will be the time domain pulse traversed last for an object traversing the sensing space in the opposite direction. Regardless of the direction of travel of the object traversing the sensing space, the same two time domain pulses are the spatially extreme time domain pulses. According to an example, sensing algorithm 536 may identify a first spatially extreme time domain pulse and a second spatially extreme time domain pulse. The first spatially extreme time domain pulse may be represented as $r_{SE1}(t_{SE1}, \alpha_{SE1})$ and the second spatially extreme time domain pulse may be represented as $r_{SE2}(t_{SE2}, \alpha_{SE2})$.

According to an implementation, once sensing algorithm 536 has completed the training process, sensing algorithm 536 may make an estimation of the proximity of the path of motion of an object traversing the sensing space to either sensing receiver 502 or sensing transmitter 504. In some implementations, sensing algorithm 536 may identify a selected path of motion and a selected near-far indicator associated with the selected path of motion. In an implementation, sensing algorithm 536 determine the near-far indicator based on a time lag between amplitude attenuation of the first spatially extreme time domain pulse and amplitude attenuation of the second spatially extreme time domain pulse.

In an implementation, sensing algorithm 536 may determine a proximity of the selected path of motion to sensing receiver 502 or sensing transmitter 504 by comparing the selected near-far indicator to the maximum near-far indicator and to the minimum near-far indicator. In an implementation, sensing algorithm 536 may compare the selected near-far indicator to the maximum near-far indicator and to the minimum near-far indicator to determine a relative position of the path of motion between sensing receiver 502 or sensing transmitter 504 and the middle of the transmission path between sensing receiver 502 and sensing transmitter 504. In an example, the relative position of the path of motion between sensing receiver 502 or sensing transmitter 504 and the middle of the transmission path between sensing receiver 502 and sensing transmitter 504 may be expressed as a percentage of the distance (described in Equation (18)) from sensing receiver 502 or sensing transmitter 504 to the middle of the transmission path between sensing receiver 502 and sensing transmitter 504.

$$\%_{dist} = \frac{(NFI(m) - NFI_{min})}{(NFI_{max} - NFI_{min})} \times 100\% \tag{18}$$

where, NFI(m) may represent a near-far indicator for the path of motion, $NFI_{min}$ may represent the minimum near-far indicator, and $NFI_{max}$ may represent the maximum near-far indicator.

Figure 17:
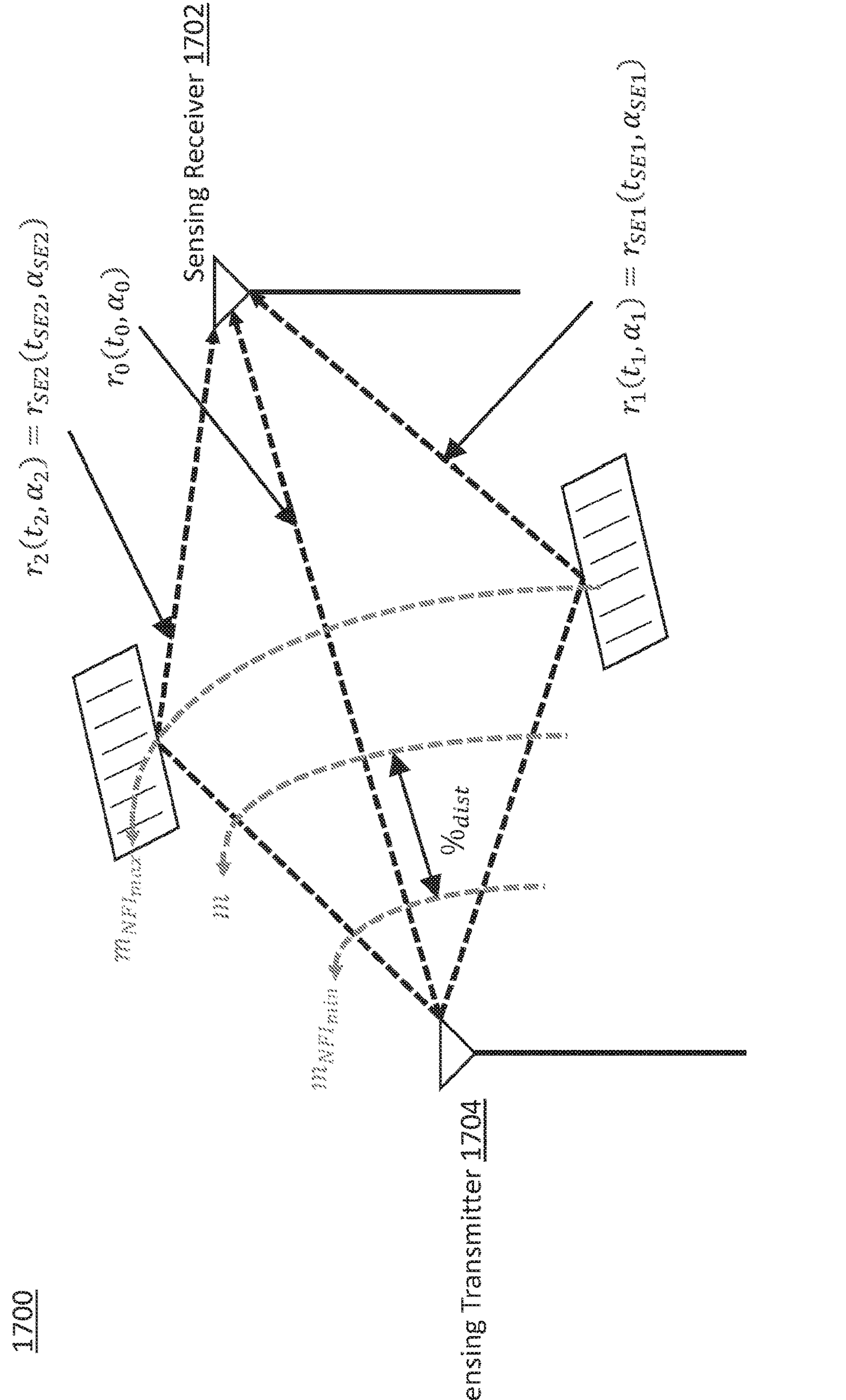
FIG. 17 depicts an illustration of a proximity determination of a path of motion between a sensing receiver and a sensing transmitter, according to some embodiments.

FIG. 17 depicts illustration 1700 of a proximity determination of a path of motion between sensing receiver 1702 and sensing transmitter 1704, according to some embodiments. As described in FIG. 17, closest path of motion $m_{NFI_{min}}$ is associated with the minimum near-far indicator $NFI_{min}$ and the path of motion closest to the middle of the transmission path $m_{NFI_{max}}$ is associated with the maximum near-far indicator $NFI_{max}$. The relative position of the path of motion m is expressed as $\%_{dist}$.

Although, the description above is explained in relation to sensing algorithm 536 of networked device 506 performing the processing steps, however it should be understood with no loss of generality that the processing steps may be performed in some examples by sensing agent 516 on sensing receiver 502 or by sensing agent 526 on sensing transmitter 504.

Figure 18A:
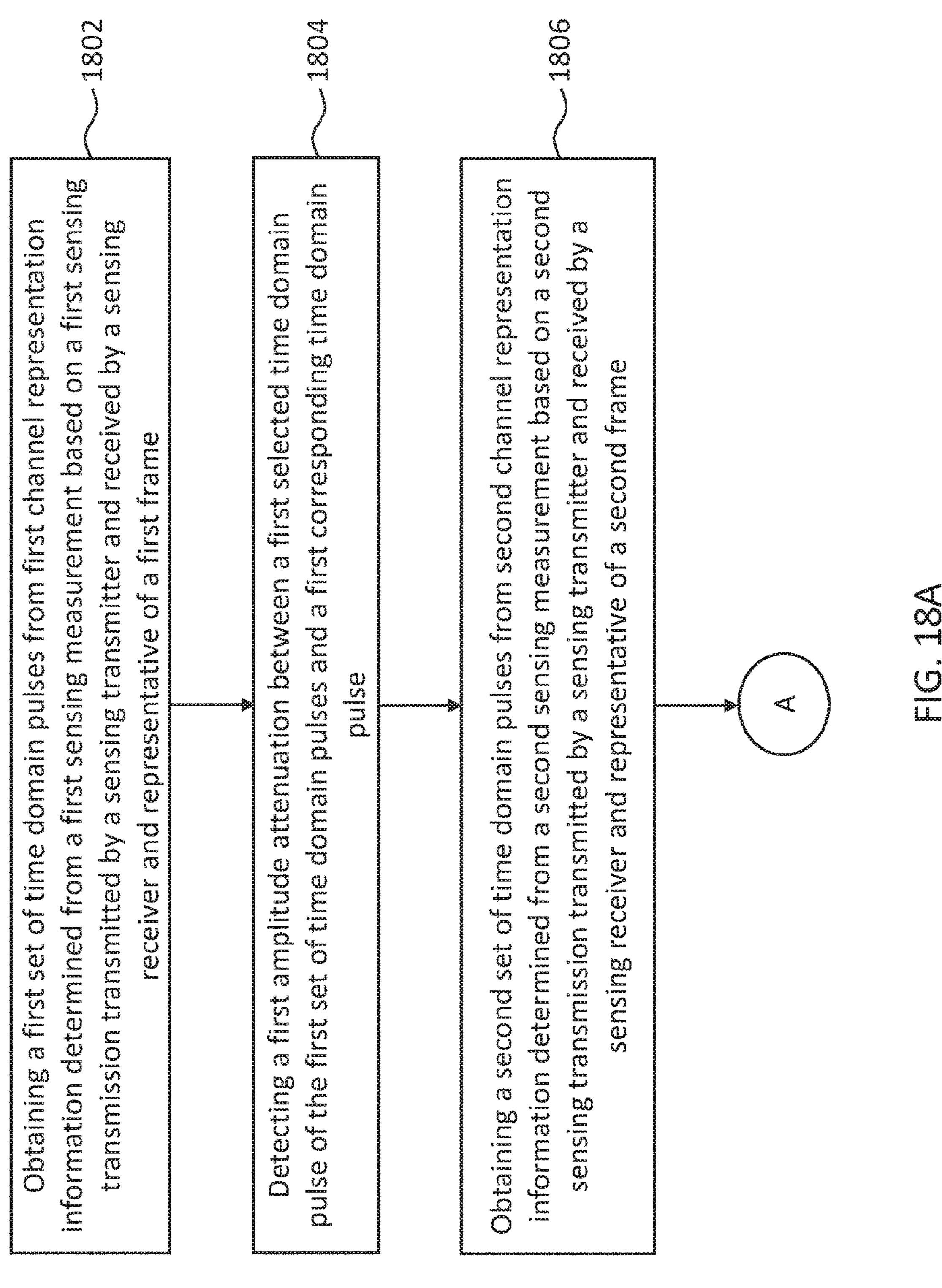
FIG. 18A and FIG. 18B depict a flowchart for determining a near-far indicator based on a time lag, according to some embodiments, according to some embodiments.
Figure 18B:
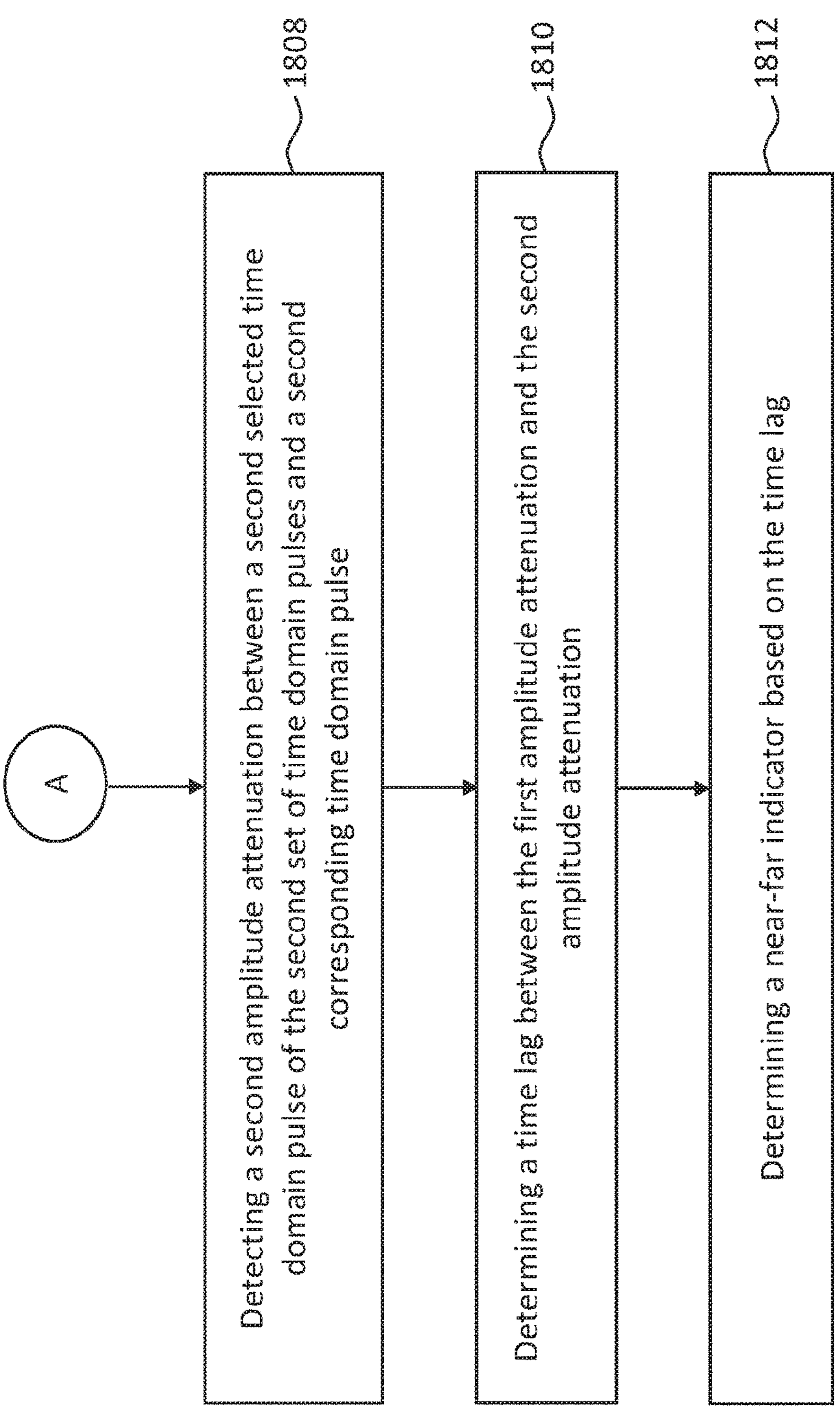

FIG. 18A and FIG. 18B depict flowchart 1800 for determining a near-far indicator based on a time lag, according to some embodiments.

In a brief overview of an implementation of flowchart 1800, at step 1802, a first set of time domain pulses is obtained from first channel representation information determined from a first sensing measurement based on a first sensing transmission transmitted by sensing transmitter 504 and received by sensing receiver 502, where the first set of time domain pulses is representative of a first frame. At step 1804, a first amplitude attenuation between a first selected time domain pulse of the first set of time domain pulses and a first corresponding time domain pulse is detected. At step 1806, a second set of time domain pulses is obtained from second channel representation information determined from a second sensing measurement based on a second sensing transmission transmitted by sensing transmitter 504 and received by sensing receiver 502, where the second set of time domain pulses is representative of a second frame. At step 1808, a second amplitude attenuation between a second selected time domain pulse of the second set of time domain pulses and a second corresponding time domain pulse is detected. At step 1810, a time lag between the first amplitude attenuation and the second amplitude attenuation is determined. At step 1812, a near-far indicator is determined based on the time lag.

Step 1802 includes obtaining a first set of time domain pulses from first channel representation information determined from a first sensing measurement based on a first sensing transmission transmitted by sensing transmitter 504 and received by sensing receiver 502 and representative of a first frame. According to an implementation, networked device 506 may be configured to obtain the first set of time domain pulses from the first channel representation information determined from the first sensing measurement based on the first sensing transmission transmitted by sensing transmitter 504 and received by sensing receiver 502 and representative of the first frame. In an implementation, the first channel representation information may include at least one of channel state information, a full time-domain channel representation information (TD-CRI), and a filtered TD-CRI.

Step 1804 includes detecting a first amplitude attenuation between a first selected time domain pulse of the first set of time domain pulses and a first corresponding time domain pulse. According to an implementation, networked device 506 may be configured to detect the first amplitude attenuation between the first selected time domain pulse of the first set of time domain pulses and the first corresponding time domain pulse. In an implementation, networked device 506 may detect the first amplitude attenuation based on identifying correspondence between the first selected time domain pulse and the first corresponding time domain pulse according to a comparison of a first time delay of the first selected time domain pulse and a stored time delay of the first corresponding time domain pulse, comparing an amplitude of the first selected time domain pulse to a stored base amplitude of the first corresponding time domain pulse, and determining that the first amplitude attenuation has occurred responsive to a determination that the amplitude is less than the stored base amplitude by a threshold amount. In some implementations, detecting the first amplitude attenuation may include recording a first time stamp at which the first amplitude attenuation occurred.

Step 1806 includes obtaining a second set of time domain pulses from second channel representation information determined from a second sensing measurement based on a second sensing transmission transmitted by sensing transmitter 504 and received by sensing receiver 502 and representative of a second frame. According to an implementation, networked device 506 may be configured to obtain the second set of time domain pulses from the second channel representation information determined from the second sensing measurement based on the second sensing transmission transmitted by sensing transmitter 504 and received by sensing receiver 502 and representative of the second frame.

Step 1808 includes detecting a second amplitude attenuation between a second selected time domain pulse of the second set of time domain pulses and a second corresponding time domain pulse. According to an implementation, networked device 506 may be configured to detect the second amplitude attenuation between the second selected time domain pulse of the second set of time domain pulses and the second corresponding time domain pulse. In some implementations, detecting the second amplitude attenuation may include recording a second time stamp at which the second amplitude attenuation occurred.

Step 1810 includes determining a time lag between the first amplitude attenuation and the second amplitude attenuation. According to an implementation, networked device 506 may be configured to determine the time lag between the first amplitude attenuation and the second amplitude attenuation. In some implementations, determining the time lag between the first amplitude attenuation and the second amplitude attenuation may include comparing the first time stamp at which the first amplitude attenuation occurred and the second time stamp at which the second amplitude attenuation occurred.

Step 1812 includes determining a near-far indicator based on the time lag. According to an implementation, networked device 506 may be configured to determine the near-far indicator based on the time lag.

Figure 19A:
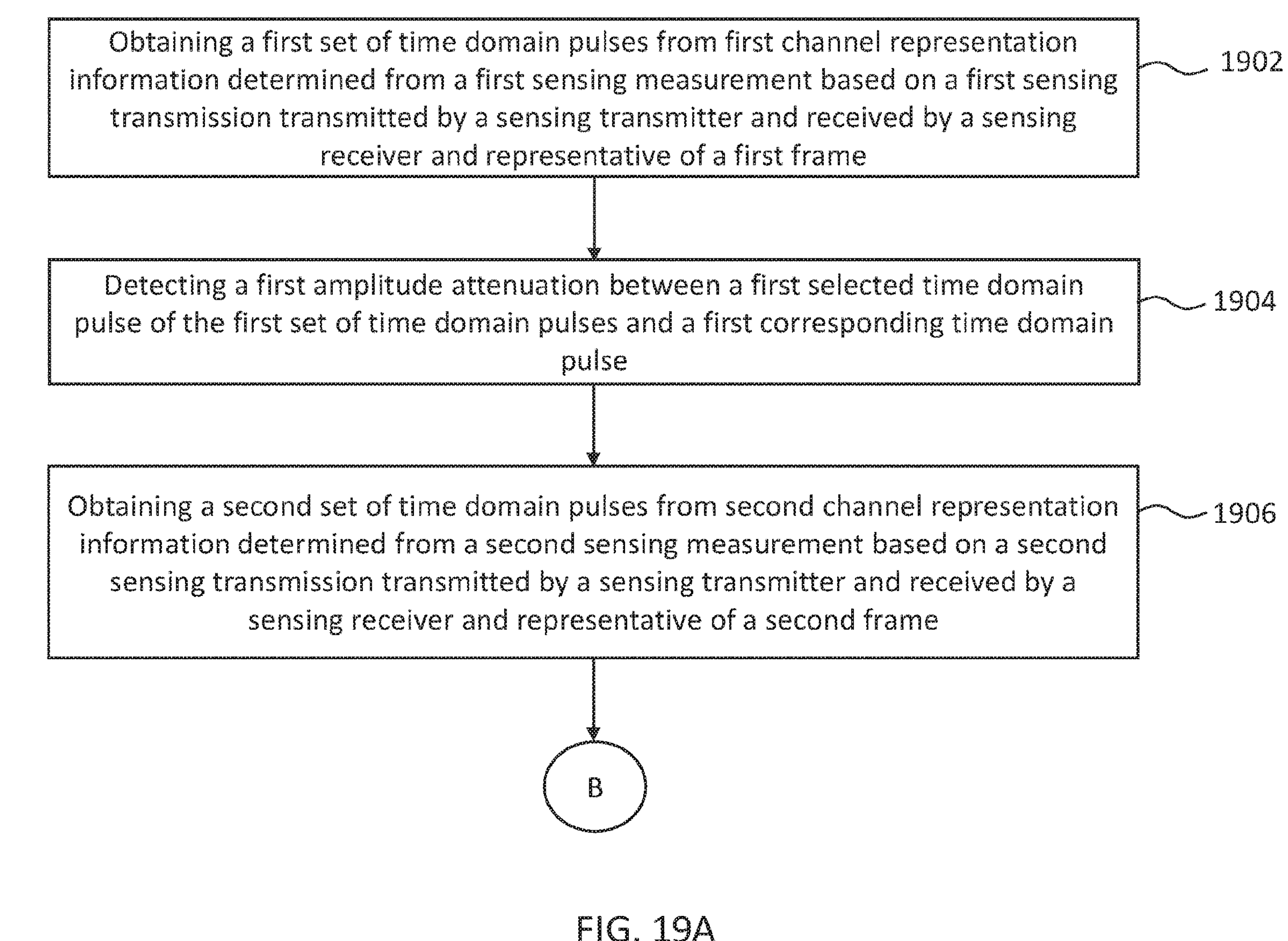
FIG. 19A and FIG. 19B depict a flowchart for estimating a proximity of a path of motion to one of a sensing receiver or a sensing transmitter, according to some embodiments.
Figure 19B:
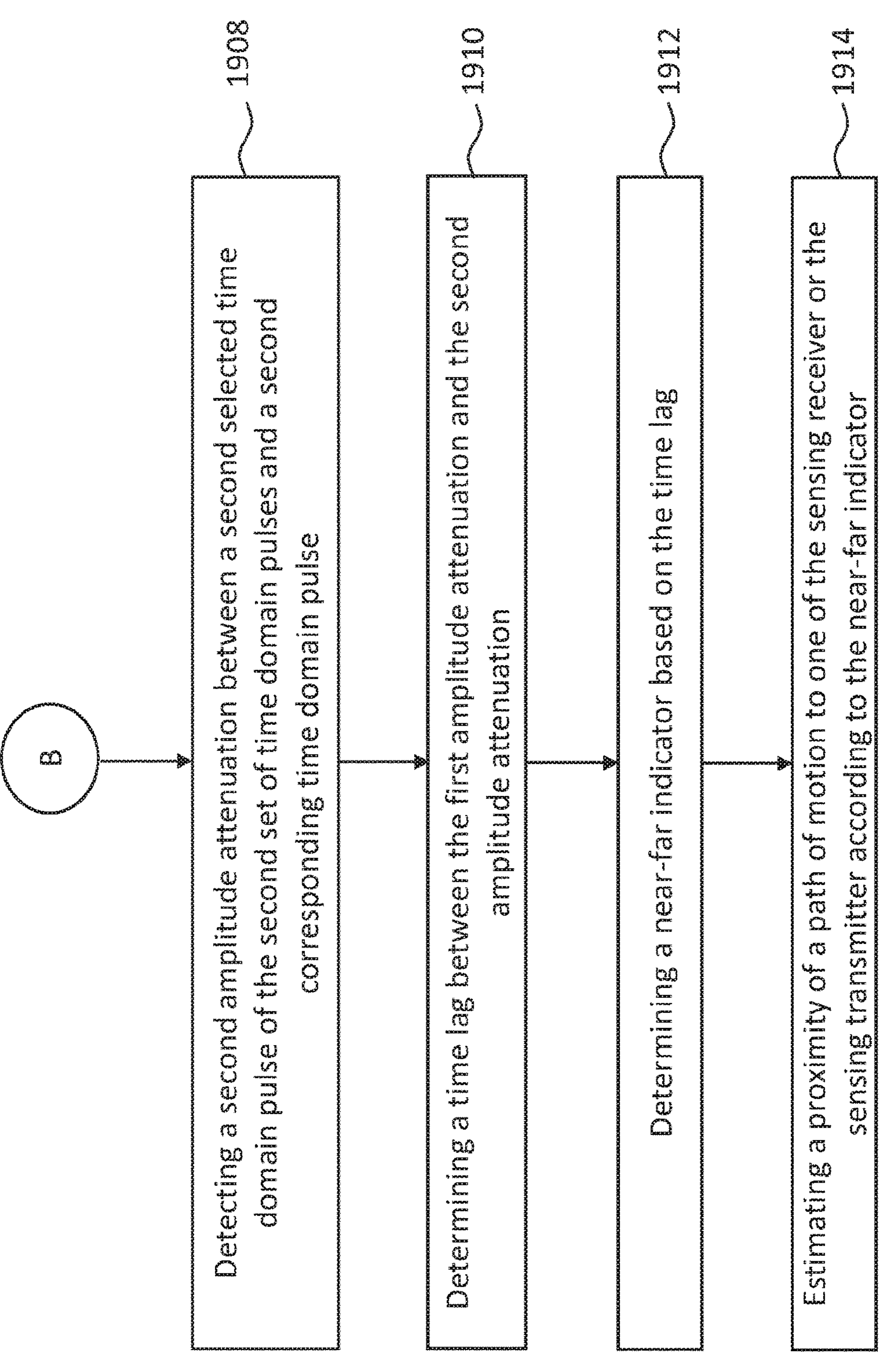

FIG. 19A and FIG. 19B depict flowchart 1900 for estimating a proximity of a path of motion to one of sensing receiver 504 or sensing transmitter 502, according to some embodiments.

In a brief overview of an implementation of flowchart 1900, at step 1902, a first set of time domain pulses is obtained from first channel representation information determined from a first sensing measurement based on a first sensing transmission transmitted by sensing transmitter 504 and received by sensing receiver 502, where the first set of time domain pulses is representative of a first frame. At step 1904, a first amplitude attenuation between a first selected time domain pulse of the first set of time domain pulses and a first corresponding time domain pulse is detected. At step 1906, a second set of time domain pulses is obtained from second channel representation information determined from a second sensing measurement based on a second sensing transmission transmitted by sensing transmitter 504 and received by sensing receiver 502, where the second set of time domain pulses is representative of a second frame. At step 1908, a second amplitude attenuation between a second selected time domain pulse of the second set of time domain pulses and a second corresponding time domain pulse is detected. At step 1910, a time lag between the first amplitude attenuation and the second amplitude attenuation is determined. At step 1912, a near-far indicator is determined based on the time lag. At step 1914, a proximity of a path of motion to one of sensing receiver 502 or sensing transmitter 504 is estimated transmitter according to the near-far indicator.

Step 1902 includes obtaining a first set of time domain pulses from first channel representation information determined from a first sensing measurement based on a first sensing transmission transmitted by sensing transmitter 504 and received by sensing receiver 502 and representative of a first frame. According to an implementation, networked device 506 may be configured to obtain the first set of time domain pulses from the first channel representation information determined from the first sensing measurement based on the first sensing transmission transmitted by sensing transmitter 504 and received by sensing receiver 502 and representative of the first frame. In an implementation, the first channel representation information may include at least one of channel state information, a full time-domain channel representation information (TD-CRI), and a filtered TD-CRI.

Step 1904 includes detecting a first amplitude attenuation between a first selected time domain pulse of the first set of time domain pulses and a first corresponding time domain pulse. According to an implementation, networked device 506 may be configured to detect the first amplitude attenuation between the first selected time domain pulse of the first set of time domain pulses and the first corresponding time domain pulse. In an implementation, networked device 506 may detect the first amplitude attenuation based on identifying correspondence between the first selected time domain pulse and the first corresponding time domain pulse according to a comparison of a first time delay of the first selected time domain pulse and a stored time delay of the first corresponding time domain pulse, comparing an amplitude of the first selected time domain pulse to a stored base amplitude of the first corresponding time domain pulse, and determining that the first amplitude attenuation has occurred responsive to a determination that the amplitude is less than the stored base amplitude by a threshold amount. In some implementations, detecting the first amplitude attenuation may include recording a first time stamp at which the first amplitude attenuation occurred.

Step 1906 includes obtaining a second set of time domain pulses from second channel representation information determined from a second sensing measurement based on a second sensing transmission transmitted by sensing transmitter 504 and received by sensing receiver 502 and representative of a second frame. According to an implementation, networked device 506 may be configured to obtain the second set of time domain pulses from the second channel representation information determined from the second sensing measurement based on the second sensing transmission transmitted by sensing transmitter 504 and received by sensing receiver 502 and representative of the second frame.

Step 1908 includes detecting a second amplitude attenuation between a second selected time domain pulse of the second set of time domain pulses and a second corresponding time domain pulse. According to an implementation, networked device 506 may be configured to detect the second amplitude attenuation between the second selected time domain pulse of the second set of time domain pulses and the second corresponding time domain pulse. In some implementations, detecting the second amplitude attenuation may include recording a second time stamp at which the second amplitude attenuation occurred.

Step 1910 includes determining a time lag between the first amplitude attenuation and the second amplitude attenuation. According to an implementation, networked device 506 may be configured to determine the time lag between the first amplitude attenuation and the second amplitude attenuation. In some implementations, determining the time lag between the first amplitude attenuation and the second amplitude attenuation may include comparing the first time stamp at which the first amplitude attenuation occurred and the second time stamp at which the second amplitude attenuation occurred.

Step 1912 includes determining a near-far indicator based on the time lag. According to an implementation, networked device 506 may be configured to determine the near-far indicator based on the time lag.

Step 1914 includes estimating a proximity of a path of motion to one of sensing receiver 502 or sensing transmitter 504 according to the near-far indicator. According to an implementation, networked device 506 may be configured to estimate the proximity of the path of motion to one of sensing receiver 502 or sensing transmitter 504 according to the near-far indicator.

According to some embodiments, networked device 506 may be configured to store the table of corresponding time domain pulses, each corresponding time domain pulse being represented by a time delay and a base amplitude. In an implementation, the corresponding time domain pulses include a line-of-sight time domain pulse and a plurality of reflected time domain pulses. In an implementation, each time delay is representative of a time between receipt of the line-of-sight time domain pulse and each corresponding time domain pulse. Further, each base amplitude is normalized with respect to a line-of-sight time domain pulse base amplitude.

Figure 20A:
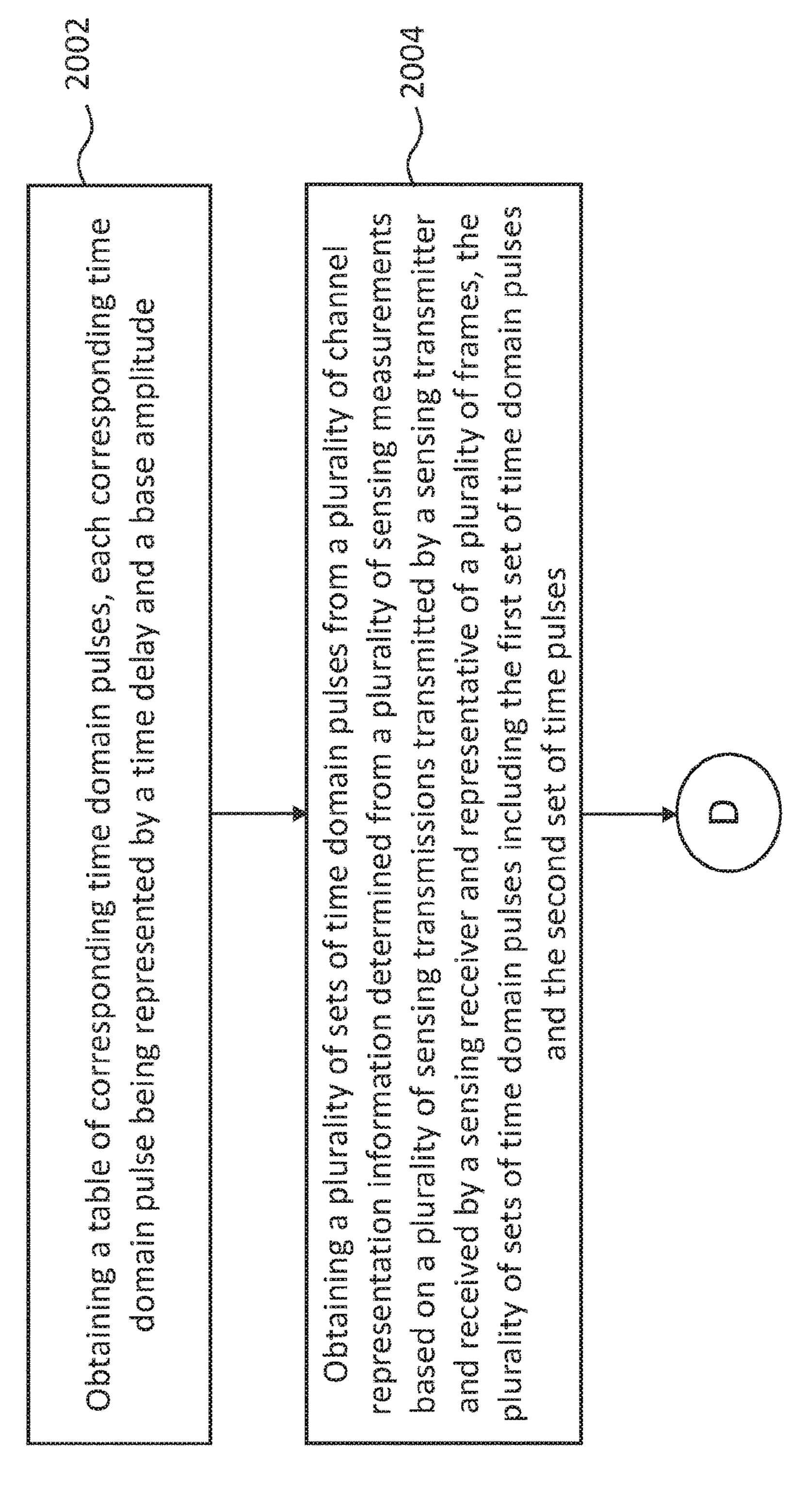
FIG. 20A and FIG. 20B depict a flowchart for determining a near-far indicator associated with a path of motion, according to some embodiments.
Figure 20B:
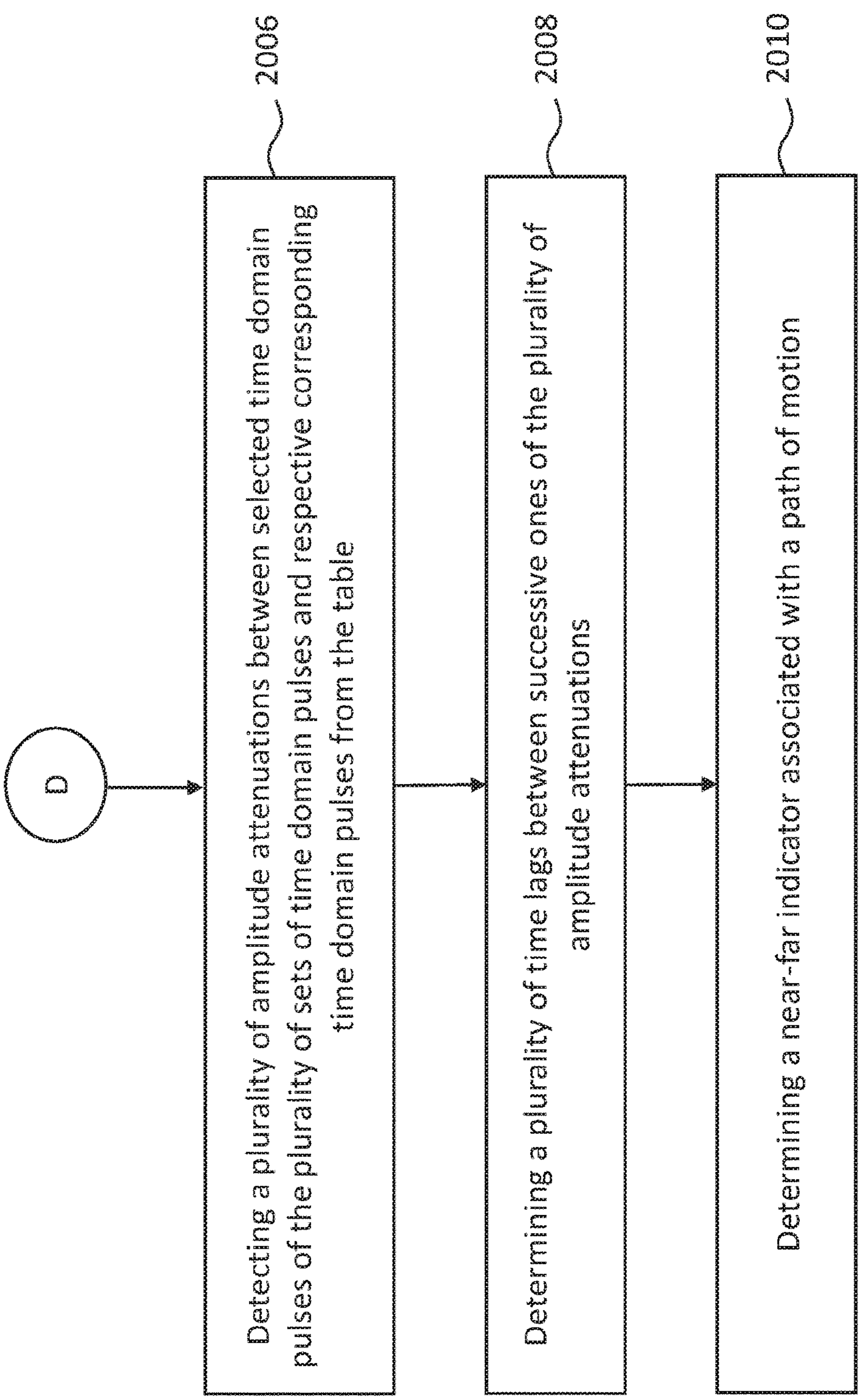

FIG. 20A and FIG. 20B depict flowchart 2000 for determining a near-far indicator associated with a path of motion, according to some embodiments.

In a brief overview of an implementation of flowchart 2000, at step 2002, a table of corresponding time domain pulses is obtained, each corresponding time domain pulse being represented by a time delay and a base amplitude. At step 2004, a plurality of sets of time domain pulses is obtained from a plurality of channel representation information determined from a plurality of sensing measurements based on a plurality of sensing transmissions transmitted by sensing transmitter 504 and received by sensing receiver 502 and representative of a plurality of frames. The plurality of sets of time domain pulses includes the first set of time domain pulses and the second set of time domain pulses. At step 2006, a plurality of amplitude attenuations is detected between selected time domain pulses of the plurality of sets of time domain pulses and respective corresponding time domain pulses from the table. At step 2008, a plurality of time lags is determined between successive ones of the plurality of amplitude attenuations. At step 2010, a near-far indicator associated with a path of motion is determined.

Step 2002 includes obtaining a table of corresponding time domain pulses, each corresponding time domain pulse being represented by a time delay and a base amplitude. According to an implementation, networked device 506 may be configured to obtain the table of corresponding time domain pulses, each corresponding time domain pulse being represented by the time delay and the base amplitude. In an implementation, the corresponding time domain pulses include a line-of-sight time domain pulse and a plurality of reflected time domain pulses. In an implementation, each time delay is representative of a time between receipt of the line-of-sight time domain pulse and each corresponding time domain pulse. Further, each base amplitude may be normalized with respect to a line-of-sight time domain pulse base amplitude.

Step 2004 includes obtaining a plurality of sets of time domain pulses from a plurality of channel representation information determined from a plurality of sensing measurements based on a plurality of sensing transmissions transmitted by a sensing transmitter and received by a sensing receiver and representative of a plurality of frames, the plurality of sets of time domain pulses including the first set of time domain pulses and the second set of time domain pulses. According to an implementation, networked device 506 may be configured obtain the plurality of sets of time domain pulses from the plurality of channel representation information determined from the plurality of sensing measurements based on the plurality of sensing transmissions transmitted by sensing transmitter 504 and received by sensing receiver 502 and representative of the plurality of frames, the plurality of sets of time domain pulses including the first set of time domain pulses and the second set of time domain pulses.

Step 2006 includes detecting a plurality of amplitude attenuations between selected time domain pulses of the plurality of sets of time domain pulses and respective corresponding time domain pulses from the table. According to an implementation, networked device 506 may be configured to detect the plurality of amplitude attenuations between selected time domain pulses of the plurality of sets of time domain pulses and respective corresponding time domain pulses from the table.

Step 2008 includes determining a plurality of time lags between successive ones of the plurality of amplitude attenuations. According to an implementation, networked device 506 may be configured to determine the plurality of time lags between successive ones of the plurality of amplitude attenuations.

Step 2010 includes determining a near-far indicator associated with a path of motion. According to an implementation, networked device 506 may be configured to determine the near-far indicator associated with the path of motion. In an implementation, networked device 506 may be configured to determine the near-far indicator based on the cumulative time lag between an earliest amplitude attenuation and a latest amplitude attenuation.

According to an implementation, networked device 506 may characterize a sensing space between sensing transmitter 504 and sensing receiver 502 by identifying a plurality of paths of motion, each path of motion including an associated plurality of near-far indicators, identifying a maximum near-far indicator from the plurality of near-far indicators, and identifying a minimum near-far indicator from the plurality of near-far indicators. In an implementation, networked device 506 may identify a selected path of motion and a selected near-far indicator associated with the selected path of motion and determine a proximity of the selected path of motion to the sensing transmitter or the sensing receiver by comparing the selected near-far indicator to the maximum near-far indicator and to the minimum near-far indicator. In some implementations, networked device 506 may further characterize the sensing space by identifying a first spatially extreme time domain pulse and identifying a second spatially extreme time domain pulse. According to an implementation, networked device 506 may determine the near-far indicator based on a time lag between amplitude attenuation of the first spatially extreme time domain pulse and amplitude attenuation of the second spatially extreme time domain pulse.

Embodiment 1 is a method for Wi-Fi sensing carried out by a networked device implementing a sensing algorithm. The networked device includes at least one processor configured to execute instructions. The method comprises obtaining, by the at least one processor, a first set of time domain pulses from first channel representation information determined from a first sensing measurement based on a first sensing transmission transmitted by a sensing transmitter and received by a sensing receiver and representative of a first frame; detecting a first amplitude attenuation between a first selected time domain pulse of the first set of time domain pulses and a first corresponding time domain pulse; obtaining, by the at least one processor, a second set of time domain pulses from second channel representation information determined from a second sensing measurement based on a second sensing transmission transmitted by a sensing transmitter and received by a sensing receiver and representative of a second frame; detecting a second amplitude attenuation between a second selected time domain pulse of the second set of time domain pulses and a second corresponding time domain pulse; determining a time lag between the first amplitude attenuation and the second amplitude attenuation; and determining a near-far indicator based on the time lag.

Embodiment 2 is the method of embodiment 1, wherein the first channel representation information includes at least one of channel state information, a full time-domain channel representation information (TD-CRI), and a filtered TD-CRI.

Embodiment 3 is the method of embodiment 1 or 2, wherein detecting the first amplitude attenuation includes: identifying correspondence between the first selected time domain pulse and the first corresponding time domain pulse according to a comparison of a first time delay of the first selected time domain pulse and a stored time delay of the first corresponding time domain pulse; comparing an amplitude of the first selected time domain pulse to a stored base amplitude of the first corresponding time domain pulse; and determining that the first amplitude attenuation has occurred responsive to a determination that the amplitude is less than the stored base amplitude by a threshold amount.

Embodiment 4 is the method of any of embodiments 1-3, wherein detecting the first amplitude attenuation includes recording a first time stamp at which the first amplitude attenuation occurred, wherein detecting the second amplitude attenuation includes recording a second time stamp at which the second amplitude attenuation occurred, and wherein determining the time lag between the first amplitude attenuation and the second amplitude attenuation includes comparing the first time stamp and the second time stamp.

Embodiment 5 is the method of any of embodiments 1-4, further comprising: storing a table of corresponding time domain pulses, each corresponding time domain pulse being represented by a time delay and a base amplitude.

Embodiment 6 is the method of embodiment 5, wherein each time delay is representative of a time between receipt of a line-of-sight time domain pulse and each corresponding time domain pulse.

Embodiment 7 is the method of embodiment 5 or 6, wherein each base amplitude is normalized with respect to a line-of-sight time domain pulse base amplitude.

Embodiment 8 is the method of any of embodiments 5-7, wherein the corresponding time domain pulses include a line-of-sight time domain pulse and a plurality of reflected time domain pulses.

Embodiment 9 is the method of any of embodiments 1-8, further comprising estimating a proximity of a path of motion to one of the sensing receiver or the sensing transmitter according to the near-far indicator.

Embodiment 10 is the method of any of embodiments 1-9, further comprising: obtaining, by the at least one processor, a table of corresponding time domain pulses, each corresponding time domain pulse being represented by a time delay and a base amplitude; identifying a path of motion by: obtaining, by the at least one processor, a plurality of sets of time domain pulses from a plurality of channel representation information determined from a plurality of sensing measurements based on a plurality of sensing transmissions transmitted by a sensing transmitter and received by a sensing receiver and representative of a plurality of frames, the plurality of sets of time domain pulses including the first set of time domain pulses and the second set of time domain pulses; detecting a plurality of amplitude attenuations between selected time domain pulses of the plurality of sets of time domain pulses and respective corresponding time domain pulses from the table; determining a plurality of time lags between successive ones of the plurality of amplitude attenuations; and determining a near-far indicator associated with the path of motion.

Embodiment 11 is the method of embodiment 10, wherein determining the near-far indicator is based on a cumulative time lag between an earliest amplitude attenuation and a latest amplitude attenuation.

Embodiment 12 is the method of embodiment 10 or 11, further comprising: characterizing a sensing space between the sensing transmitter and the sensing receiver by: identifying a plurality of paths of motion, each path of motion including an associated plurality of near-far indicators; identifying a maximum near-far indicator from the plurality of near-far indicators; and identifying a minimum near-far indicator from the plurality of near-far indicators.

Embodiment 13 is the method of embodiment 11 or 12, further comprising: identifying a selected path of motion and a selected near-far indicator associated with the selected path of motion; and determining a proximity of the selected path of motion to the sensing transmitter or the sensing receiver by comparing the selected near-far indicator to the maximum near-far indicator and to the minimum near-far indicator.

Embodiment 14 is the method of any of embodiments 11-13, wherein characterizing the sensing space further includes: identifying a first spatially extreme time domain pulse; and identifying a second spatially extreme time domain pulse.

Embodiment 15 is the method of embodiment 14, wherein determining the near-far indicator is based on a time lag between amplitude attenuation of the first spatially extreme time domain pulse and amplitude attenuation of the second spatially extreme time domain pulse.

Embodiment 16 is a system for Wi-Fi sensing. The system comprises: a networked device configured to implement a sensing algorithm, the networked device including at least one processor configured to execute instructions for: obtaining a first set of time domain pulses from first channel representation information determined from a first sensing measurement based on a first sensing transmission transmitted by a sensing transmitter and received by a sensing receiver and representative of a first frame; detecting a first amplitude attenuation between a first selected time domain pulse of the first set of time domain pulses and a first corresponding time domain pulse; obtaining a second set of time domain pulses from second channel representation information determined from a second sensing measurement based on a second sensing transmission transmitted by a sensing transmitter and received by a sensing receiver and representative of a second frame; detecting a second amplitude attenuation between a second selected time domain pulse of the second set of time domain pulses and a second corresponding time domain pulse; determining a time lag between the first amplitude attenuation and the second amplitude attenuation; and determining a near-far indicator based on the time lag.

Embodiment 17 is the system of embodiment 16, wherein the first channel representation information includes at least one of channel state information, a full time-domain channel representation information (TD-CRI), and a filtered TD-CRI.

Embodiment 18 is the system of embodiment 16 or 17, wherein detecting the first amplitude attenuation includes: identifying correspondence between the first selected time domain pulse and the first corresponding time domain pulse according to a comparison of a first time delay of the first selected time domain pulse and a stored time delay of the first corresponding time domain pulse; comparing an amplitude of the first selected time domain pulse to a stored base amplitude of the first corresponding time domain pulse; and determining that the first amplitude attenuation has occurred responsive to a determination that the amplitude is less than the stored base amplitude by a threshold amount.

Embodiment 19 is the system of any of embodiments 16-18, wherein detecting the first amplitude attenuation includes recording a first time stamp at which the first amplitude attenuation occurred, wherein detecting the second amplitude attenuation includes recording a second time stamp at which the second amplitude attenuation occurred, and wherein determining the time lag between the first amplitude attenuation and the second amplitude attenuation includes comparing the first time stamp and the second time stamp.

Embodiment 20 is the system of any of embodiments 16-19, wherein the at least one processor further includes instructions for: storing a table of corresponding time domain pulses, each corresponding time domain pulse being represented by a time delay and a base amplitude.

Embodiment 21 is the system of embodiment 20, wherein each time delay is representative of a time between receipt of a line-of-sight time domain pulse and each corresponding time domain pulse.

Embodiment 22 is the system of embodiment 20 or 21, wherein each base amplitude is normalized with respect to a line-of-sight time domain pulse base amplitude.

Embodiment 23 is the system of any of embodiments 20-22, wherein the corresponding time domain pulses include a line-of-sight time domain pulse and a plurality of reflected time domain pulses.

Embodiment 24 is the system of any of embodiments 16-23, wherein the at least one processor further includes instructions for estimating a proximity of a path of motion to one of the sensing receiver or the sensing transmitter according to the near-far indicator.

Embodiment 25 is the system of any of embodiments 16-24, wherein the at least one processor further includes instructions for: obtaining, by the at least one processor, a table of corresponding time domain pulses, each corresponding time domain pulse being represented by a time delay and a base amplitude; identifying a path of motion by: obtaining, by the at least one processor, a plurality of sets of time domain pulses from a plurality of channel representation information determined from a plurality of sensing measurements based on a plurality of sensing transmissions transmitted by a sensing transmitter and received by a sensing receiver and representative of a plurality of frames, the plurality of sets of time domain pulses including the first set of time domain pulses and the second set of time domain pulses; detecting a plurality of amplitude attenuations between selected time domain pulses of the plurality of sets of time domain pulses and respective corresponding time domain pulses from the table; determining a plurality of time lags between successive ones of the plurality of amplitude attenuations; and determining a near-far indicator associated with the path of motion.

Embodiment 26 is the system of embodiment 25, wherein determining the near-far indicator is based on a cumulative time lag between an earliest amplitude attenuation and a latest amplitude attenuation.

Embodiment 27 is the system of embodiment 25 or 26, further comprising: characterizing a sensing space between the sensing transmitter and the sensing receiver by: identifying a plurality of paths of motion, each path of motion including an associated plurality of near-far indicators; identifying a maximum near-far indicator from the plurality of near-far indicators; and identifying a minimum near-fear indicator from the plurality of near-far indicators.

Embodiment 28 is the system of embodiment 26 or 27, further comprising: identifying a selected path of motion and a selected near-far indicator associated width the selected path of motion; and determining a proximity of the selected path of motion to the sensing transmitter or the sensing receiver by comparing the selected near-far indicator to the maximum near-far indicator and to the minimum near-far indicator.

Embodiment 29 is the system of any of embodiments 26-28, wherein characterizing the sensing space further includes: identifying a first spatially extreme time domain pulse; and identifying a second spatially extreme time domain pulse.

Embodiment 30 is the system of embodiment 29, wherein determining the near-far indicator is based on a time lag between amplitude attenuation of the first spatially extreme time domain pulse and amplitude attenuation of the second spatially extreme time domain pulse.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a networked device implementing a sensing algorithm, the networked device including at least one processor configured to execute instructions, the method comprising:

obtaining, by the at least one processor, a first set of time domain pulses from first channel representation information determined from a first sensing measurement based on a first sensing transmission transmitted by a sensing transmitter and received by a sensing receiver and representative of a first frame;

detecting a first amplitude attenuation between a first selected time domain pulse of the first set of time domain pulses and a first corresponding time domain pulse;

obtaining, by the at least one processor, a second set of time domain pulses from second channel representation information determined from a second sensing measurement based on a second sensing transmission transmitted by the sensing transmitter and received by the sensing receiver and representative of a second frame;

detecting a second amplitude attenuation between a second selected time domain pulse of the second set of time domain pulses and a second corresponding time domain pulse;

determining a time lag between the first amplitude attenuation and the second amplitude attenuation; and determining a near-far indicator based on the time lag.

2. The method of claim 1, wherein the first channel representation information includes at least one of channel state information, a full time-domain channel representation information (TD-CRI), and a filtered TD-CRI.

3. The method of claim 1, wherein detecting the first amplitude attenuation includes:

identifying correspondence between the first selected time domain pulse and the first corresponding time domain pulse according to a comparison of a first time delay of the first selected time domain pulse and a stored time delay of the first corresponding time domain pulse;

comparing an amplitude of the first selected time domain pulse to a stored base amplitude of the first corresponding time domain pulse; and determining that the first amplitude attenuation has occurred responsive to a determination that the amplitude is less than the stored base amplitude by a threshold amount.

4. The method of claim 1, wherein detecting the first amplitude attenuation includes recording a first time stamp at which the first amplitude attenuation occurred, wherein detecting the second amplitude attenuation includes recording a second time stamp at which the second amplitude attenuation occurred, and wherein determining the time lag between the first amplitude attenuation and the second amplitude attenuation includes comparing the first time stamp and the second time stamp.

5. The method of claim 1, further comprising:

storing a table of corresponding time domain pulses, each corresponding time domain pulse being represented by a time delay and a base amplitude.

6. The method of claim 5, wherein each time delay is representative of a time between receipt of a line-of-sight time domain pulse and each corresponding time domain pulse.

7. The method of claim 5, wherein the corresponding time domain pulses include a line-of-sight time domain pulse and a plurality of reflected time domain pulses.

8. The method of claim 1, further comprising estimating a proximity of a path of motion to one of the sensing receiver or the sensing transmitter according to the near-far indicator.

9. The method of claim 1, further comprising:

obtaining, by the at least one processor, a table of corresponding time domain pulses, each corresponding time domain pulse being represented by a time delay and a base amplitude;

identifying a path of motion by:

obtaining, by the at least one processor, a plurality of sets of time domain pulses from a plurality of channel representation information determined from a plurality of sensing measurements based on a plurality of sensing transmissions transmitted by the sensing transmitter and received by the sensing receiver and representative of a plurality of frames, the plurality of sets of time domain pulses including the first set of time domain pulses and the second set of time domain pulses;

detecting a plurality of amplitude attenuations between selected time domain pulses of the plurality of sets of time domain pulses and respective corresponding time domain pulses from the table;

determining a plurality of time lags between successive ones of the plurality of amplitude attenuations; and determining a near-far indicator associated with the path of motion.

10. The method of claim 8, wherein characterizing the sensing space further includes:

identifying a first spatially extreme time domain pulse; and identifying a second spatially extreme time domain pulse; and wherein determining the near-far indicator is based on a time lag between amplitude attenuation of the first spatially extreme time domain pulse and amplitude attenuation of the second spatially extreme time domain pulse.

11. A system for Wi-Fi sensing, comprising:

a networked device configured to implement a sensing algorithm, the networked device including at least one processor configured to execute instructions for:

obtaining a first set of time domain pulses from first channel representation information determined from a first sensing measurement based on a first sensing transmission transmitted by a sensing transmitter and received by a sensing receiver and representative of a first frame;

detecting a first amplitude attenuation between a first selected time domain pulse of the first set of time domain pulses and a first corresponding time domain pulse;

obtaining a second set of time domain pulses from second channel representation information determined from a second sensing measurement based on a second sensing transmission transmitted by the sensing transmitter and received by the sensing receiver and representative of a second frame;

detecting a second amplitude attenuation between a second selected time domain pulse of the second set of time domain pulses and a second corresponding time domain pulse;

determining a time lag between the first amplitude attenuation and the second amplitude attenuation; and determining a near-far indicator based on the time lag.

12. The system of claim 11, wherein the first channel representation information includes at least one of channel state information, a full time-domain channel representation information (TD-CRI), and a filtered TD-CRI.

13. The system of claim 11, wherein detecting the first amplitude attenuation includes:

identifying correspondence between the first selected time domain pulse and the first corresponding time domain pulse according to a comparison of a first time delay of the first selected time domain pulse and a stored time delay of the first corresponding time domain pulse;

comparing an amplitude of the first selected time domain pulse to a stored base amplitude of the first corresponding time domain pulse; and determining that the first amplitude attenuation has occurred responsive to a determination that the amplitude is less than the stored base amplitude by a threshold amount.

14. The system of claim 11, wherein detecting the first amplitude attenuation includes recording a first time stamp at which the first amplitude attenuation occurred, wherein detecting the second amplitude attenuation includes recording a second time stamp at which the second amplitude attenuation occurred, and wherein determining the time lag between the first amplitude attenuation and the second amplitude attenuation includes comparing the first time stamp and the second time stamp.

15. The system of claim 11, wherein the at least one processor further includes instructions for:

storing a table of corresponding time domain pulses, each corresponding time domain pulse being represented by a time delay and a base amplitude.

16. The system of claim 15, wherein each time delay is representative of a time between receipt of a line-of-sight time domain pulse and each corresponding time domain pulse.

17. The system of claim 11, wherein the at least one processor further includes instructions for estimating a proximity of a path of motion to one of the sensing receiver or the sensing transmitter according to the near-far indicator.

18. The system of claim 11, wherein the at least one processor further includes instructions for:

obtaining, by the at least one processor, a table of corresponding time domain pulses, each corresponding time domain pulse being represented by a time delay and a base amplitude;

identifying a path of motion by:

obtaining, by the at least one processor, a plurality of sets of time domain pulses from a plurality of channel representation information determined from a plurality of sensing measurements based on a plurality of sensing transmissions transmitted by the sensing transmitter and received by the sensing receiver and representative of a plurality of frames, the plurality of sets of time domain pulses including the first set of time domain pulses and the second set of time domain pulses;

detecting a plurality of amplitude attenuations between selected time domain pulses of the plurality of sets of time domain pulses and respective corresponding time domain pulses from the table;

determining a plurality of time lags between successive ones of the plurality of amplitude attenuations; and determining a near-far indicator associated with the path of motion.

* * * * *